(12) United States Patent
Prentice, III

(10) Patent No.: US 8,132,416 B2
(45) Date of Patent: *Mar. 13, 2012

(54) COMBUSTION METHODS AND FUELS FOR THE PRODUCTION OF ENERGY

(75) Inventor: James Andrew Prentice, III, Rome, GA (US)

(73) Assignee: Advanced Combustion Energy Systems, Inc., Kingston, GA (US)

(*) Notice: Subject to any disclaimer, the term of this patent is extended or adjusted under 35 U.S.C. 154(b) by 870 days.

This patent is subject to a terminal disclaimer.

(21) Appl. No.: 11/424,561

(22) Filed: Jun. 16, 2006

(65) Prior Publication Data

US 2006/0225422 A1 Oct. 12, 2006

Related U.S. Application Data

(63) Continuation of application No. PCT/US2004/042193, filed on Dec. 16, 2004, which is a continuation of application No. 10/738,422, filed on Dec. 16, 2003, now Pat. No. 7,028,478.

(51) Int. Cl.
*F02G 3/00* (2006.01)
*F01K 1/00* (2006.01)
(52) U.S. Cl. ............... 60/772; 60/781; 60/670
(58) Field of Classification Search ............ 60/645, 60/670, 39.01, 772, 781; 110/233, 261, 267, 110/292
See application file for complete search history.

(56) References Cited

U.S. PATENT DOCUMENTS

| | | | |
|---|---|---|---|
| 2,510,572 A | 6/1950 | Goddard | |
| 2,847,825 A | 8/1958 | Spears | |
| 2,865,344 A * | 12/1958 | Firl | 122/478 |
| 3,101,592 A | 8/1963 | Robertson et al. | |
| 3,779,212 A | 12/1973 | Wagner | |
| 4,059,411 A * | 11/1977 | Smith | 44/445 |
| 4,377,067 A | 3/1983 | Sternfeld et al. | |
| 4,472,935 A | 9/1984 | Acheson et al. | |
| 4,850,288 A * | 7/1989 | Hoffert et al. | 110/214 |
| 4,854,853 A | 8/1989 | McElroy | |
| 4,907,406 A | 3/1990 | Kirikami et al. | |
| 4,915,038 A | 4/1990 | Sujata et al. | |
| 4,916,904 A | 4/1990 | Ramsaier et al. | |
| 5,088,450 A | 2/1992 | Sternfeld et al. | |
| 5,209,187 A | 5/1993 | Khinkis | |
| 5,680,764 A | 10/1997 | Viteri | |
| 5,709,077 A | 1/1998 | Beichel | |
| 5,715,673 A | 2/1998 | Beichel | |
| 5,859,071 A | 1/1999 | Young et al. | |
| 5,956,937 A | 9/1999 | Beichel | |

(Continued)

FOREIGN PATENT DOCUMENTS

JP 57-043104 3/1982

(Continued)

*Primary Examiner* — Hoang Nguyen
(74) *Attorney, Agent, or Firm* — Sutherland Asbill & Brennan LLP

(57) ABSTRACT

Apparatus and processes are provided for combusting hydrocarbon-containing waste fuel with an oxidizer, preferably liquid oxygen, and producing a substantially clean exhaust gas and a separate high purity steam product (e.g., superheated steam) that can be used to generate electrical power. The apparatus includes a plurality of combustion chambers in series with means to control the combustion temperature while facilitating complete combustion. The apparatus and method are useful for transforming waste materials, particularly solid and liquid wastes, such as the rubber from scrap tires into non-hazardous materials and energy.

9 Claims, 10 Drawing Sheets

U.S. PATENT DOCUMENTS

| | | |
|---|---|---|
| 5,970,702 A | 10/1999 | Beichel |
| 6,170,264 B1 | 1/2001 | Viteri et al. |
| 6,206,684 B1 | 3/2001 | Mueggenburg |
| 6,247,316 B1 | 6/2001 | Viteri |
| 6,439,682 B1 | 8/2002 | Kakutani |
| 6,523,349 B2 | 2/2003 | Viteri |
| 6,596,220 B2 | 7/2003 | Gross |
| 6,637,183 B2 | 10/2003 | Viteri et al. |
| 6,848,375 B2 * | 2/2005 | Kasin .......................... 110/346 |
| 6,923,838 B2 * | 8/2005 | Maubert et al. ................ 44/308 |
| 7,028,478 B2 * | 4/2006 | Prentice, III .................... 60/645 |
| 2003/0152879 A1 * | 8/2003 | Fischer et al. ..................... 431/8 |
| 2003/0221409 A1 * | 12/2003 | McGowan ................. 60/39.17 |

FOREIGN PATENT DOCUMENTS

| | | |
|---|---|---|
| JP | 64-31323 | 2/1989 |
| JP | 11-082960 | 3/1999 |
| JP | 2000-111022 | 4/2000 |

* cited by examiner

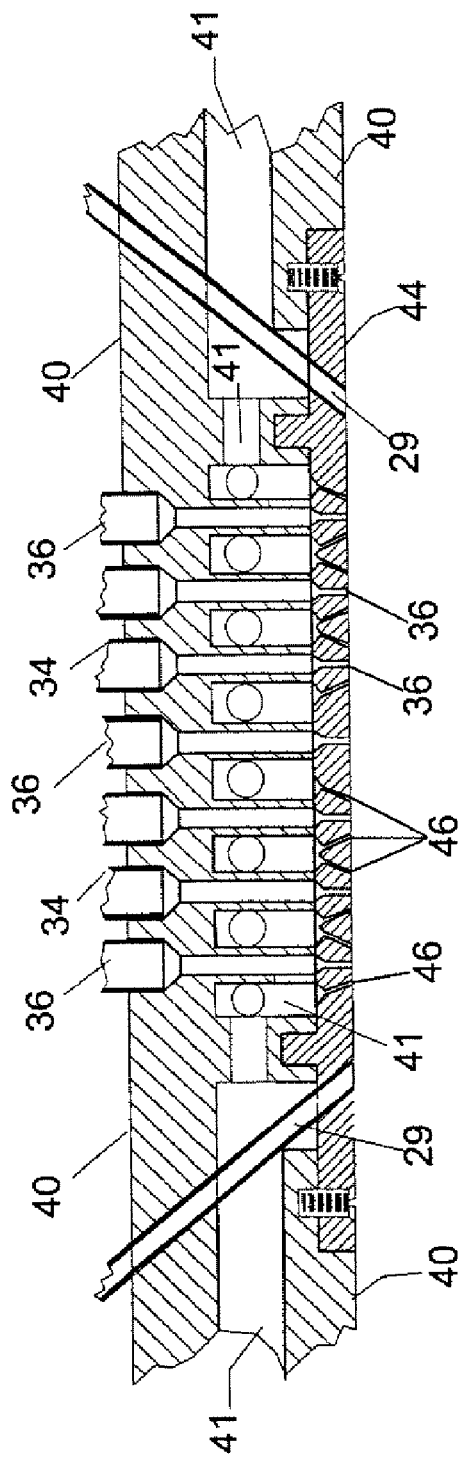
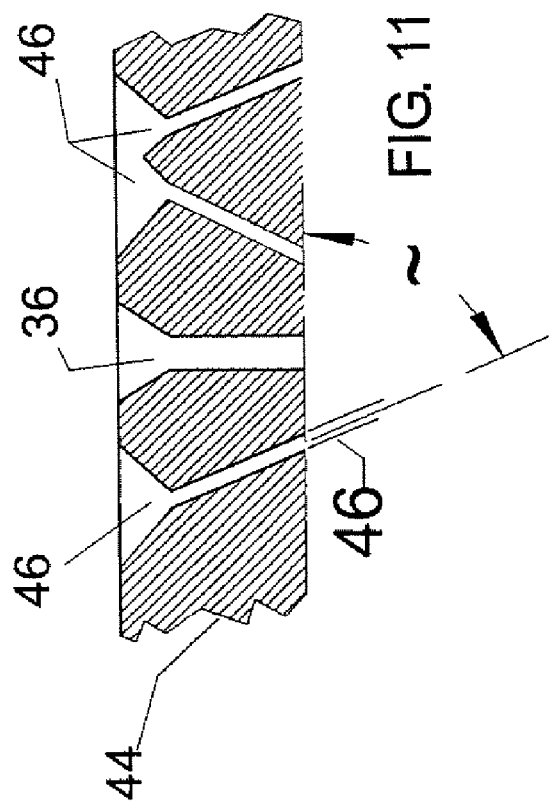

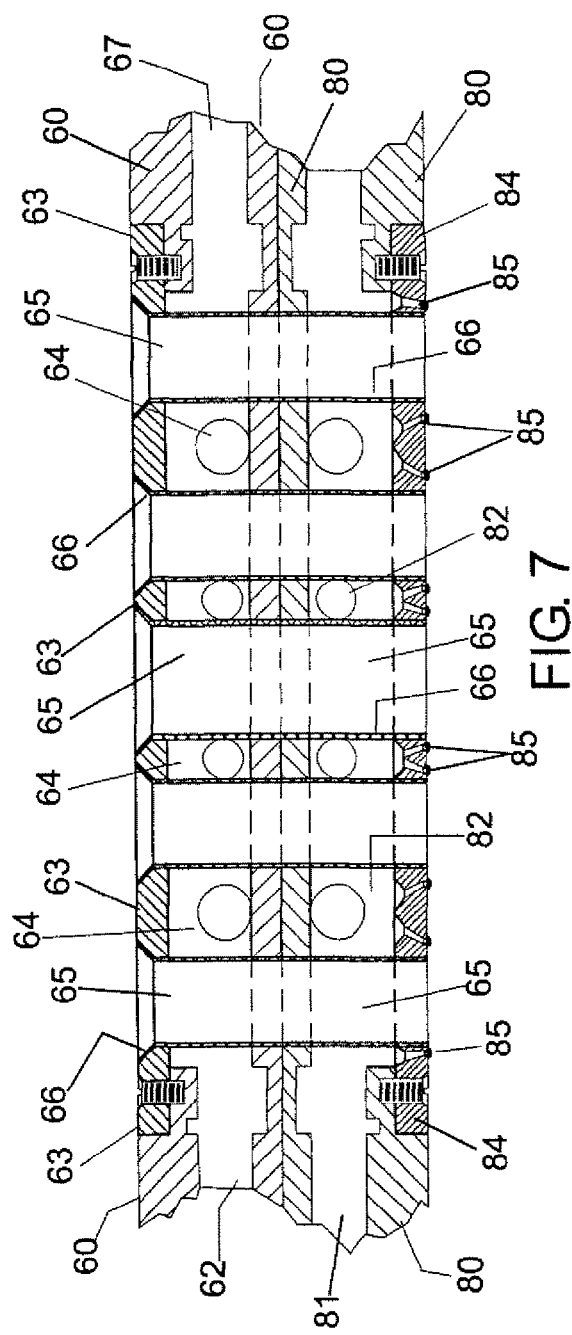
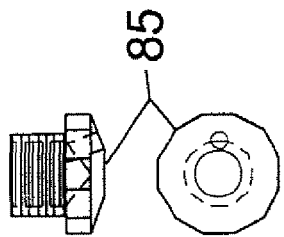
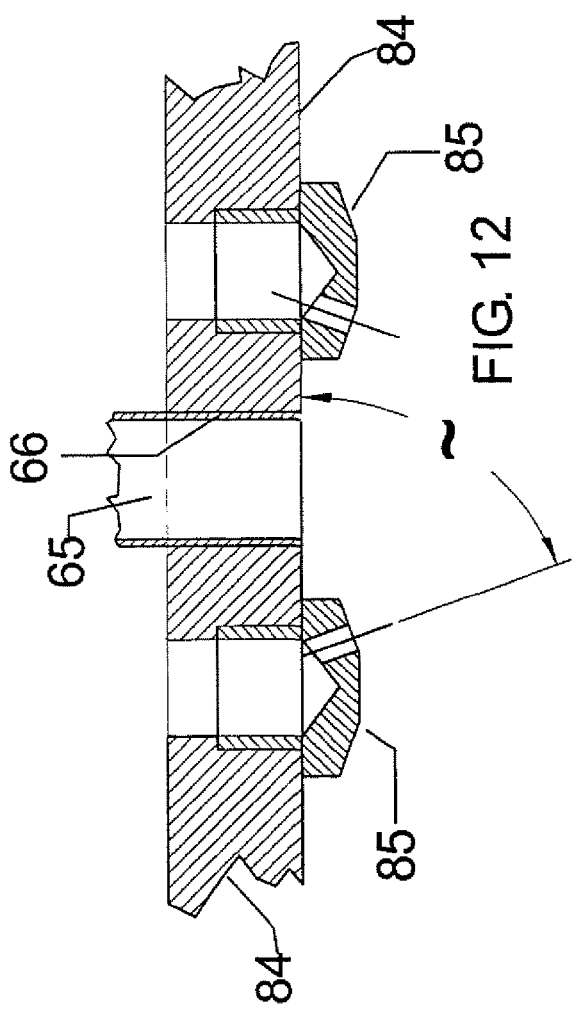

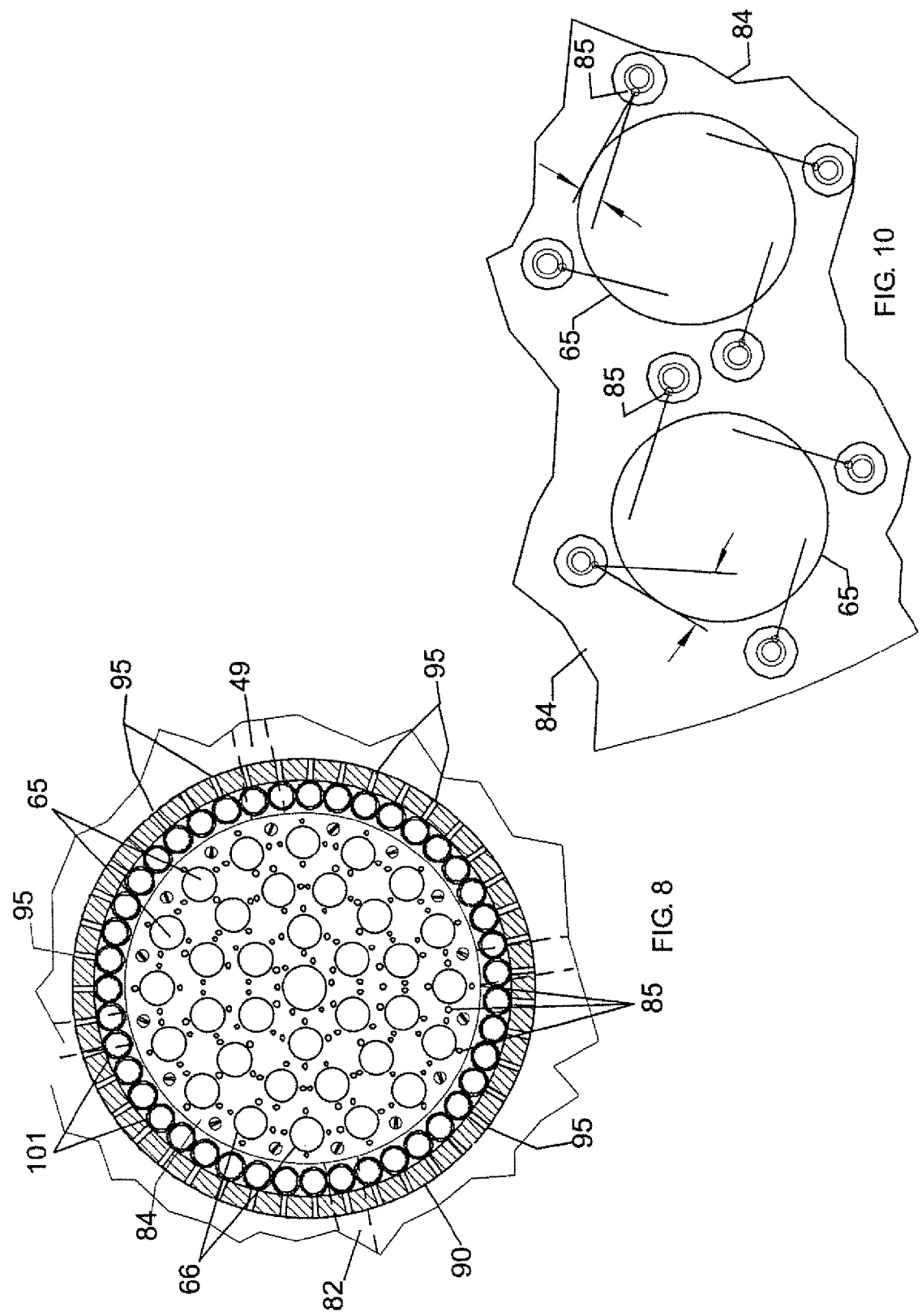

COMBUSTION METHODS AND FUELS FOR THE PRODUCTION OF ENERGY

CROSS-REFERENCE TO RELATED APPLICATIONS

This application is a continuation of International Application No. PCT/US2004/042193, filed Dec. 16, 2004, which claims benefit of U.S. application Ser. No. 10/738,422, filed Dec. 16, 2003, now U.S. Pat. No. 7,028,478. These applications are incorporated herein by reference in their entirety.

BACKGROUND OF THE INVENTION

This invention is generally in the field of combustion apparatus for burning fuels, and particularly combustion systems for creating steam and/or electric energy, and more particularly to combustions systems using waste products as a fuel source and waste disposal means.

Production of Electrical Power and Pollution

Electricity has conventionally been produced at power plants by electrical generators driven by gas turbines, steam turbines, hydroelectric dams, and large diesel engines. The steam use in these plants conventionally has been created by burning coal, oil or natural gas, or by nuclear reactors.

The world is currently facing a persistent and complex energy and electrical power crisis. Over the past 10 years, electrical power demand has increased by about 30%, while transmission capacity has increased only half that much. The demand for electricity and for the fuel used to produce electricity is projected to increase. With the worldwide growth of energy demand, sensible energy policy requires the careful balancing of three objectives: (a) low cost; (b) minimal environmental impact; and (c) security of supply. Energy security depends upon an ability to properly manage the economics, supply and environmental consequences of the energy sources used to produce electricity.

The United States currently produces electricity using several different fuels, including coal, which represents about 57% of the electrical supply, and nuclear energy, which represents about 20% of the electrical supply. The remainder is provided by natural gas-fired power plants, hydroelectric dams, and small amounts of renewable energy. Solar and fuel cell technologies are currently underdeveloped, and are expensive. Hydroelectric and wind powers are disadvantageously limited in use by geographic location. The energy industry has long been seeking more environmentally friendly, efficient, safe and cost effective alternatives to coal, natural gas and nuclear energy.

Coal-Burning Power Plants

Coal is a nonrenewable resource, and only approximately 200 years of mineable coal is left. The burning of coal is generally only about 20% efficient (only about 20% of the BTUs per pound in the coal are actually used to convert water into steam). Currently, some 40 million tons of coal are used annually for power generation.

Coal-burning power plants release millions of tons of toxic emissions into the atmosphere each year. The United States Public Interest Research Group recently reported that power plant air pollution is increasing, with a significant amount of the increase coming from coal-burning plants. While coal is relatively inexpensive to burn, it is one of the most impure fuels. Burned coal produces millions of pounds of "coal ash" and "fly ash," solid combustion waste materials that contain highly poisonous and/or radioactive chemicals, such as arsenic, uranium, mercury, lead and thorium. (The ash content ranges from about 5% to 15% of coal burned.)

Other environmental pollutants produced by conventional combustion-based power generation plants include sulfur dioxide ($SO_2$); other oxides of sulfur, such as SO, $SO_2$ and/or $SO_3$, collectively known as $SO_x$; nitrogen dioxide ($NO_2$), the major component in smog; nitric oxide (NO); other oxides of nitrogen, such as NO, $N_2O$ and/or $NO_2$, collectively known as $NO_x$; carbon monoxide (CO); carbon dioxide ($CO_2$); methane ($CH_4$); hydrochloric acid (HCl); dioxin; volatile organic compounds (VOCs), which cause smog and are harmful to plants and animals; various metals, such as zinc, thallium, cadmium, nickel and chromium; radioactive materials other than the isotopes uranium and thorium, such as radium, radon, polonium, bismuth and lead; other carcinogenic and/or mutagenic substances; and particulate matter, which is a criteria air pollutant.

Conventional coal-burning plants use air as the source of oxygen for combustion. However, air contains 76.9% by weight nitrogen ($N_2$) and 23.1% by weight oxygen ($O_2$), as well as some argon and $CO_2$. These non-oxygen components make air a non-ideal source for oxygen, as they can contribute to environmental pollutants, such as $NO_x$, $SO_x$, and CO.

Current U.S. regulatory requirements prescribe the amounts of atmospheric emissions that are permitted in particular locations by given power-generating plants. Allowable emission threshold levels are continually being decreased, which is placing increasing pressure on power-generating plants to reduce emissions.

Natural Gas Power Plants

Compared to coal and nuclear power plants, conventional natural gas-fueled power plants can be built at a relatively low cost. However, disadvantageously, these plants are extremely sensitive to increases in the price of fuel, which frequently occur as a result of problems with supply. Further, the burning of natural gas by conventional methods is generally only about 30% efficient (only about 30% of the energy value of the natural gas is actually used to convert water into steam). Moreover, high levels of the criteria air pollutant $NO_x$ are often emitted into the atmosphere from conventional natural gas-fueled power plants.

Inefficiency of Conventional Power Generation

The conventional generation of electrical power and heat separately (as opposed to cogeneration, trigeneration, and the like) is generally inherently inefficient, only converting about one third of a fuel's potential energy into usable energy. For example, traditional coal, oil or natural gas fired thermal generating stations generally do not convert more than about one third of the fuel's initial energy into useful electricity; the remainder is discarded as waste heat. There is a present need for safe, rapid, inexpensive, efficient and environmentally clean methods and apparatus for producing electrical power, and for producing steam and combustion gas exhaust products that can be used in the production of electrical power.

Disposal of Waste and Hazardous Materials

There is continuously an abundant supply of hydrocarbon waste materials on the earth. Every year, nearly 1600 pounds of trash are discarded per person, about 80% of which is placed into landfills. The landfill decomposition rates for many of these hydrocarbon materials are tens to hundreds of years. Scrap tires, plastic waste and textile and carpet waste are three types of hydrocarbon waste materials often placed into landfills.

Approximately 270 million tires (3.4 million tons) are discarded as scrap tires each year in the United States, with roughly 800 million tires waiting to be placed into landfills. Many states have banned the placement of whole tires and/or partial scrap tires in landfills. In order to avoid disposal fees or the effort required to legally dispose of scrap tires, many scrap tires are illegally dumped. These illegally dumped tires pose health and environmental problems, are unsightly, and create fire hazards. Adequate methods for properly disposing of scrap tires do not currently exist.

Approximately 75 billion pounds of plastic are produced each year in the United States. Examples of these plastics include polyethylene containers and products. The majority of plastic ends up in landfills, where decomposition takes many years. It would be desirable to provide better means of disposing of waste plastic.

The amount of carpet entering the waste stream is steadily increasing. About 96% of this waste is disposed in land fills. According to U.S. Environmental Protection Agency (EPA), approximately 14 billion pounds of textile and carpet waste is landfilled each year in the United States. Carpet takes over 50 years to begin to decompose, landfill space is diminishing, and many landfills no longer accept carpet. It would be desirable to provide better means of disposing of waste carpet.

There is currently a need for methods and apparatus to eliminate scrap tires and plastic, carpet textile and other hydrocarbon waste materials in a safe, rapid, inexpensive, efficient and environmentally clean manner.

There also is an increasing need to dispose of hazardous materials in a safe, effective, efficient, and cost effective manner. Examples of hazardous materials include infectious medical wastes; biological and chemical weapons, such as anthrax, nerve agents, and rockets or containment devices therefor; and hazardous air pollutants. The proper disposal of such materials is expensive and generally present a serious risk to the health of humans and other animals. Existing means for safely disposing of hazardous materials are undesirable. In many cases, this has entailed the dumping of the hazardous materials into deep landfill zones or encasing it in protective containers and then burying these containers in landfills or at sea. Other hazardous materials are disposed of by burning at trash dumps or commercial furnaces. However, depending upon the burning parameters, such destruction frequently is time-consuming, incomplete, and produces dangerous levels of noxious environmental pollutants. There exists a need for safe, rapid, inexpensive and efficient methods and apparatuses for the complete destruction of hazardous materials (rendering them non-hazardous) without producing unacceptable levels of environmental pollutants.

DESCRIPTION OF THE ART

U.S. Pat. No. 3,779,212 discloses a steam generating system that burns fuel in an atmosphere of pure oxygen to heat water in a heat exchanger for converting water to steam. It uses a single process, single combustion chamber. U.S. Pat. No. 4,915,038 discloses a method and a sudden expansion burner for incinerating fluidized or gaseous waste and hazardous materials entrained in air and combined with a another fuel.

U.S. Pat. No. 5,709,077, U.S. Pat. No. 5,970,702, and U.S. Pat. No. 5,680,764 disclose an apparatus for generating gas including steam and carbon dioxide from the combustion of a hydrocarbon gas with oxygen. U.S. Pat. No. 6,206,684 discloses a system for injecting combustible mixtures into a combustion chamber, including a steam generator injector designed to inject fuel, oxidizer and coolant water into a combustion chamber. U.S. Pat. No. 5,715,673 and U.S. Pat. No. 5,956,937 disclose large scale electrical power generation systems that use thermal energy from the combustion of a liquid or gaseous hydrocarbon fuel (propane, methane, natural gas or light alcohols) using liquid oxygen, and that are stated to be pollution-free, or to have low pollution. U.S. Pat. No. 6,247,316 and U.S. Pat. No. 6,170,264 disclose low pollution generators. These patents all disclose mixing cooling water with hot combustion gases that are generated by a combustion reaction in a single reaction/chamber, thereby producing a gaseous mixture of steam and carbon dioxide that is delivered to a turbine.

It would be desirable, however, for cooling water not to contact the combustion gas products, so that carbon dioxide does not have to be separated from the steam. It would also be desirable to avoid having the combustion gas exhaust products contact the turbines or electrical power-generating equipment, so as to minimize corrosion or other damage from ash or other incomplete combustion products. It would also be desirable to provide a combustion system useful with a variety of fuel types.

SUMMARY OF THE INVENTION

Apparatus are provided for use as a hydrocarbon combustion gas generator. In a preferred embodiment the apparatus comprises (a) a first combustion chamber in which a first combustion of fuel and oxidizer can be performed to produce an incomplete combustion product, the first combustion chamber having an inlet end and an outlet end; (b) control and metering means for separately metering a fuel and an oxidizer into the first combustion chamber to achieve an incomplete combustion of the fuel in the first chamber; (c) a second combustion chamber in which a second combustion of fuel and additional oxidizer can be performed to produce a second combustion product, the second combustion chamber having an inlet end and an outlet end wherein the inlet end of the second combustion chamber is in fluid communication with the outlet end of the first combustion chamber; (d) control and metering means for metering additional oxidizer into the second chamber combustion chamber to further combust fuel in the second chamber; (e) a means for metering into the second combustion chamber the incomplete combustion product produced in the first combustion chamber; and (f) a heat exchanger means for cooling the first and second combustion chambers and for optionally converting cooling water to steam, wherein the cooling water and steam are maintained separate from combustion gases produced by the first and second combustions. It preferably includes an electronic igniter system or other means for igniting the fuel in the first combustion chamber.

In one embodiment, the second combustion is a complete combustion. In one embodiment, the means for metering into the second combustion chamber the incomplete combustion product produced in the first combustion chamber comprises a plurality of tubular ports.

In another embodiment, the apparatus further includes (g) a third combustion chamber or space in which a third combustion of the fuel and additional oxidizer can be performed to produce a third combustion product; (h) control and metering means for metering additional oxidizer into the third chamber combustion chamber or area to further combust fuel in the third chamber or area; and (i) additional heat exchanger means for cooling the third combustion chamber or area and for optionally converting cooling water to steam, wherein the cooling water and steam are maintained separate from combustion gases produced by the third combustion. Optionally, it further includes a means for metering into the third combustion chamber the incomplete combustion product produced in the second combustion chamber. Preferably, air is not permitted to mix with the fuel or the oxidizer in the combustion chambers.

In various embodiments, the control and metering means for separately metering a fuel and an oxidizer into the first combustion chamber the fuel and the oxidizer comprises a plurality of orifices approximate the inlet end of the first combustion chamber. For example, the fuel, the oxidizer, or both can be metered into each of the combustion chambers or areas in an angled manner, resulting in at least one point of impingement between the fuel and the oxidizer.

The heat exchanger means can comprise a plurality of tubes forming one or more tube assemblies, having at least one cooling water inlet and at least one steam outlet. In one embodiment, the tube assemblies form walls defining one or more of the combustion chambers or areas.

Generally, the apparatus includes a source of oxidizer, such as LOX, O, $O_3$, $H_2O_2$ or HAN, and a source of one or more fuels. The control and metering means for separately metering a fuel can be adapted to separately meter two or more fuel types into the first combustion chamber. In one embodiment, at least one fuel is in solid particulate form, e.g., comprised of plastic, rubber, or other waste materials, and having a particle size ranging from about 31 to about 2300 microns. In one embodiment, at least one additional fuel is a liquid or gaseous fuel. Examples of suitable fuels include the EF-1, EF-2, ES-3, EF-4, EF-5, EF-6, EF-7, EF-8, EF-9, EF-10, EF-11, EF-12, EF-13, EF-14, EF-15, EF-16, EF-17 or EF-18 described herein. Using the apparatus, preferably from about 97% to about 100% of the fuel metered into the first combustion chamber is combusted by the apparatus.

In another aspect, a system is provided for generating electricity. This system comprises the combustion apparatus which generates steam, and an electrical power-generating device powered by said steam. For example, the electrical power-generating can comprise a steam-driven turbine. In preferred embodiments, the system can produce from about 1 to about 600 megawatts of electrical power per day. The system can be a cogeneration system, a trigeneration system, or a quadgeneration system.

In another aspect, a combustion process is provided which comprises supplying at least one fuel to the apparatus; supplying at least one oxidizer to said apparatus; and combusting said fuel and said oxidizer in said apparatus. In the process, the first combustion can occur at a temperature ranging from about 1200° F. to about 5800° F., at a pressure ranging from about 500 to about 1500 psig and during a period ranging from about 0.025 to about 10 seconds. The second combustion can occur at a temperature ranging from about 3000° F. to about 5800° F., at a pressure ranging from about 300 to about 1500 psig and during a period ranging from about 0.025 to about 10 seconds. Preferably, the combustion gas exhaust product contains no, or negligible quantities of, mercury, SO, $SO_2$, $SO_3$, NO, $NO_2$, $N_2O$, CO, $CH_4$, HlCl or dioxin.

The oxidizer preferably comprises LOX. The fuel can comprise a non-waste material, such as wood, coal, hydrogen, methane, ethane, butane, propane, natural gas, gasoline, diesel fuel, kerosene, fuel oil, methanol, alcohol, a product that contains plastic, mixed plastic or plastic resin, or a combination thereof.

In another aspect, a method is provided for disposing of hazardous or waste materials. It comprises supplying a fuel to the apparatus, wherein the fuel comprises at least one hazardous or waste material; supplying at least one oxidizer to said apparatus; and combusting said fuel and said oxidizer in said apparatus. Examples of hazardous material include infectious medical waste, biological or chemical weapons, components thereof, or a container therefor. Examples of waste material comprises scrap tires, plastic packaging materials, or components thereof.

BRIEF DESCRIPTION OF THE DRAWINGS

FIG. 4 is a cross-sectional view of the first oxidizer manifold 41, the first oxidizer manifold plate 40, the first oxidizer injector orifices 46, the first fuel ports 34, the first fuel port tubes 36, the flame tubes 29, and the first transfer injector plate 44 of the hydrocarbon combustion gas generator apparatus shown in FIG. 1.

FIG. 7 is a cross-sectional view of the second superheated steam outlet 67, the second water inlet 62, the feed water manifold 64, the first water manifold plate 60, the fuel wear plate 63, the second fuel ports 65, the second fuel port tubes 66, the second oxidizer inlet 81, the second oxidizer manifold 82, the second oxidizer manifold plate 80, the second oxidizer injector orifices 85, and the second transfer injector plate 84 of the gas generator shown in FIG. 1.

FIG. 8 is a cross sectional view of the second oxidizer manifold 82, the second oxidizer injector orifices 85, the second transfer injector plate 84, the second fuel ports 65, the second fuel port tubes 66, the oxidizer transfer tube 49, the second outer housing 90, and the individual water tubes of the second tube assembly 101 of the gas generator shown in FIG. 1, with excess oxidizer leading toward the oxidizer transfer tube 49, looking from the second combustion chamber 100 toward the first combustion chamber 70 and taken along plane 8-8 of FIG. 1.

FIG. 10 is a detailed view of the second transfer injector plate 84, the second fuel ports 65, and the second oxidizer injector orifices 85 shown in FIG. 8.

FIG. 11 is a cross-sectional view of the first transfer injector plate 44, the first oxidizer injector orifices 46 and the first fuel port tubes 36 shown in FIG. 4.

FIG. 12 is a detailed view of the second transfer injector plate 84, the second oxidizer injector orifices 85, the second fuel ports 65, and the second fuel port tubes 66 shown in FIG. 7.

FIG. 13 is a detailed view of the second oxidizer injector orifices 85 shown in FIGS. 7 and 12.

DETAILED DESCRIPTION OF THE INVENTION

Figure 1:
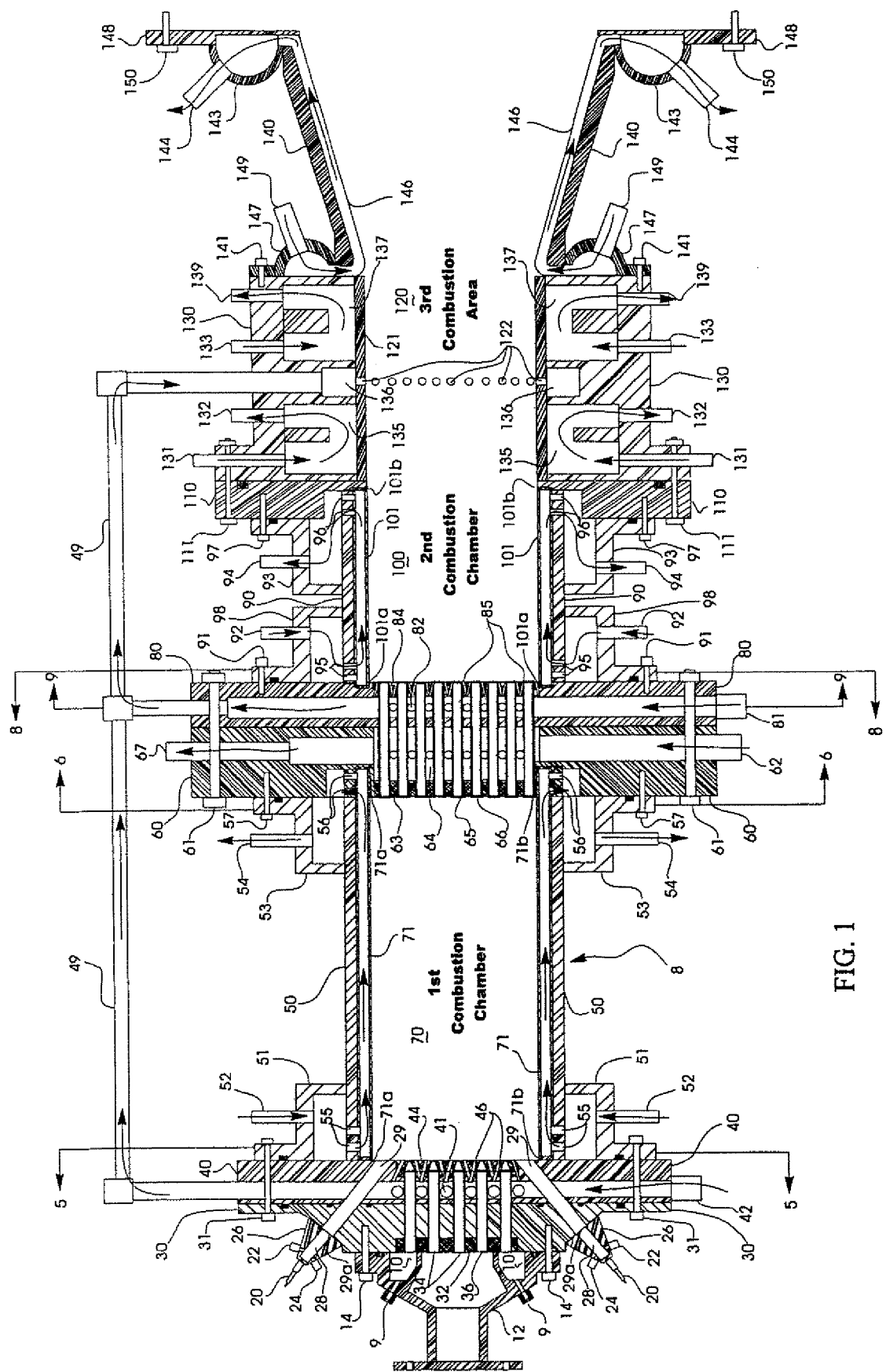
FIG. 1 is a cross-sectional view of one embodiment of the hydrocarbon combustion gas generator described herein. Line 5-5 represents the cross-sectional plane of the generator shown in FIG. 5. Likewise, Lines 6-6, 8-8, and 9-9 represent the cross-sectional planes of the generator shown in FIGS. 6, 8, and 9, respectively.

Methods and apparatuses have been developed for safely, rapidly, cost-effectively, and efficiently generating high-energy, high purity steam in an environmentally clean manner from a variety of hydrocarbon fuel sources. Preferably, the fuel source is a waste material, such as the rubber from scrap tires, discarded carpet, waste plastic, or hazardous waste. The steam can be used to generate large quantities of electrical power without corroding or otherwise damaging turbines, condensers or other electrical power-producing equipment or devices. In another aspect, the present methods provide for the disposal of hydrocarbon waste materials in a safe, rapid, cost-effective, efficient and environmentally clean manner, diverting the waste from landfills.

Advantageously, the processes can simultaneously or consecutively (a) produce a superheated steam product or dry saturated steam product that can be used to produce electrical power when introduced into an electrical power-generating device or system; and (b) transform hazardous materials into non-hazardous materials.

To enable these processes, a combustion generator has been developed that is operates using a non-air oxygen source, and includes a multi-chamber combustor in which cooling water is not directly mixed with the combustion gases. The apparatus thereby provides for complete combustion of the fuel while generating a highly pure steam product which need not undergo a separation process to separate it from the combustion product carbon dioxide. The hydrocarbon combustion gas generator generally includes: (a) one or more means for receiving a liquid or gaseous oxidizer, wherein the oxidizer is not air; (b) one or more means for receiving a hydrocarbon fuel; (c) a means for metering the oxidizer and the fuel into a first combustion chamber in an oxidizer/fuel mixture ratio, and under conditions, that can cause an incomplete combustion of the fuel in the first combustion chamber upon its ignition, including inlet means and distribution means for the oxidizer and for the fuel; (d) one or more means for igniting the fuel and the oxidizer in the first combustion chamber; (e) a means for metering additional oxidizer and the combustion gas product produced in the first combustion chamber into a second combustion chamber or area in an oxidizer/fuel mixture ratio, and under conditions, that can cause the complete combustion of the fuel in the second combustion chamber or area, including inlet means and distribution means for the additional oxidizer and for the combustion gas product produced in the first combustion chamber; (f) a means for containing the combustion gas products produced in the first combustion chamber and in the second combustion chamber in a controlled flow; (g) a means for a combustion gas exhaust product to exit the hydrocarbon combustion gas generator; (h) a means for introducing water to one or more areas or components of the hydrocarbon combustion gas generator that are positioned in contact with, or in a sufficiently close proximity to, one or more exterior surfaces of one or more walls of one or more combustion chambers or areas, wherein the water cools said walls and thereby preserves the structural integrity of the combustion chambers or areas, and wherein at least some of the water is converted to a steam product that does not contact and is maintained separate from the combustion gas exhaust product, including water inlet means and water distribution means; and (i) a means for the steam product to exit the hydrocarbon combustion gas generator separately from the combustion gas exhaust product.

The hydrocarbon combustion gas generator optionally can include a third (and more) combustion chamber. In such embodiments, the generator would include a means for metering additional oxidizer and the combustion gas product produced (which in this case would be incompletely combusted) in the second combustion chamber or area into a third combustion area (or chamber) in an oxidizer/fuel mixture ratio, and under conditions, that can cause a complete combustion of the fuel in the third combustion chamber or area (or an incomplete combustion of the fuel in the third combustion chamber or area if one or more additional combustion chambers or areas is present in the hydrocarbon combustion gas generator), including inlet means and distribution means for the additional oxidizer and for the combustion gas product produced in the second combustion chamber or area. If the gas generator has more than three combustion chambers or areas, the hydrogen combustion gas generator will generally also have additional components and conditions that correspond with those described above. Generally, a combustion gas exhaust product resulting from a complete combustion of a fuel (or of some other material, such as a waste material or a hazardous material) will exit from the last (most downstream) combustion chamber or area that is present in a hydrocarbon combustion gas generator of the invention, A variety of mixtures can be used as fuels in the processes and apparatuses described herein. The mixtures have a weight percent (wt %) of 100, contain the element hydrogen, the element carbon, or the elements hydrogen and carbon, and contain two or more of the following components: from about 0 to about 99 (wt %) of carpet; from about 0 to about 99 wt % hydrogen; from about 0 to about 99 wt % polystyrene; from about 0 to about 99 wt % polyethylene terephthalate; from about 0 to about 99 wt % polyester polyethylene terephthalate; from about 0 to about 99 wt % high-density polyethylene; from about 0 to about 99 wt % low-density polyethylene; from about 0 to about 99 wt % polypropylene; from about 0 to about 99 wt % polyurethane; from about 0 to about 99 wt % Nylon 6,6; from about 0 to about 99 wt % Nylon 6; from about 0 to about 99 wt % polyvinyl chloride; and from about 0 to about 99 wt % tire rubber, wherein the mixtures have an ability to function as fuels in the present processes and apparatus. Preferably, solids are mixed with other solids, liquids are mixed with other liquids, and gases are mixed with other gases.

DEFINITIONS

As used herein, the terms "comprise," "comprising," "include," and "including" are intended to be open, non-limiting terms, unless the contrary is expressly indicated.

The phrase "aft end" as used herein in relation with the hydrocarbon combustion gas generator, or with any of the components thereof, means that end of the gas generator, or of a component thereof, that is closer to the location in which a combustion gas exhaust product exits the gas generator.

When viewing the accompanying drawings, the aft end will be the right end of the combustion gas generator, or of the components thereof, The phrases "austenitic steel" and "austenitic stainless steel" as used herein refer to steels that are generally non-magnetic and non heat-treatable, and that are usually annealed and cold worked, generally have excellent corrosion and heat resistance qualities with good mechanical properties over a wide range of temperatures. Austenitic steel grades include CH-20, CK-20 and CN-7M.

The abbreviation "BTU" as used herein means British Thermal Unit.

The term "cogeneration" as used herein means the simultaneous production of thermal energy and electrical or mechanical power from the same fuel in the same facility. It is also referred to as "combined heat and power," and can be produced by a combined heat and power system (CUP). With a cogeneration fuel-fired thermal generating station, it is possible to capture and harness initial energy contained within the fuel used in the station that is not converted into electrical power and that would otherwise be discarded as waste heat, for example, using a waste heat recovery boiler.

The phrase "combustion efficiency" ($n_c$ or $E_c$) as used herein means a measurement (in %) that indicates the ability of an apparatus or system to convert a particular fuel into useable heat energy over a specific operating period. For fuel-fired systems, this phrase is defined as the ratio of the fuel energy input minus the flue gas losses (dry flue gas, incomplete combustion and moisture formed by combustion of hydrogen) to the fuel energy input. In the United States, fuel-fired combustion efficiencies are reported on the basis of the higher heating value of the fuel. Other countries, however, report fuel-fired combustion efficiencies based upon the lower heating value of the fuel. The combustion efficiency of a fuel-fired system will generally be higher than the thermal efficiency. A complete combustion efficiency (100%) is one in which all (100%) of the energy available in a fuel is extracted. Combustion efficiency calculations assume complete fuel combustion.

The phrase "criteria air pollutant" as used herein means a common air pollutant that can injure health, harm the environment, and/or cause property damage, and that is regulated by the EPA using criteria (scientific guidelines based upon the health and/or environmental effects of the air pollutant) as the basis for setting permissible levels. Criteria air pollutants include CO, $NO_x$, $SO_2$, and particulate matter.

The phrase "downstream" as used herein means leading toward the aft end of a hydrocarbon combustion gas generator.

The phrases "environmentally clean" or "environmentally cleaner" as used herein in connection with the present processes, apparatuses, and fuels mean that, without requiring pollution control equipment, one or more (e.g., all) of the products produced using said processes, apparatuses, and/or fuels, such as superheated steam products, dry saturated steam products, and/or combustion gas exhaust products: (1) produces or contains no environmental pollutants or hazardous materials; (2) produces or contains no hazardous materials, and only produces or contains the environmental pollutant $CO_2$ (i.e., it does not produce or contain any other environmental pollutants); (3) produces smaller quantities of hazardous materials in comparison with nuclear power plants or systems that produce the same amount of energy or electrical power; and (4) produces or contains smaller quantities of one or more environmental pollutants and/or hazardous materials in comparison with the quantities of environmental pollutants and/or hazardous materials produced by, or contained in, one or more products produced by one or more fuel-burning processes, apparatuses and/or systems for producing steam, energy or electrical power that (i) use air therein or permit air to come into contact with fuel, oxidizer and/or water used therein, with combustion gases produced thereby, and/or with components thereof (such as conventional coal-burning steam production systems and plants, conventional coal-burning electrical power production systems and plants, conventional natural gas-burning steam production systems and plants and conventional natural gas-burning electrical power production systems and plant); and (ii) are capable of producing the same amount of superheated steam product dry saturated steam product, other forms of steam, thermal or other energy or electrical power and/or employ the same fuel and the same quantity of the fuel.

The phrases "environmental pollutants" and "pollutants" as used herein mean materials that can contaminate or damage any part of the environment (air, water, soil and the like), and includes air pollutants, such as criteria air pollutants, water pollutants, and soil pollutants. Environmental pollutants may or may not also be hazardous materials. Environmental pollutants include oxides of sulfur ($SO_x$), such as sulfur dioxide ($SO_2$), oxides of nitrogen ($NO_x$), such as nitric oxide (NO), nitrogen dioxide ($NO_2$), nitrous oxide ($N_2O$), carbon monoxide (CO), carbon dioxide ($CO_2$), hydrochloric acid (HCl), methane ($CH_4$), volatile organic compounds (VOCs), dioxin, ammonia ($NH_3$), benzene, hydrogen fluoride, hydrogen sulfide, poly-aromatic hydrocarbons (PAH), hexachlorobutadiene, ethylene dibromide, mercury, arsenic, uranium and thorium, and isotopes thereof, and radioactive products produced by the decay of uranium and thorium, such as radium, radon, polonium, bismuth and lead, particulate matter and other radioactive chemicals or substances.

The phrase "exhaust system" as used herein means one or more components of an apparatus through which one or more combustion gas exhaust products are discharged, with or without other products (into the atmosphere, or into another system or apparatus, such as a $CO_2$ recovery system).

The phrases "ferritic steel" and "ferritic stainless steel" as used herein mean magnetic steels that contain chromium but not nickel, and the structure of which consists largely of ferrite. These steels generally have good heat and corrosion resistance and good resistance to stress corrosion cracking. Ferritic steel grades include CB-30 and CC-50.

The phrase "forward end" as used herein in relation with the present hydrocarbon combustion gas generator, or with any of the components thereof, means that end of said generator or component closer to the location in which fuel enters into the generator. When viewing the accompanying drawings, the forward end is the left end of said generator or component.

The phrase "fuel rich" as used herein means that a mixture of fuel and oxidizer contains more fuel than can be 100% combusted by available oxidizer.

The phrase "hazardous material" as used herein means any solid, liquid and/or gaseous substance or combination thereof, such as entrained particles or slurries, that presents a health risk (e.g., risk of illness, disease, injury, or death) or other danger to human beings, animals, aquatic life forms (e.g., fish, whales, sea turtles), and/or flying life forms (e.g., birds, bats), including hazardous air pollutants, chemical warfare agents (VX, Tabun, Sarin, Soman, Mustard Gas, etc.), VOCs, infectious medical wastes, needles and other items that have contacted infectious diseases, anthrax spores, biological weapons, carcinogenic agents, mutagenic agents, and/or radioactive agents. Hazardous materials may be environmental pollutants.

The abbreviation "HCGG" as used herein means a hydrocarbon combustion gas generator of the present invention.

The term "hydrocarbon" as used herein means the inclusion of either or both of the elements carbon and hydrogen and, optionally, containing other elements, such as nitrogen, chlorine, sulfur, oxygen and other elements.

The phrases "hydrocarbon material" and "hydrocarbon-based material" as used herein mean any solid, liquid or gaseous chemical compound, substance or material, or blend or other combination thereof, including waste and non-waste items, that includes a hydrocarbon.

The phrase "interface" as used herein means a surface, or portion thereof, that forms a common boundary between adjacent or otherwise connected regions, bodies or substances (i.e., the location at which two items touch or meet).

The term "interior" as used herein means a part or surface that is, or is facing, inside (away from the exterior). For example, the interior surface of a sidewall of a combustion chamber or area faces toward the inside of the combustion chamber or area.

The term "igniter" as used herein means a device, assembly or system that releases heat and, thereby, initiates a reaction of one or more fuels and one or more oxidizers.

The phrase "lower portion" as used herein in relation with a hydrocarbon combustion gas generator of the invention, or with a component thereof, means that portion of the hydrocarbon combustion gas generator, or of a component thereof that is closer to the combustion chambers or areas present in the hydrocarbon combustion gas generator.

The abbreviation "LOX" as used herein means liquid $O_2$.

The term "manifold" as used herein means a structure, such as a pipe or chamber, that contains one or more separate or interconnecting feed paths or other openings, which may produce any of a series of numerous different patterns (like a snowflake), and which may have a variety of different shapes (circular or ring-shaped, oval-shaped, square-shaped, rectangular-shaped, triangular-shaped, etc.), for receiving a gaseous, liquid and/or solid (in a size reduced form) substance or material, such as a fuel, an oxidizer, water, steam or the like, directly or indirectly from one or more supply or other sources, such as a fuel, oxidizer, water, steam or other storage tank, and/or for distributing or otherwise supplying the substance or material to an apparatus, or to a component thereof, such as to a combustion chamber of the present hydrocarbon combustion gas generator.

The phrase "to meter" as used herein means to permit a substance or material, whether a solid, liquid, gas, or a blend or other combination thereof to flow or otherwise travel from one location to another location, and/or from one component of an apparatus or system to another component of an apparatus or system, at a specified rate, for example, at 10 lbs/s.

The phrase "mixed plastics" as used herein includes co-mingled plastics (a combination of two, three, or more types of plastics), composites, laminates, and other multi-component materials.

The phrases "O/F ratio" and "O/F mixture ratio" as used herein mean the ratio of oxidizer to fuel in a mixture of oxidizer and fuel that is used in a particular area or component of the HCGG, such as a first combustion chamber, a second combustion chamber or area, a third combustion chamber or area or a fourth combustion chamber or area, in an ignition device or system, or in a particular step of a method. The O/F ratio may be varied in a manner known by one skilled in the art to render a mixture of oxidizer and fuel "fuel rich," "fuel lean" or "stoichiometric" in any of one or more combustion chambers or areas of a HCGG.

The phrase "particulate matter" as used herein means solid particles (or a mixture of solid particles and liquid droplets or other materials or substances) that generally range in size from fine particles (less than about 2.5 µm diameter) to coarse particles (larger than about 2.5 µm in diameter), and that are environmental pollutants and/or hazardous materials. Particulate matter, such as PM-10 (fine particulates) and PM-2.5 (ultrafine particulates), is generally emitted from conventional coal- and other fuel-burning electrical power plants, and often carries heavy metals and/or cancer-causing organic compounds into the lungs of human beings and animals, thereby increasing the incidence and severity of respiratory diseases. Particulate matter includes dust, smoke, soot, ash (coal ash, fly ash and other types of ash), the non-combustible material present in coal and other tiny bits of solid materials that are released into, and/or move around in, the air. Ultrafine particulates are primarily nitrates and sulfates formed from $NO_x$ and $SO_x$ emissions.

The term "plastic" as used herein means any of a wide variety of complex organic compounds that are generally produced by polymerization, and capable of being molded, extruded, cast into various shapes and/or films and/or drawn into filaments used as textile fibers, and includes thermoplastic and thermoset polymeric materials derived from petroleum products or biologically derived polymers. Representative examples include polyethylene (e.g., LDPE and HDPE), polypropylene, polybutylene, polystyrene, polymethylpentene, polyurethanes, polyvinyl chloride, unsaturated polyesters or epoxies, polycarbonate, nylons, polyethylene terephthalate (PET), and acrylonitrile-butadiene-styrene.

The phrases "Process Engineered Fuel" and "PEP" as used herein mean a fuel product that is manufactured from post-use paper and plastics derived from residential, commercial and industrial sources, which are used as an industrial fuel, and which generally contains 70-90% paper with the remaining percentage being plastic. PEF is usually present in a densified form, such as pellets, and is often derived from source-separated feedstocks. In comparison with Refuse Derived Fuel, PEF is more refined, has a lower ash content, has a lower moisture content and has a higher heating value, which is due to its plastics content. PEF can generally be used in existing energy facilities, without a need for dedicated plants. There is, thus, generally a larger pool of potential combustors for Process Engineered Fuel than for Refuse Derived Fuel. Further, when PEF is used, the significant capital investment for existing facilities will generally have already been made, which should improve the economics of PEF utilization. Additional information concerning PEP, and its manufacture, is present at www.plasticsresource.com.

The terms "Refuse Derived Fuel" and "RDF" as used herein mean a fuel that generally consists of minimally processed municipal solid waste, and that is usually in a shredded form.

As used herein, the term "scrap tire" refers to a tire that is no longer suitable for its original purpose, including worn, defective, or damaged tires.

The term "source" as used herein means any place or object, such as an electrical power plant, a chemical plant, or a motor vehicle, from which one or more environmental pollutants are released.

The phrase "stainless steels" as used herein means high-alloy steels that generally have superior corrosion resistance in comparison with other steels because they contain large amounts of chromium (generally from 4-30%, and usually around 10%). Stainless steels can be divided into three basic groups based on their crystalline structure: austenitic, ferritic and martensitic.

The phrase "steam purity" as used herein means the amount of solid, liquid or vaporous contamination (non-water components) that is present in a steam, and is generally reported as total solids in parts per billion (ppb). Steam contamination can cause superheater overheating, corrosion and/or failure, steam line and expansion joint cracking, turbine control valve sticking, turbine blade deposits and erosion, turbine disk cracking, and the contamination of products and conditioned air. Operating pressures of up to 1500 psig (105 kg/cm$^2$) and steam temperatures of up to 1100° F. (590° C.) are available providing steam purity as low as 5 ppb entrained solids. Steam scrubbing equipment that can provide the desired steam purity for a particular application is available from ABCO Industries (Abilene, Tex.).

The phrase "steam quality" as used herein means the amount of moisture that is present in the steam. It is the weight of dry steam in a mixture of steam and water droplets, generally reported as a percentage. If the steam contains no moisture, the steam is 100% quality. Steam quality relates to steam purity because liquid droplets that may be present in steam often contain dissolved solids, potentially causing steam contamination. The moisture by itself can also be harmful. AECL Research (Manitoba, Canada) has an instrument that can measure steam quality and mass flowrate.

The phrases "stoichiometric ratio" and "stoichiometric oxidizer to fuel mixture ratio" as used herein mean that, in a combustion process, an ideal ratio of oxidizer to fuel is obtained. A stoichiometric oxidizer to fuel mixture ratio may be used to produce a stoichiometric combustion reaction, with this ratio depending upon the particular fuel and the particular oxidizer that are chosen for use. For example, if the fuel is methane and the oxidizer is oxygen, a stoichiometric oxidizer to fuel mixture ratio would be two to one by gas volume (or four to one by weight). A stoichiometric oxidizer to fuel mixture ratio for a particular oxidizer and fuel may readily be determined by one skilled in the art.

The phrase "thermal efficiency" as used herein means the ratio of heat absorbed by water (or by water and steam) or air to the heat value of the energy consumed. It is a measure of the rate at which heat exchange surfaces transfer heat to the transfer medium (generally water or air). The thermal efficiency is calculated by determining the flue gas losses as a percent of fuel burned [$E_c$=1–fluc gas losses]. A complete thermal efficiency is often not achievable due to stack loss, boiler shell losses and like factors. Different types of heat movement impact thermal efficiency. Conductive/convective heating surfaces (also referred to as secondary or indirect heating surfaces) include all surfaces exposed only to hot combustion gases. Radiant heating surfaces (also called direct or primary heating surfaces) consist of heat exchanger surfaces directly exposed to radiant heat from a flame. Radiant heat transfer is generally more effective than conductive/convective heat transfer, and is the heat transfer that occurs in a boiler or forced air system.

The terms "Tire Derived Fuel" and "TDF" as used herein mean fuel that is derived from whole or processed scrap tires. It includes the rubber portion of tires that has been ground, shredded, or chipped, for example, to a size of two inches or smaller. Generally, TDF is a compact and consistent composition, and has a low moisture content.

The term "trigeneration" as used herein means the simultaneous production of three different forms of energy from the primary energy source, namely, heating, cooling and electrical power generation. It is also referred to as "combined heating, cooling and power generation." A typical trigeneration facility consists of a cogeneration plant and a vapor absorption chiller that produces cooling by making use of some of the heat recovered from the cogeneration system. The products of a trigeneration system are generally steam, hot water, chilled water and electricity.

The phrase "upper portion" as used herein in relation with a hydrocarbon combustion gas generator of the invention, or with a component thereof, means that portion of the hydrocarbon combustion gas generator, or of a component thereof that is further away from any of the combustion chambers or areas present in the hydrocarbon combustion gas generator.

The phrase "upstream" as used herein means leading toward the forward end of a hydrocarbon combustion gas generator of the present invention, or of a component thereof.

The phrase "wet steam" as used herein means steam that contains water molecules (i.e., mist, moisture) that has not evaporated. As a result of the liquid water therein, wet steam is often corrosive to metal parts, such as the metal blades on a steam or other turbine. Wet steam also has a lower thermal transfer efficiency in comparison with superheated steam. To improve steam quality, wet steam can be superheated to create superheated steam using a conventional circulation heater.

The term "zone" as used herein means a point, line or area in which oxidizer and fuel intersect, mix, ignite and/or travel together, for example, in or through a combustion chamber and/or area.

Fuel

One or more fuel supply control means permits the initiation, termination and/or regulation of one or more supplies of fuel, which may be the same or different, which may be solid, gaseous, liquid or a combination or other blend of more than one solid, gas and/or liquid, and which may be compatible or incompatible, to the present apparatuses. The fuel supply control means may include a fuel line that is attached to a source of fuel and a pump, or any other suitable system for achieving the same results.

Any hydrocarbon material or combination of such materials, whether solid, liquid, gaseous, or a combination thereof, that is capable of burning may be used in any weight percent (from 0% to 100%) as a fuel, or as a component in a fuel blend or other mixture, in the present processes and apparatuses. Such materials include Process Engineered Fuel, Engineered Fuel, Refuse Derived Fuel, Tire Derived Fuel, hydrocarbon and other non-waste materials, and hydrocarbon and other waste materials. Such materials may be hazardous or non-hazardous materials, may contain sulfur and/or nitrogen, and may contain one or more additives, such as anti-fungal substances or agents or anti-freeze substances or agents.

Examples of non-waste materials that may be used include wood, coal, methane, other natural gas, gasoline, diesel fuel, kerosene, fuel oils (any of the different grades), hydrogen, ethane, butane, propane, alcohol, plastic items, mixed plastics, or a blends thereof.

Examples of hydrocarbon waste materials include the non-metal components of scrap tires, carpet scraps and discarded carpeting, household or residential waste, Styrofoam items, commercial waste, municipal waste, industrial waste, used cooking oils, used manufacturing oils, used motor oils, wood waste, agricultural waste (both plant and animal), human and animal excrement, paper and paper mill waste, lumber mill waste, sugar mill waste (e.g., bagasse), oil-refinery residues, automobile industry waste (plastic vehicle bumpers, carpeting and the like), harbor-dredged muck, and mixtures thereof. In particular, discarded plastic beverage bottles and plastic packaging can be used as the hydrocarbon waste material.

The energy or heating values of different materials are known or can be readily determined. The fuel preferably has an energy value ranging from about 3,000 to about 55,000

BTU/lb, more preferably from about 8,000 to about 40,000 BTU/lb, with about 32,000 BTU/lb being most preferred, In order to minimize or eliminate the quantity of environmental pollutants and/or hazardous materials in the combustion gas exhaust products produced by the present processes and apparatuses, the fuel materials preferably do not contain (1) substances (e.g., sulfur, sulfides and/or nitrogen) that can form environmental pollutants or hazardous materials (e.g., $NO_x$, $NO$, $NO_2$, $N_2O$, $SO_x$, $SO_2$, HCl, and CO), or (2) metals (e.g., arsenic, lead, mercury, plutonium, radon or uranium), and preferably do not produce particulate matter, such as ash, when combusted. Accordingly, it is preferable that hydrocarbon materials other than coal, nylon 6, nylon 6,6 or rubber from scrap tires be used as a component of the fuel, given the nitrogen content of these materials. These non-preferred components can be removed by one or more separation or fuel cleaning processes prior to combustion, However, if the combustion gas exhaust products produced by the present methods and apparatuses do contain nitrogen and/or sulfur, these components of the combustion gas exhaust products can be removed (e.g., scrubbed out) using known pollution control equipment.

A variety of types of wood can be used as fuels. Many types of wood do not contain sulfur or nitrogen. Typical residential solid waste also may include only small quantities of nitrogen and/or sulfur.

The present processes and apparatuses preferably use a fuel comprising one or more waste material, due to the following advantages: It decreases the space in landfills that would otherwise be occupied by the waste materials; it is generally available in an abundant supply; it often can be obtained free of charge; and unlike most fuels, it should provide an additional source of revenue (e.g., in the form of waste disposal fees, recycling fees, tipping fees and/or end user fees (fees paid to the user for accepting, removing, disposing of and/or otherwise recycling the waste materials).

Solid fuels (in a size reduced form) are preferred for use in the present processes and apparatuses. Examples include discarded carpeting, carpet scraps, plastic beverage container, and a blend of tire rubber and carpeting and/or carpet scraps.

Scrap tires are mainly composed of hydrocarbons and scrap steel, and generally contain low quantities of nitrogen. Eighty percent of scrap tires is generally composed of carbon and oxygen. Scrap tires generally have a lower percent of sulfur than most coals. The sulfur present in scrap tires ranges from 1.24 to 1.30 wt %, whereas the sulfur present in coal ranges from 1.1 to 2.3 wt % or higher, depending upon the type and quality of the coal.

When using scrap tires as a fuel, it is preferable to use the hydrocarbon material present in the scrap tires, which can be processed by conventional methods into ground (or other size reduced forms) rubber, and not the scrap steel, so that heavy metals (such as arsenic, barium, cadmium, chromium, lead, mercury, selenium and/or silver) do not become present in the combustion gas exhaust or other products produced by these process and apparatuses. The resulting hydrocarbon material can generally be vaporized by the present processes and apparatuses into its most basic atomic or molecular structures, primarily the non-polluting and non-hazardous hydrogen, carbon and oxygen gases, and water vapor. Various forms of Tire Derived Fuel are commercially available.

Plastics have a high energy content, typically the highest energy value in modern waste-to-energy incineration processes and apparatuses. Thus, plastics are preferred solids for use as fuels and fuel components in the present processes and apparatuses.

Carpet, which include woven and non-woven (composite textile) carpets, typically include nylon, polypropylene (olefin), polyester and wool, with other fibers including cotton and acrylic. The yarn used in forming the pile of a tufted carpet can be made of nylon, acrylics, wool, cotton and the like, with nylon 6 and nylon 6,6 being the most commonly used fiber material for the carpet face itself. Carpet pads are produced from foam, fiber (man-made or synthetic) and rubber, e.g., rebond pad, which is made from scraps of foam used in furniture. Most carpets have a primary and a secondary backing, which are typically made from plastic, Latex glue is generally placed between the carpet backings to hold the tufts of carpet fiber together. Automobile carpet generally contains fiber-forming polymers, predominantly nylon 6 and nylon 6,6, polypropylene, polyethylene, polyester, acrylics, ethylene-vinyl acetate copolymer, filled ethylene-vinyl acetate copolymer and $BaSO_4$. Carpet waste generally contains more than one polymeric material. Ethylene-vinyl acetate copolymer is a major component of carpet scrap.

A typical carpet scrap that can be used as a fuel for use in the present processes and apparatuses has an energy value of about 15,522 BTU/lb and comprises: (a) from about 10 to about 24 ounces per square yard of the face component nylon 6 or nylon 6,6; (b) from about 3 to about 4 ounces per square yard of the primary backing polypropylene or polyester; (c) from about 8 to about 12 ounces per square yard of the precoat poly(ethylene-co-vinyl acetate) or low density polyethylene; and (d) from about 30 to about 136 ounces per square yard of the back coat filled poly(ethylene co-vinyl acetate).

A preferred formulation of fuel derived from carpet scrap material for use in the processes and apparatuses of the invention comprises from about 0 to about 35% nylon 6 and/or nylon 6,6, from about 0 to about 55% polypropylene, from about 0 to about 35% polyester, from about 0 to about 18% polyethylene, from about 0 to about 36% ethylene-vinyl acetate copolymer and from about 0 to about 60% filler.

Fuels for the present processes and apparatuses produced from one or more solid materials preferably have particle sizes ranging from about 37 to about 2000 µm, and more preferably ranging from about 149 to about 400 µm. In the granulation or other size reduction of solid materials, the particle size of the resulting granulates is important because it influences the quality of the combustion processes that occur in the present processes and apparatuses, and permits the size-reduced particles to be reformulated into a fuel, a fuel blend or a fuel mixture that may contain one or more other substances. It has been determined that materials having particle sizes of about 30 µm and below are often explosive (spontaneously combust). Thus, materials having such particle sizes are not generally recommended for use in the processes and apparatuses. Mesh particle sizes that are larger than about 2300 µm should also be avoided because they can cause feeding problems in the fuel injectors of the apparatuses. Thus, plastic, rubber and other solid materials should be granulated to fine particle sizes having the above-described particle sizes to allow the size-reduced particles to be properly re-formulated into a fuel.

The following table shows approximate particle sizes (in U.S. mesh, inches and microns) of one or more solids, and the approximate percent distribution of the one or more solids having the indicated particle sizes, that are preferred for use in fuels or fuel components that are used in any combination in the present processes and apparatuses:

| Particle Sizes and Distribution in Solid Fuels or Fuel Components | | | |
|---|---|---|---|
| U.S. Mesh | Inches | Microns | Percent Distribution |
| 10 | 0.0787 | 2,000 | 0-5% |
| 12 | 0.0661 | 1,680 | 0-5% |
| 14 | 0.0555 | 1410 | 0-15% |
| 16 | 0.0469 | 1190 | 0-15% |
| 18 | 0.0394 | 1000 | 0-25% |
| 20 | 0.0331 | 841 | 0-45% |
| 25 | 0.028 | 707 | 0-50% |
| 30 | 0.0232 | 595 | 0-50% |
| 35 | 0.0197 | 500 | 0-50% |
| 40 | 0.0165 | 400 | 0-50% |
| 45 | 0.0138 | 354 | 0-99% |
| 50 | 0.0117 | 297 | 0-99% |
| 60 | 0.0098 | 250 | 0-99% |
| 70 | 0.0083 | 210 | 0-99% |
| 80 | 0.007 | 177 | 0-99% |
| 100 | 0.0059 | 149 | 0-99% |
| 120 | 0.0049 | 125 | 0-99% |
| 140 | 0.0041 | 105 | 0-99% |
| 170 | 0.0035 | 88 | 0-99% |
| 200 | 0.0029 | 74 | 0-99% |
| 230 | 0.0024 | 63 | 0-99% |
| 270 | 0.0021 | 53 | 0-99% |
| 325 | 0.0017 | 44 | 0-75% |
| 400 | 0.0015 | 37 | 0-50% |

The solid materials can be size reduced using known procedures, and the resulting particles can be separated into the desired size ranges by screening.

The following table shows the approximate particle sizes of one or more solids, and the approximate percent distribution of the one or more solids having the indicated particle sizes, that are most preferred for use as fuels and fuel components for the present processes and apparatuses.

| Particle Sizes and Distribution in Solid Fuels or Fuel Components | | | |
|---|---|---|---|
| U.S. Mesh | Inches | Microns | Percent Distribution |
| 40 | 0.0165 | 400 | 1% |
| 45 | 0.0138 | 354 | 2% |
| 50 | 0.0117 | 297 | 5% |
| 60 | 0.0098 | 250 | 5-10% |
| 70 | 0.0083 | 210 | 35-40% |
| 80 | 0.007 | 177 | 35-40% |
| 100 | 0.0059 | 149 | 10% |

The fuels (or fuel mixtures) that are the most preferred for use in the processes and apparatuses, are fuels or fuel blends that are generally derived from solid materials, e.g., rubber from scrap tires, carpeting or other plastics, and are sometimes combined with a separate hydrogen component, which has a large energy content and, thus, which can raise the energy value of the final fuel product. These fuels or fuel blends are designated as "Engineered Fuels" or "EF Fuels" herein. The table below shows the formulations (the approximate weight percent range of individual components) for eighteen different EF Fuels (designated EF-1 to EF-18), and the energy content of each of the eighteen EF Fuels (in terms of the largest and smallest possible number of BTU per pound of fuel generally present, depending upon the specific weight percent of each component used in the fuel). For EF Fuels that do not contain a separate hydrogen component, the fuel may be fed into the apparatuses via at least one fuel inlet. However, for those Engineered Fuels, such as EF-10 and EF-11, that contain a separate hydrogen component (which may be in addition to hydrogen contained in other components of the fuel), the separate hydrogen component should be fed into the apparatuses via a fuel inlet that is separate from the fuel inlet in which the other fuel components are fed into the apparatuses. However, the separated fuels or fuel components will generally be present together in the first combustion chamber of the apparatus. Example 2 hereinbelow provides an analysis of the components of the separate combustion gas exhaust products produced using these eighteen EF Fuels in one of the present apparatuses.

The term "carpet" as used in the table set forth below refers to the typical carpet scrap described hereinabove, but can also include any other type of carpet scrap or other carpet waste. The other listed components, such as polypropylene and nylon 6,6, are in addition to any of the components, such as polypropylene and nylon 6,6, that may be present in the carpet component of the fuel, fuel blend or other mixture. The phrase "tire rubber" as used in the table refers to the non-metal components of scrap tires that have been size reduced. The weight percentages below are preferred values.

| Eighteen Engineered Fuels | | | | |
|---|---|---|---|---|
| Component | EF-1 | EF-2 | EF-3 | EF-4 |
| Carpet | 5-40% | 5-15% | 40-60% | 5-25% |
| Polystyrene | 0% | 5-10% | 5-10% | 0% |
| Polyethylene Terephthalate | 0% | 5-25% | 5-15% | 10-50% |
| High-Density Polyethylene | 10-40% | 30-55% | 15-35% | 25-35% |
| Low-Density Polyethylene | 1-5% | 5-20% | 0% | 1-5% |
| Polypropylene | 5-35% | 10-30% | 5-7% | 10-25% |
| Highest Possible Energy Value (Btus per lb.) | 19,121 | 19,291 | 15,920 | 18,038 |
| Lowest Possible Energy Value (Btus per lb.) | 15,740 | 17,307 | 15,749 | 15,360 |

| Component | EF-5 | EF-6 | EF-7 | EF-8 | EF-9 |
|---|---|---|---|---|---|
| Carpet | 10-25% | 50-60% | 30-50% | 5-15% | 5-15% |
| Polystyrene | 0% | 0% | 0% | 5-10% | 0% |
| Polyester | 0% | 13-15% | 0% | 10-20% | 0% |
| Polyethylene Terephthalate | | | | | |
| High-Density Polyethylene | 40% | 23-35% | 50-70% | 20-30% | 4-25% |
| Low-Density Polyethylene | 10-20% | 2% | 0% | 5-10% | 5% |
| Polypropylene | 10-20% | 0% | 0% | 10-20% | 25-35% |
| Nylon 6,6 | 5% | 0% | 0% | 0% | 0% |
| Nylon 6 | 5% | 0% | 0% | 0% | 0% |
| Tire Rubber | 0% | 0% | 0% | 10-25% | 15-30% |
| Highest Possible Energy Value (Btus per lb.) | 18,892 | 16,660 | 18,691 | 17,243 | 19,121 |
| Lowest Possible Energy Value (Btus per lb.) | 18,211 | 16,034 | 17,786 | 16,628 | 17,991 |

| Component | EF-10 | EF-11 | EF-12 | EF-13 | EF-14 |
|---|---|---|---|---|---|
| Carpet | 27-48% | 10-30% | 0% | 0% | 0% |
| Hydrogen | 23-38% | 10-30% | 0% | 0% | 0% |
| Polystyrene | 0% | 0% | 5% | 10% | 5% |
| Polyester | 0% | 30-50% | 10% | 5% | 5-10% |
| Polyethylene Terephthalate | | | | | |
| High-Density Polyethylene | 25-40% | 10-30% | 35-45% | 45-55% | 35-50% |
| Low-Density Polyethylene | 0% | 0% | 10-20% | 10-20% | 10-20% |
| Polypropylene | 0% | 0% | 10-30% | 10-30% | 10-30% |

-continued

| Eighteen Engineered Fuels | | | | | |
|---|---|---|---|---|---|
| Polyurethane | 0% | 0% | 0% | 5% | 0% |
| Nylon 6,6 | 0% | 0% | 0% | 0% | 5-10% |
| Highest Possible Energy Value (Btus per lb.) | 31,680 | 27,781 | 18,857 | 19,180 | 19,140 |
| Lowest Possible Energy Value (Btus per lb.) | 26,033 | 19,167 | 18,850 | 19,172 | 18,377 |

| Component | EF-15 | EF-16 | EF-17 | EF-18 |
|---|---|---|---|---|
| Carpet | 0% | 0% | 5-15% | 10-40% |
| Polystyrene | 5-20% | 0% | 5-12% | 1-15% |
| Polyester Polyethylene Terephthalate | 5-50% | 20-30% | 10-20% | 3-25% |
| High-Density Polyethylene | 15-60% | 25-30% | 10-30% | 10-17% |
| Low-Density Polyethylene | 5-25% | 0% | 10-15% | 5-20% |
| Polypropylene | 5-60% | 30-45% | 5-20% | 5-15% |
| Polyurethane | 0% | 0% | 4-15% | 3-30% |
| Nylon 6,6 | 0% | 0% | 0% | 3-10% |
| Nylon 6 | 0% | 0% | 0% | 2-5% |
| Polyvinyl Chloride | 0% | 0% | 2-10% | 2-5% |
| Tire Rubber | 0% | 0% | 5-20% | 2-20% |
| Highest Possible Energy Value (Btus per lb.) | 19,490 | 18,305 | 17,170 | 17,026 |
| Lowest Possible Energy Value (Btus per lb.) | 16,130 | 17,432 | 15,974 | 15,975 |

As a result of its high energy content, the most preferred Engineered Fuel for use in the processes and apparatuses of is the EF-10 fuel.

The manufacturers of hydrocarbon materials that subsequently become waste products that are difficult to dispose of such as carpet manufacturers and automobile manufacturers, could advantageously use one or more of the present apparatuses of for their on-site electrical power generation, using their own waste products as the sources of fuel, or of fuel components. These manufacturers could also sell excess electrical power that is generated back to local power grids.

Preparation of Fuels and Fuel Components from Solid Materials

The Engineered Fuels of the present invention and other fuels derived from solid hydrocarbon materials can generally be made from one or more hydrocarbon solid materials, freeing them of glass and/or metal components and then size reducing them into smaller particles that preferably have a uniform size using known crushing, ambient temperature grinding, cryogenic grinding, shear cutting, granulating, pelletizing, dicing, pulverizing, high speed impact shattering or other methods. If desired, the raw materials used to produce the fuels or fuel components may be dried to lower or otherwise control the moisture content. A second grinder may be used to further processes these materials.

The solid fuels used in the present processes and apparatuses may involve the use of wastes commingled material production plastic rubber and carpet having different demanding specifications. The product being recycled may consist of several dissimilar materials, such as a metal-plated or fabric-reinforced plastic. These materials are preferably released from one another, so that they can be separated into individual materials for use in a fuel. Several types of known manufacturing processes have been developed specifically for processing commingled plastics. These processes are generally categorized into extrusion processes and cryogenic and ambient grinding processes. Each of these processes is capable of producing products from a wide variety of homogeneous mixtures of waste plastics and rubbers.

Cryogenic Grinding Processes

In most operations of cryogenic grinding, liquid nitrogen is used to cool a material during size reduction. Grinding tough, thermoplastic materials at cryogenic temperatures generally produces plastics that are brittle enough to be ground to very fine particle sizes. The use of liquid nitrogen in the cryogenic grinding process controls and regulates the heat of the grinding mill, and allows higher material throughputs. Organic materials generally have an increased risk of explosion when very fine particles combine. The use of nitrogen to inert the atmosphere during the grinding process minimizes safety hazards associated with explosions.

The temperature of the liquid nitrogen used in cryogenic grinding processes is generally about 320° F. at atmospheric pressure. Most plastics and rubber compounds freeze at their glass transition temperature of about −80° F. At temperatures below the glass transition temperature, the plastics and rubber change from an elastic material to one that is brittle and easy to grind using impacting methods. The use of cryogenic temperatures can be applied at any stage of size reduction for most plastics and rubber. The choice of feed material for a cryogenic stage depends on the feed material available and the characteristics of the desired products. Typically, the size of the feed material is a 2-inch, or smaller sized, chip.

The feed material chips are fed at a constant rate into a heat exchanger where they are cooled by direct contact with the liquid nitrogen. The most efficient pre-cooler utilizes countercurrent heat exchange where the liquid nitrogen is sprayed onto the plastics and/or rubbers near the exit end of the pre-cooler. The liquid nitrogen is vaporized as it cools the plastics and/or rubbers, and the cold nitrogen vapor is passed back toward the feed end where it is further warmed by the plastics and/or rubbers. The warm nitrogen gas is vented to a safe location while the cold plastics and/or rubbers are fed to a grinding mill.

The temperature of the frozen plastics and/or rubbers exiting the pre-cooler is generally controlled to a temperature ranging from about −150° F. to about −320° F. The choice of temperature depends upon the intensity of grinding to be performed in a subsequent step. The product particle size is generally somewhat finer when colder temperatures are employed.

The cold plastics and/or rubbers are ground, for example, with a hammer mill, producing a plastics and/or rubbers product ranging from about 4 mesh down to very fine powder. Preferred granulators employed in cryogenic grinding processes typically use both shear cutting and high speed impact shattering principles to reduce the size of the starting solid material. Any metal remaining in the size-reduced product can generally be separated out from the product using magnets or other known processes. Any fiber that may be entrapped with the metal may be fluffed in a mill and removed by aspiration and screening. Remaining plastics and/or rubbers may be dried and then separated into the desired particle size ranges by screening. If additional very fine powder is desired, generally 30 mesh or smaller, a secondary high intensity grinding process may be used. The feed material for this process is preferably clean, 4-mesh size plastics and/or rubbers particles.

The process described above would generally also be used for clean industrial and post-consumer scrap, except that no metal or fiber removal steps would generally by necessary, and only one cryogenic grinding stage generally is needed. Liquid nitrogen requirements for these materials are about 0.75 pounds of nitrogen per pound of material and higher, depending upon the mesh size desired for the resulting particles. New mills are being developed to economically produce 80 mesh size, and finer, particles.

In order to further size reduce plastics and/or rubbers, ambient and/or wet grinding technologies may be used after a cryogenic grinding of the material. The output from cryogenic grinding processes vary, depending upon the size of the grinder, particle mesh sizes produced, and the chilling process used. Outputs of about 3000-6000 lbs/hr are typical. Generally cryogenic grinding equipment includes a materials chiller, typically a screw conveyor, liquid nitrogen flow controls, a data acquisition system and mill controls.

There are several advantages of using a cryogenic grinding process, including process cleanliness and effective separation of fiber and steel from plastics and/or rubbers. Although the cost of cryogenic ground plastics and/or rubbers is usually from about $0.01-0.03 per pound higher at equal particle mesh sizes in comparison with ambient ground plastics and/or rubbers, ambient ground plastics and/or rubbers particle sizes are usually limited to 40 mesh or larger. The key benefits in the use of cryogenic grinding processes to produce the products described above in comparison with other processes include improved production throughput rates, improved quality (due to reduction in heat history or distortion), finer particle sizes (due to ease of particle fracture), cleaner and easier liberation and separation of mixed component scrap, and reduced specific energy consumption (grinding energy per unit of product processed) related to the size reduction step. Benefits of cryogenic grinding processes also include smaller particles, regular particle size, efficiency of the process, improved surface morphology, effective temperature control and an inert atmosphere.

The cryogenic grinding process produces fairly smooth fracture surfaces, and generates little or no heat. This results in less degradation of the resulting plastics and/or rubbers products. In addition, when scrap tires are size reduced by this method, almost all fiber and steel is advantageously removed from the rubber, resulting in a high yield of usable product with little loss of rubber. Further, the price of liquid nitrogen has recently been significantly lowered, resulting in this size reduction process becoming more cost effective.

The use of liquid nitrogen to cool a material takes advantage of the refrigeration afforded by liquid nitrogen (a) to remove the heat of grinding to prevent melting, distortion, or discoloration of polymeric materials during processing; (b) to embrittle a polymer to enable it to be size-reduced more effectively, or to obtain selective embrittlement when two or more components exist; or (c) to liberate multi-component materials by using different rates of thermal expansion/contraction caused by exposure to the low temperatures of liquid nitrogen.

Ambient Temperature Grinding Process

In the ambient temperature grinding process, a conventional high powered plastics and/or rubbers cracker mill is used to shear and grind plastics and rubbers into small particles. It is common to produce 10 to 30 mesh particle sized material using a relatively large crumb. Several cracker mills are often used in series. Typical yields of ground material are about 2,000-2,200 pounds per hour for 10 to 20 mesh particle sized material, and about 1200 pounds per hour for 30 to 40 mesh particle sized material. The finer the desired particle, the longer the plastics and/or rubbers are permitted to run in the mill. In addition, multiple grinds can be used to reduce the particle size of the plastics and/or rubbers. The lower practical limit for the process is the production of 40 mesh particle sized material. Any fiber and extraneous material should be removed using an air table, and metal is removed using a magnetic separator. The resulting material is fairly clean.

The ambient temperature grinding process produces a material having an irregular jagged particle shape. In addition, the process generates a significant amount of heat in the plastics and/or rubbers (or other) feed material during processing. Excess heat can degrade the resulting plastics and/or rubbers product which, if not cooled properly, can combust during storage. Ambient temperature grinding mills generally contain a primary shredded, a second shredder, a granulator, a liberator and a classifier.

When scrap tires are size reduced by an ambient temperature grinding process, the scrap tires are usually shredded and then fed into a grinding mill. The ground product then is separated into steel, textile and rubber granulates. The granulation can be classified into different particle sizes.

The following table compares the physical properties of materials sized reduced with cryogenic processes in comparison with ambient temperature grinding processes:

| Physical Property | Ambient Temp. Grinding Process | Ambient Temp. Cryogenic Process |
| --- | --- | --- |
| Specific Gravity | Same | Same |
| Particle Shape | Irregular | Regular |
| Fiber Content | 0.5% | None |
| Steel Content | 0.1% | None |

The following table compares the approximate weight percent particle size distribution resulting from the size reduction of two different samples of ground rubber, with one sample being size reduced by a cryogenic grinding processes and with the other sample being size reduced by an ambient temperature grinding process:

| Particle Size | Ambient Temp. Grinding Process | Ambient Temp. Cryogenic Process |
| --- | --- | --- |
| 30 Mesh Particle Size | 2% | 2% |
| 40 Mesh Particle Size | 15% | 10-20% |
| 60 Mesh Particle Size | 60-75% | 35-40% |
| 80 Mesh Particle Size | 15% | 35-40% |
| 100 Mesh Particle Size | 5% | 20% |
| Pan | 5-10% | 2-10% |

Once the various solids to be used in a fuel have been sized reduced to the desired particle sizes, the size reduced particles can be mixed together in any commercially available mixer. It is preferable that the mixture of the different plastics, rubbers and/or other materials, and the different particle sizes thereof be as homogeneous as possible, However, if one or more of the plastics, rubbers or other materials to be used in a fuel cannot be mixed in a homogeneous manner, they can be separated into two (or more) groups and injected from two different areas of the apparatus to achieve a homogenous mix in a combustion chamber of the apparatus.

Further, any liquid or gaseous hydrocarbon fuel (or other fuel having the characteristics described herein) can be used with fuel components derived from solid materials to achieve a higher energy value of the total fuel used in the present processes and apparatuses (a higher BTU per pound). When they are compatible with one another, fuels or fuel components derived from plastics, rubbers or other solid materials can be mixed with a liquid, gaseous, jelled or other type of fuel or fuel component prior to entering into a combustion apparatus. However, even if various fuels or fuel components are not compatible with each other, they may still be used together in the present processes and apparatuses. For example, incompatible fuels or fuel components may be kept separate from each other outside and inside of the apparatuses, and then separately injected into a first combustion chamber present in the apparatuses, where they can mix with each other, and with the oxidizer chosen for use. One skilled in the art can determine which different fuels and fuel components are compatible.

Oxidizer

One or more of the same or different oxidizers are used in the present processes and apparatuses to cause and/or maintain a combustion of a fuel, when ignited and in the presence of the fuel. The oxidizers aid in the conversion of the energy present in the fuel to heat energy.

One or more oxidizer supply control means permit the initiation, termination and/or regulation of one or more supplies of oxidizer, which may be the same or different, to the apparatuses. The oxidizer supply control means may include an oxidizer line that is attached to a source of oxidizer and a pump, or any other suitable system.

When air is used as an oxidizer in a combustion process, the nitrogen present in the air can combine with oxygen that is present in combustion gases and/or combustion gas exhaust products, or in the air in which combustion gas exhaust products are released, resulting in the release into the atmosphere of significant quantities of environmental pollutants, such as the criteria air pollutant $NO_x$, as well as $NO$, $NO_2$ and $N_2O$. Thus, the present processes and apparatuses do not use air as an oxidizer (and generally do not otherwise allow air to contact the fuels, oxidizers, water, other coolants, combustion gases or other substances that may be present in the systems, or to enter into the systems). Preferably, the oxidizer used in the present processes and apparatuses of does not contain nitrogen. In contrast to use of air as an oxidizer, the use of an oxidized with no or reduced the nitrogen in the present in processes and apparatuses eliminates or reduces the amount of the criteria air pollutant $NO_x$, as well as $NO$, $NO_2$, $N_2O$ and other nitrogen-containing environmental pollutants produced in combustion gas exhaust products, thereby producing steam or electrical power with low or no quantities of nitrogen emissions.

Liquid or gaseous oxidizers that are not air, and that preferably do not contain any nitrogen, are used as the oxidizers in the present processes and apparatuses. These oxidizers have a purity that preferably ranges from about 90% to about 100% (they contain only from about 0% to about 10% impurities), and that more preferably ranges from about 95% to about 100%, for example about 95.5% or about 99.5%, and that is most preferably about 100%. Liquid oxidizers, such as LOX, O, $O_3$ (ozone), hydrogen peroxide ($H_2O_2$) and hydroxylamine nitrate (HAN), are preferred. However, the oxidizers may be gaseous oxidizers or compressed oxygen. Because of their inexpensive costs and clean nature, the more preferred oxidizers are LOX and hydrogen peroxide. Pure (100%) LOX is the most preferred oxidizer.

Because the entry of oxidizer into the present apparatuses at any one or more points of entry may be regulated by the user, the entry of oxidizer into these apparatuses at any of these locations may be terminated at any time. This feature advantageously provides the user with the ability to terminate the combustion process of the fuel in the apparatuses, either in the first combustion chamber, in the second combustion chamber, and/or in another combustion chamber or area, at any time.

The electrical power produced by the present processes and apparatuses may be used to produce liquid $O_2$ inexpensively and in large quantities (thousands of pounds per day). Alternatively, Air Products (Allentown, Pa.) manufacturers PRISM™ Oxygen Vacuum Swing Adsorption systems for the on-site oxygen generation.

Suitable oxidizers are also available from Airgas, Inc. (Radnor, Pa.), Praxair, Ine. (Danbury, Conn.) and other commercial sources.

The amount of oxidizer introduced into each of chambers and/or areas of the present apparatuses will effect the amount of heat generated in therein, with more oxidizer generally resulting in more heat. The amount of oxidizer introduced into each of the chambers and/or areas of the present apparatus other than the final chamber and/or area will preferably be an amount of oxidizer that maintains the mixture of oxidizer and fuel in a "fuel rich" mixture. The amount of oxidizer that is present in, or introduced into, the last combustion chamber or area of the apparatuses will preferably be an amount of oxidizer that produces a stoichiometric combustion reaction.

Mixing of Fuel and Oxidizer in Combustion Chambers and/or Areas

The particular oxidizers and fuels, or fuel components, chosen for use in the present processes and apparatuses may result in variations of characteristics such as the relative chemical reactivity, the ease and speed of fuel vaporization, the ignition temperature, the diffusion of hot gases, volatility and/or surface tension. However, one skilled in the art can readily choose combinations of one or more oxidizers and one or more fuels or fuel components that will achieve the results desired.

In order to cause oxidizers and fuels or fuel components that enter into a first combustion chamber of the present apparatuses to become well mixed, rather than remaining in separate pockets or otherwise separated, it is preferable that the oxidizers and fuels become vortexed in the first combustion chamber or area, thereby causing the oxidizers and/or the fuels or fuel components (and preferably both) to spin. Such vortexing also permits the oxidizers and fuels or fuel components to remain in the first combustion chamber or area for a longer residence time, and permits the fuels or fuel components to absorb more heat energy from the combustion reaction than would occur in the absence of vortexing.

The vortexing of the oxidizer and fuel in the first (or other) combustion chamber can be achieved, or enhanced, in a variety of different manners. Such vortexing may be achieved, for example, by injecting streams of an oxidizer into a first combustion chamber at one or more of the same or different angles (in any direction that causes the oxidizer to travel into the first combustion chamber). Such angles preferably range from above about 0 degrees to below about 180 degrees in relation to the face of a plate (or other component) in which oxidizer injector orifices are drilled or are otherwise placed, which would otherwise inject the oxidizer straight into the first combustion chamber, and more preferably range from about 10 degrees to about 90 degrees, with about 70 degrees being most preferred. Alternatively, or additionally, streams of a fuel or fuel component may be injected into a first (or other) combustion chamber at one or more of the same or different angles (in any direction that causes the fuel to travel into the first combustion chamber). Such angles preferably also range from above about 0 degrees to below about 180 degrees in relation to the face of the plate (or other component) in which the fuel port orifices are drilled or are otherwise placed, and more preferably range from about 10 degrees to about 90 degrees, with about 70 degrees being most preferred.

It is preferable that both the oxidizer and the fuel be injected into the first combustion chamber or area in angled manners, resulting in one or more points of impingement between the streams of fuel and oxidizer (one or more points, lines and/or areas of intersection of the oxidizer and fuel streams within the first combustion chamber). As a result of the angles that the fuel and oxidizer streams are entering into the first combustion chamber, the streams of fuel and oxidizer may form a variety of different stream patterns, for example, a doublet impinging stream pattern (one or more separate intersections of one stream of fuel and one stream of oxidizer), a triplet impinging stream pattern (one or more separate intersections of one stream of fuel and two streams of oxidizer), as is shown in FIG. 4 and FIG. 11, a self-impinging stream pattern (one or more separate intersections of two streams of fuel or two streams of oxidizer) or other stream patterns. Alternatively, the fuel and/or oxidizer may be injected into the first combustion chamber in a nonimpinging "shower head" stream pattern (with both the fuel and the oxidizer being injected straight into the first combustion chamber, such as the manner in which water travels out of a shower head into a shower). These various patterns can be achieved, for example, by drilling or otherwise placing oxidizer injector orifices into an oxidizer manifold at desired angles, and/or by drilling or otherwise placing fuel port orifices into a fuel metering block at desired angles.

Parameters that may be varied widely and readily by one skilled in the art in connection with both the injection of one or more oxidizers and fuels or fuel components into the first combustion chamber (and into other combustion chambers or areas) of the present apparatuses in order to achieve desired results include sizes of injector orifices, patterns formed by injector orifices, angles of impingement, angles of the resultant momentum, the distance of the impingement locus from the injector face, the number of injector orifices per unit of injector face surface, the flow per unit of injection orifice and the distribution of orifices over the injector face (in a nonimpinging manner, in an unlike impinging manner or in a like-impinging manner).

Configurations of oxidizer and/or fuel injectors that may be used include non-impinging, unlike-impinging and like-impinging configurations. Non-impinging oxidizer and fuel injector elements include: (a) coaxial or concentric injection elements, which will generally have a slower-moving central stream of liquid oxidizer surrounded by a higher velocity concentric sheet of gaseous fuel; (b) showerheads, providing directly axial, or near-axial, non-impinging streams of reactants; (c) fan formers, which provide sprays of reactants in cones or fans; and (d) slots and sheets, which contain narrow two-dimensional slots. Unlike-impinging oxidizer and fuel injector elements include: (a) unlike doublets, which direct a stream of one reactant against a different stream of another reactant, producing a fan-shaped spray made up of the mixture of two impinging streams; (b) unlike triplets, in which a symmetrical unlike injection element consists of an axial central stream of one of the reactants (either the fuel or the oxidizer) and two symmetrically-impinging outer streams of the other reactant; (c) quadlets; and (d) pentads (or other groupings of streams). Like-impinging oxidizer and fuel injector elements include: (a) like doublets, with two streams of the same reactant being angled together to an impact point, producing a fan-shaped spray of droplets; (b) like impending triplets, with three streams of the same reactant being angled together to a common impingement point; and (c) similar larger groupings of streams.

Different fuel and/or oxidizer orifices, and orifice sizes, can be used to achieve desired injection pressures, injection velocities, flows and/or oxidizer to fuel mixture ratios. For a given thrust F, and a given exhaust velocity c, the total reactant flow m=F/c. Orifice types that can be used include sharp-edged orifices, short tube with rounded entrance orifices, short tube with conical entrance orifices, short tube with spiral effect orifices and/or sharp edged cone orifices. With these (and other) types of orifices, the orifice diameters will generally vary depending upon the size of the apparatus, and preferably range from about 0.0015 to about 6 inches, and more preferably range from about 0.01 to about 1.0 inches.

In order to cause additional oxidizer, and unburned fuel present in the incomplete combustion product produced in the first combustion chamber, that enter into a second combustion chamber or area of the apparatuses of the invention to become mixed well (rather than remaining separated), it is preferable that the oxidizer and unburned fuel become vortexed in the second combustion chamber or area, thereby causing the oxidizer and/or the unburned fuel (and preferably both) to spin. Such vortexing also permits the oxidizer and the unburned fuel to remain in the second combustion chamber or area for a longer residence time, and permits the unburned fuel to absorb more heat energy from the combustion reaction than would occur in the absence of vortexing. The vortexing of the oxidizer and the unburned fuel in the second combustion chamber or area (and in any optional additional combustion chambers and/or areas) can be achieved, or enhanced, in the same manners, and at the same angles, described above in connection with the first combustion chamber. It is preferable that both the oxidizer and the combustion product produced in the first combustion chamber be injected into the second combustion chamber at an angle. This can be achieved by drilling or otherwise placed oxidizer injector orifices into an oxidizer manifold at the desired angles, and by drilling or otherwise placing fuel port orifices into a fuel wear plate at the desired angles.

Although it is preferable that the vortexing processes described above, which employ turbulence and/or diffusion to achieve the mixing of fuel with oxidizer, occur in each of the combustion chambers and/or areas used in the present apparatuses, such vortexing is not necessary.

Water

One or more water supply control means permits the initiation, termination and/or regulation of one or more supplies of water to the apparatuses. The water supply control means may include one or more water feed lines that are attached to one or more sources of water and a pump, or any other suitable system.

Feed water enters the apparatuses at one or more locations and circulates around, but not in, the combustion chambers and/or areas of the apparatuses. Generally, water does not enter into the combustion chambers and/or areas of the apparatuses. The temperature of the water at each of these locations preferably ranges from about ambient temperature to about 260° F., and more preferably ranges from about 212° F. to about 250° F., with about 250° F. being most preferred. The water functions to cool the various components of the apparatuses, such as the sidewalls of the combustion chambers and/or areas, which become hot, so that these components maintain their structural integrity while being exposed to high temperatures. In the absence of this water (or of other cooling agents or methods), some of the components of the apparatuses may lose their structural integrity at the high temperatures employed. During this cooling process, circulating water becomes transformed into a superheated steam product or a dry saturated steam product. Because the superheated steam product or dry saturated steam product is generally collected for use in the generation of electrical power (with an electrical power-generating apparatus or system), additional water (make-up water) is generally added to apparatuses to replace the water that becomes transformed into the superheated steam product or dry saturated steam product. Some of the water originally used in the apparatuses (condensate and/or water that is not transformed into steam) can be collected and re-routed to the apparatuses for further use therein.

The water used in the apparatuses preferably circulates through a plurality of tubes that form one or more tube assemblies, which preferably form the sidewalls (or a portion of the sidewalls) of each of the combustion chambers and/or areas of the apparatuses. The tubes are preferably circular or oval in shape, but may be square, rectangular, triangular or in any other suitable shape. The more tubes that are used for the circulation of the water, the larger the surface area of these tubes that will be present in the apparatuses. The larger the surface area of these tubes that is present in the apparatuses, the faster the water will cool the various components of the apparatuses that the water is near (by removing heat from the components), or comes into contact with, allowing the various components of the apparatuses to be exposed to more heat than would otherwise be possible without losing their structural integrity, and the faster the water will be transformed into a superheated steam product or dry saturated steam product that may be used to produce electrical power (or for some other use).

The number of tubes that are preferably in each of the one or more tube assemblies in the apparatuses will generally be based upon the outer diameter of the tubes and the internal diameter of one or more outer housings that will generally be adjacent to the outside of the tube assemblies. The outer diameter of the tubes in each tube assembly will generally determine the number of tubes that can be assembled around the internal circumference of a corresponding outer housing. For example, if an outer housing that is adjacent to a tube assembly has an internal diameter of about 14.725 inches, and if the individual tubes in the tube assembly have an outer diameter of about 0.625 inches, approximately 58 tubes would be used in the tube assembly (to line the internal diameter of the outer housing). The number of tubes that is preferable for use in a particular tube assembly in connection with a particular combustion chamber or area of the apparatus of can readily be determined by one skilled in the art.

The pH of the water used in the processes and apparatuses of the invention preferably ranges from about 8.5 to about 12.7, more preferably from about 10.5 to about 11.5. An external treatment of the water used in the processes and apparatuses to improve its quality prior to its use may include clarification, filtration, softening, dealkalization, demineralization, deareation and/or heating as known in the art.

Depending upon the type of water (hard water, soft water, fresh water, salt water, and the like) that is available at the location of use of the processes and apparatuses, it may be desirable to add commercially-available chemicals, such as phosphates, chelates, carbonates, sulfites (sodium sulfate and the like), alkalinity builders, amines (diethylhydroxylamine and the like) and/or polymers, to the water prior to use in an amount, as known in the art to reduce or remove impurities, such as the minerals calcium and iron, chemicals and organic matter, from the water and, thereby, reducing or preventing corrosion of components of the apparatuses. Calcium and magnesium hardness, migratory iron and copper, colloidal silica and other contaminants should preferably be reduced or removed. It is also preferable to remove oxygen, carbon dioxide and other noncondensable gases from the feed water, to avoid deposit formation in water transport tubes, causing the water passageways to narrow. The water passageways could eventually become blocked, causing a loss of efficiency (e.g., to require a higher amount of pressure to produce the same amount of heat), malfunction or loss of function. AmSolv™ (Lancaster, Tex.) markets industrial water treatment compounds that can be used to inhibit scale and corrosion or to otherwise treat water prior to use in the present processes and/or apparatuses.

Combustion Processes

The combustion process is an exothermic reaction between the fuels and the oxidizers. Combustion chemistry relates chemical potential energy to heat resulting from chemical reactions, and thermodynamics relate the heat to work. Perfect combustion ("stoichiometric combustion") is obtained by mixing and burning exactly the right proportions of fuel and oxygen so that no reactants are left over (so that there is a complete combustion reaction in which there is no excess fuel or oxidizer). If too much oxidizer (or not enough fuel) is supplied, the mixture will be "fuel lean." If too much fuel (or not enough oxygen) is supplied, the mixture will be "fuel rich." A fuel rich mixture generally results in an "incomplete combustion" because all of the fuel particles combine with some oxygen, but they cannot get enough oxygen to burn completely.

Environmental pollutants that are often generated in combustion processes include CO, $SO_2$, $NO_x$, $SO_x$, $NO_2$, $N_2O$, VOCs, hydrocarbons and particulate matter. The CO and the hydrocarbons are generally the products of an incomplete combustion. The $SO_2$ and the $SO_x$ are generally emitted as a consequence of burning fuels that contain sulfur compounds. The $NO_x$, $NO_2$ and $N_2O$ are generated from reaction of nitrogen compounds contained in a fuel with oxygen, or of a fuel with air. The particulate matter formation can be a consequence of a high ash content in the fuel.

In the processes and apparatuses, the mass flow rates of reactants times burn time generally provides the total required mass of each reactant. The O/F mixture ratio (the ratio of oxidizer to fuel mass flow rates) may be determined using the following equation:

$$r = \frac{\dot{m}_o}{\dot{m}_f}$$

wherein the • above the m indicates the rate of m, or dm/dt, in kg/s. From the O/F mixture ratio, the total mass flow rate of reactant may be calculated:

$$\dot{m} = \dot{m}_o + \dot{m}_f$$

The fractional flow rates of each component may be calculated using the following equations:

$$\dot{m}_o = \frac{r}{r+1} \cdot \dot{m},$$

$$\dot{m}_f = \frac{1}{r+1} \cdot \dot{m}$$

The volumetric flow rates can be calculated from the mass flow rates by dividing their densities, which are known. For example, LOX has a density of 1.2 g/cm³.

Combustion Chambers and/or Areas

Figure 2:
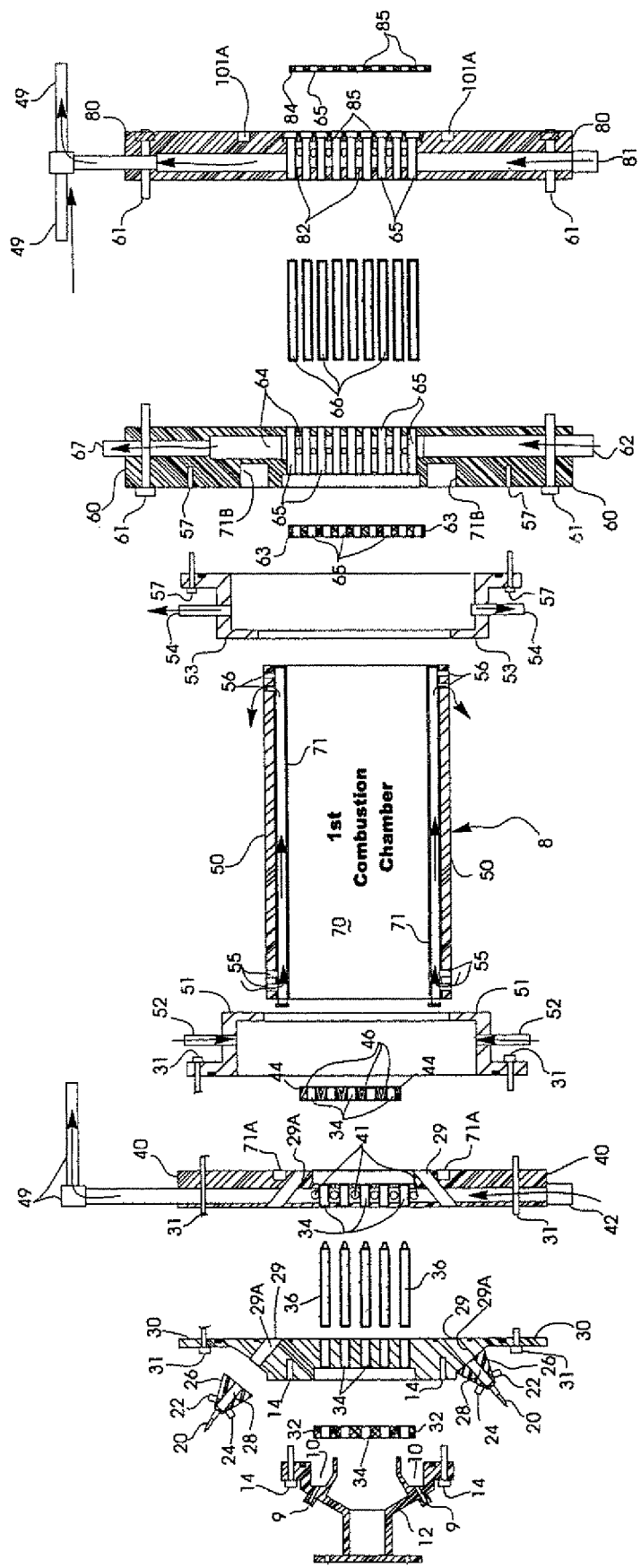
FIG. 2 is an exploded, cross-sectional view of one portion of the hydrocarbon combustion gas generator shown in FIG. 1, extending from the fuel inlet manifold 12 to the second transfer injector plate 84.
Figure 3:
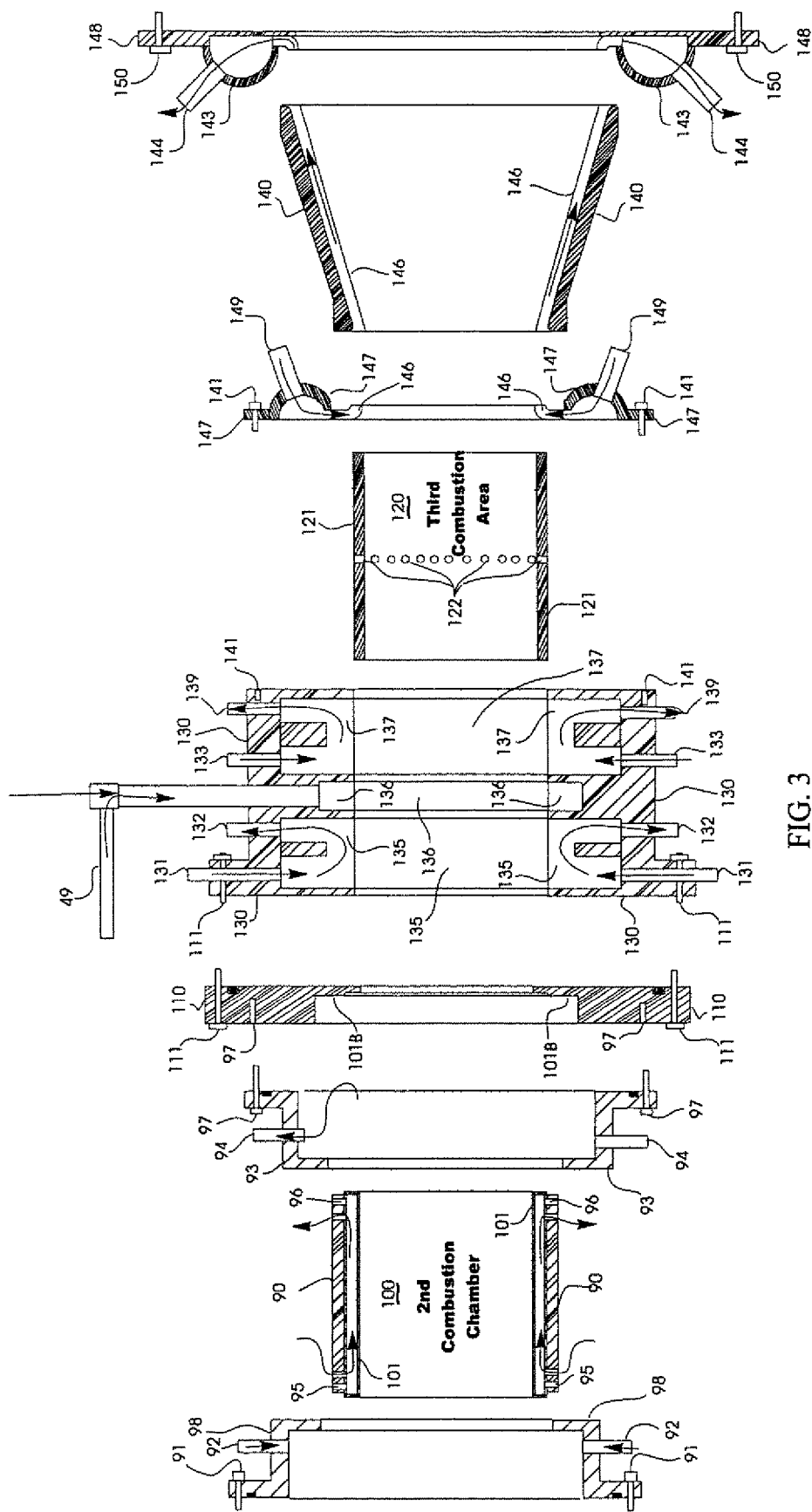
FIG. 3 is an exploded, cross-sectional view of another portion of the hydrocarbon combustion gas generator shown in FIG. 1, extending from the second water manifold 98 to the sixth superheated steam outlet 148.

The combustion chambers and/or areas used in the apparatuses, in which one or more combustion reactions occur, preferably have a hollow interior, and an exterior that faces away from the hollow interior. These combustion chambers and areas are preferably round, elongated, cylindrical hollow tubes that have an open forward end and an open aft end, and that have sidewalls formed by tube assemblies. However, they may be of any other suitable shape, such as oval, round, triangular, square or a coned shape. Further, the forward and/or aft end of the combustion chambers and/or areas may be closed by one or more other components of the apparatuses, as is shown in FIGS. 1 to 3. For example, in FIGS. 1 and 2, the forward end of the first combustion chamber becomes closed with a first transfer injector plate and a first oxidizer manifold plate, with its aft end becoming closed with a fuel wear plate and a first water manifold plate.

At least two, and preferably three (or more), separate combustion processes occur during the processes, and in the apparatuses, of the invention, with a first partial combustion of fuel occurring in a first combustion chamber (or area), with a second partial (or a first complete) combustion of fuel occurring in a second combustion chamber (or area) and, optionally, when a complete combustion reaction has not occurred in a second combustion chamber (or area), with a third complete combustion occurring in a third combustion chamber (or area). It is possible to add additional combustion chambers (or areas) to the apparatuses of the invention, or to add additional combustion reactions to the processes of the invention. Because the fuel used in the methods and apparatuses of the invention will likely become more disassociated into its constituent atoms, thereby decreasing the quantity of environmental pollutants in exiting combustion gas exhaust products, such as CO, the production of which is reduced when a more complete burning of a fuel occurs, when three (or more), rather than two, separate combustion processes occur, it is preferable that three (or more) separate combustion reactions occur during such use. The last combustion reaction (in the last combustion chamber or area employed) should result in a complete combustion of the fuel, and each prior combustion reaction (in each prior combustion chamber or area) should result in an incomplete combustion of the fuel, As is discussed hereinabove, it is preferred that the fuels, or fuel components, and oxidizers that are used in the processes and apparatuses of the invention be introduced into the first and additional combustion chambers or areas of the apparatuses at angles that tend to induce a swirling (vortexing) effect in the combustion chambers or areas, which promotes a mixing of the fuels, or fuel components, and the oxidizers that is more thorough than would be otherwise (with no vortexing).

When using the apparatuses and methods, it is preferable that combustion, which first occurs in the first combustion chamber, occur over the entire length of the apparatuses (in each of the combustion chambers and/or areas present), rather than only in some of the combustion chambers or areas of the apparatuses. It is also preferable that, in each of the two or more combustion chambers (or areas) of the apparatuses, the combustion reaction occurs over the entire length of the combustion chambers (or areas), rather than over smaller portions thereof.

Further, it is preferable that at least about 97% percent of the fuel (or fuel blend or other mixture), and more preferably all (100%) of the fuel, that is used in the processes and apparatuses of the invention is burned, with the high temperatures used in these processes and apparatuses permitting the fuel to disassociate from molecules into atoms, such as H and O, with the remaining molecules being $H_2O$ and $CO_2$ (so that the combustion gas exhaust product that exits the last combustion chamber or area of the apparatuses will contain atoms and molecules that preferably are not environmental pollutants and/or hazardous materials, such as CO, $NO_x$, $NO_2$, $N_2O$, $SO_x$ and/or $SO_2$). $CO_2$ can be captured, resulting in a reduction of the quantity of emissions of environmental pollutants, and used in the manner described herein.

It is recommended that care be used in the processing of the combustion gas exhaust product that is produced in the last combustion chamber or area of the present apparatuses, which may be extremely hot (at a temperature often ranging from about 2500° F. to about 5500° F., and more usually ranging from about 3700° F. to about 5000° F.). This combustion gas exhaust product may be permitted to escape into the atmosphere. Alternatively, it may be subjected to a cooling process, for example, in an exhaust heat recovery steam (or other) generator, or in a similar apparatus. The atoms of the combustion gas exhaust product (depending upon the type of fuels or fuel components that are used), when cooled to a temperature below about 230° F. (110° C.), may reassociate into molecules. Some of these molecules, such as carbon monoxide, may be dangerous. Others may cause corrosion to metal components. Thus, it is preferable that the temperature of the combustion gas exhaust product be maintained at about 230° F. (110° C.) or higher.

The combustion reactions that occur in each of the combustion chambers and/or areas of the apparatuses release large amounts of heat. Thus, in order to prevent damage to the various combustion chambers or areas (the potential melting of metal and/or loss of structural integrity), it is preferable that the sidewalls of each of the combustion chambers and areas employed in the apparatuses be actively cooled, for example, using water or another suitable coolant or method. In the apparatuses, it is preferable that water be used as a coolant to achieve this result. The water, however, is not injected into any of the combustion chambers or areas, and does not come into contact with the fuel or oxidizer reactants, or with the combustion gas exhaust product. Rather, the water may be present in tubes contained in tube assemblies that generally form the sidewalls (or portions thereof) of the combustion chambers and/or areas.

Ignition Devices

One or more means for initiating a combustion reaction of a combustible mixture of one or more fuels, or fuel components, and oxidizers to produce the release of heat, which may be the same or different, may be employed in the processes and apparatuses of the invention.

The release of chemical energy stored in fuels, or fuel components, with the use of one or more oxidizers can be initiated by a number of different methods, or using a number of different igniters, known by one skilled in the art. The selection of one or more suitable ignition systems depends upon the nature and phase of the fuels, or fuel components, and oxidizers employed, system safety and like considerations. However, all ignition methods and devices have one overriding goal in common, which is the rapid and reliable ignition of incoming fuels, or fuel components, and oxidizers before the accumulation of reactive material. Fuels and oxidizers entering one or more combustion chambers or areas that are not promptly ignited can cause explosive mixtures to form and detonate.

The igniters employed in the processes and apparatuses may derive power from an outside source, or from a limited quantity of internally stored energy. Once ignited, fuel and oxidizer will generally remain ignited. Thus, although it is possible, it is not necessary to maintain the operation of an ignition source throughout the operation of the processes and apparatuses.

Igniters that may be employed in the processes and apparatuses of the invention, with or without the use of catalysts, and that may be built into, mounted to or otherwise attached to, the apparatuses include: (a) pyrotechnic igniters (electrically initiated slow-burning pyrotechnic torches that typically have a burn duration in the range of from about 2 to about 10 seconds); (b) hyperbolic igniters (igniters that ignite spontaneously when fuel and oxidizer first meet); (c) spark plugs (igniters that produce a spark); (d) spark-torch igniters (igniters in which small amounts of fuel and oxidizer are fed into an igniter combustor, and are ignited by electric sparks, with the flame output being channeled to the required area and, in turn, igniting the fuel and oxidizer employed in the main combustion processes); (e) combustion-wave igniters (igniters having branched outputs providing multipoint ignition sources from a single precombustor, and having an electric spark that initiates combustion in a premix chamber); and (f) resonance igniters (igniters that use a flow of pressurized gaseous fuel to create resonance heating that will start igniter reactants, causing igniter exhaust, with or without oxidizer augmentation, that is employed to ignite fuel and oxidizer as they enter a combustor).

Non-Polluting Products

Advantageously, the present methods and apparatuses produce products, such as a superheated steam product, a dry saturated steam product and/or a combustion gas exhaust product, that are generally environmentally clean. These products each generally contain no (0 wt %), or low quantities (preferably less than about 40 wt %, more preferably less than about 30 wt %, still more preferably less than about 20 wt %, still more preferably less than about 10 wt %, and still more preferably less than about 5 wt %) of environmental pollutants and/or hazardous materials.

When one or more of the products produced by the methods and apparatuses do contain some quantity of one or more environmental pollutants and/or hazardous materials, such as $CO_2$, the amount of these one or more environmental pollutants and/or hazardous materials will generally be significantly reduced in comparison with fuel-burning processes and apparatuses for producing steam or electrical power that employ air, or that permit air to come into contact with fuel, oxidizer or water employed therein, with combustion gases or combustion gas products produced thereby, and/or with components thereof (combustion chambers and the like), including conventional processes for producing steam or electrical power, such as conventional coal- and natural gas-burning steam-production and electrical power-production processes, when: (a) the same fuel, and the same amount of that fuel, is combusted; (b) the same fuel is combusted, and the same amount of steam, electrical power or energy is produced; or (c) one of the fuels of the invention is employed in the processes or apparatuses. In situation (c), the emissions of environmental pollutants and/or hazardous materials will generally be lower than in situations (a) and (b) as a result of the use of one of the fuels of the invention. However, in each of situations (a), (b) and (c), the amount of the one or more environmental pollutants and/or hazardous materials will generally be reduced by at least about 50%, and more usually by at least about 75%, and still more usually by at least about 90%. Example 1 hereinbelow shows a 97% reduction of $CO_2$ when EF-15 fuel and LOX are employed in an apparatus of the invention in comparison with the use of coal in a conventional coal-burning plant.

The type and quantity of any environmental pollutants and/or hazardous materials produced by the methods and apparatus of the present invention generally depends upon the purity of the fuels, or fuel components, and oxidizers employed, the type of the fuels, or fuel components, employed, the number and type (incomplete or complete) of combustion reactions that occur and the characteristics of the particular process or apparatus employed, and may readily be determined by one skilled in the art. Regardless of the foregoing variables, the quantity of environmental pollutants and/or hazardous materials produced by the present methods and apparatus of will generally be significantly lower than the quantity of environmental pollutants produced by fuel-burning processes and apparatuses for producing steam or electrical power that employ air, or that permit air to come into contact with fuel, oxidizer or water employed therein, with combustion gases or combustion gas products produced thereby, and/or with components thereof (combustion chambers and the like).

The superheated steam product or dry saturated steam product that may be produced by the present methods and apparatuses, which are generally two of the major products that may be produced thereby, usually do not contain any (0%) environmental pollutants or hazardous materials.

Further, the combustion gas exhaust product produced by the present processes and apparatuses, which is generally the other of the two separate products produced by these methods and apparatuses, will often contain only water and carbon dioxide and, possibly, some metals (if metals were present in the fuel or fuel components initially). The combustion of the fuels, or fuel components, and oxidizers at the high temperatures, and in the multiple combustion reactions, described herein generally causes environmental pollutants that would otherwise be present in the combustion gas exhaust products to be eliminated (or to be significantly reduced). For example, if the rubber from scrap tires is employed as the only fuel in the processes and apparatuses of the invention, the rubber will generally be converted into water and carbon dioxide.

Figure 14:
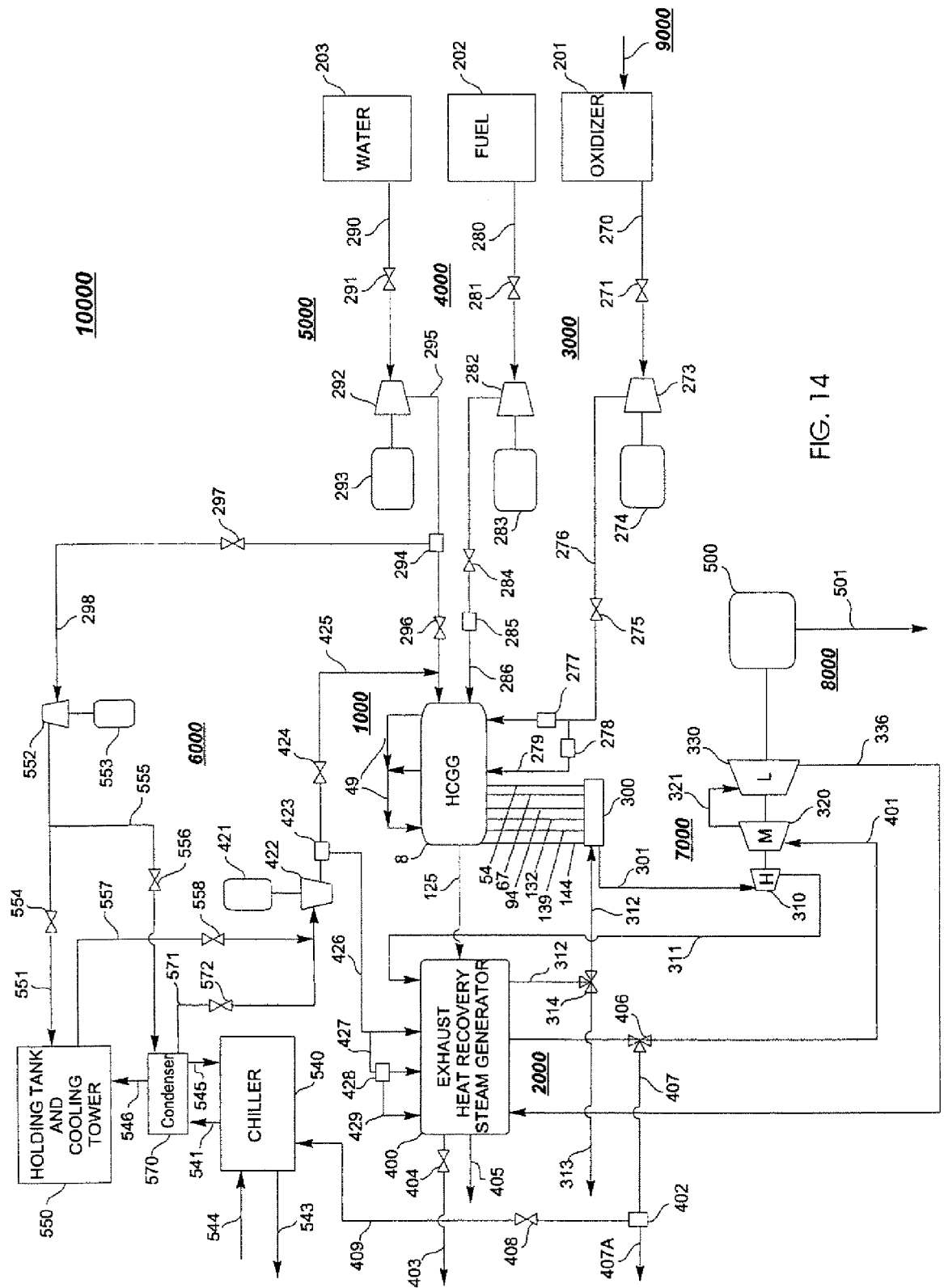
FIG. 14 is a process flow diagram showing one embodiment of a trigeneration steam energy generating plant including a hydrocarbon combustion gas generator described herein.

Moreover, the additional (separate) steam that may be generated through heat transfer from combustion gas exhaust produced by the processes and apparatuses, for example, if they are permitted to enter into a boiler or exhaust heat recovery steam generator, as is shown in FIG. 14, rather than being released into the atmosphere, generally contain no (0%) environmental pollutants. This is because, in contrast with many other methods and apparatuses for producing steam, power or energy, the combustion gas exhaust produced by the present processes and apparatuses generally do not contact the steam.

If any environmental pollutants and/or hazardous materials are produced by the present methods and/or apparatuses, they will generally exist in the combustion gas exhaust produced in the last combustion chamber or area, for example in the second combustion chamber if a third combustion area is not used, and will generally depend upon the elements present in the particular fuels used. The amount of such environmental pollutants and/or hazardous materials will generally be below the amount of environmental pollutants and/or hazardous materials present in a combustion gas exhaust product produced by the combustion of the same (or a different) fuel, and the same amount thereof, in a conventional fuel-burning apparatus, facility or process, such as a conventional coal-burning power plant or a conventional boiler, many of which employ air as the oxidizer and/or burn fuel incompletely, as measured in pounds of pollutant per million standard cubic feet of fuel fired, in tons per year, in emission factor rating, or by any other suitable method. Such amount generally ranges from about 0 to about 5 wt %, and preferably ranges from about 0 to about 3 wt %, and still more preferably ranges from about 0 to about 1 wt %. For example, if natural gas is employed as the fuel in a process or apparatus of the invention, the only components that will generally be present in the combustion gas exhaust product produced will be the molecules of water vapor ($H_2O$) and $CO_2$. The water vapor is non-hazardous and non-polluting, and the $CO_2$, which is not a criteria air pollutant, can be captured and used as described herein.

Further, depending upon the fuels or fuel components employed, the present methods and apparatuses generally do not produce, or significantly reduce the quantity of, $NO_x$ or mercury (in the combustion gas exhaust product that exits the last combustion chamber or area of the apparatuses), These methods and apparatuses can generally achieve up to a 100% reduction in the emissions of these environmental pollutants or hazardous materials in comparison with conventional methods for producing energy, electricity or steam (any type) that generate environmental pollutants and/or hazardous materials, such as coal-burning power plants.

Moreover, depending upon the fuels or fuel components employed, the methods and apparatuses of the invention generally either do not produce, or significantly reduce the quantity of, other environmental pollutants and hazardous materials (in the combustion gas exhaust product that exits the last combustion chamber or area and elsewhere), including NO, $NO_2$, $N_2O$, $NH_3$, $SO_x$, $SO_2$, CO, HCl, $CH_4$, VOCs, benzene, hydrogen fluoride, hydrogen sulfide, poly-aromatic compounds, hexachlorobutadiene, ethylene dibromide, dioxin, arsenic, uranium, thorium, radium, radon, polonium, bismuth and lead, other carcinogenic, mutagenic and/or radioactive substances and particulate matter in comparison with other methods and apparatuses for producing energy, electricity or steam (any type) that generate environmental pollutants and/or hazardous materials, such as conventional coal-burning power plants. For example, compared to a conventional coal-burning power plant, the present methods and apparatuses will generally reduce the emissions of the foregoing environmental pollutants and hazardous materials by at least about 50%, preferably by at least about 75%, and still more preferably by from about 90 to about 100%. Thus, the amount of air pollution produced by the present processes and apparatuses is generally significantly reduced or eliminated in comparison with the air pollution caused by conventional production of energy, electricity or steam, such as the methods used by conventional coal-burning power plants.

The combustion gas exhaust product produced in the final (last) combustion chamber or area by the present methods and apparatuses is generally environmentally clean, and will preferably contain an amount of environmental pollutants and/or hazardous materials that range from about 0 to about 30 wt % more preferably from about 0 to about 7 wt %, and still more preferably from about 0 to about 1 wt % of the combustion gas exhaust product, Further, some environmental pollutants, such as $CO_2$ and $SO_2$, that may be produced, depending upon the fuel or fuel components that are used, may be recovered using conventional methods and equipment. For example, when hydrogen is employed as the fuel in the present processes and apparatuses, the only products that will generally be present in the combustion gas exhaust product will be heat and water. Thus, the combustion gas exhaust product will generally have 0% environmental pollutants and hazardous materials. The superheated steam product or dry saturated steam product will generally also have 0% environmental pollutants and hazardous materials.

Many energy-producing companies use coal as the fuel in their processes and apparatuses. A typical 500-MW coal-burning power plant produces 3.5 billion kilowatt-hours of electrical power per year. To produce this amount of electrical power, the power plant needs to burn about 1.43 million tons of coal per year. The table below compares the amounts of the environmental pollutants and/or hazardous materials sulfur dioxide, nitrogen oxides, carbon dioxide, carbon monoxide, arsenic, lead, cadmium, small particles (in particulate matter), ash and sludge produced per year by a coal-burning power plant that burns 1.43 million tons of coal per year and that would theoretically be predicted to be produced by one of the present apparatuses that produces the same amount of electrical power using the fuel designated EF-10, which may have an energy value of about 31,680 BTU/lb.

| Pollutants from Burning 1.43 Million Tons of Fuel | | |
|---|---|---|
| Pollutant | Coal-Burning Power Plant | Apparatus of the Invention |
| Sulfur Dioxide ($SO_2$) | 10,000 Tons | 0 Tons |
| Nitrogen Oxides (NOx) | 10,200 Tons | 0 Tons |
| Carbon Dioxide ($CO_2$) | 3,700,000 Tons | 243,646 Tons |
| Carbon Monoxide (CO) | 720 Tons | 0 Tons |
| Arsenic | 225 Pounds | 0 Pounds |
| Lead | 114 Pounds | 0 Pounds |
| Cadmium | 4 Pounds | 0 Pounds |
| Small Particles (in Particulate Matter) | 500 Tons | 0 Tons |
| Ash | 125,000 Tons | 0 Tons |
| Sludge | 193,000 Tons | 0 Tons |
| Total | 4,039,763 Tons | 243,646 Tons |

This table shows that, when the same amount of electrical power is produced, the present processes and apparatuses produce no sulfur dioxide, no nitrogen oxides, no carbon monoxide, no arsenic, no lead, no cadmium, no particulate matter, no ash, no sludge, and about 15 times less carbon dioxide, reducing the total amount of environmental pollutants and/or hazardous materials produced by about 94%, in comparison with a conventional coal-burning power plant.

In contrast with many conventional methods for producing electrical power, the present apparatuses do not generally require the use of any pollution control devices or systems, such as an air pollution control device, to maintain the products of the apparatuses (e.g., one or more steam products and combustion gas exhaust products) environmentally clean.

Capture, Separation and Use of $CO_2$

Up to about 90% (or higher) of the $CO_2$ produced by the present methods/apparatuses can, optionally, be captured and separated from other components, such as $H_2O$, using conventional methods and equipment. Methods for this include chemical absorption using a solvent, such as monoethanolomine, physical absorption, cryogenic distillation and/or membrane separation techniques. The Wittemann Company, LLC (Palm Coast, Fla.), for example, markets $CO_2$ recovery systems and equipment that extract $CO_2$ from products, such as off-gases, and clean the $CO_2$ to a desired or required purity level using techniques such as sulfur, activated carbon and $NO_x$ removal techniques, scrubbing, dehydration, liquefaction and stripping. The resulting $CO_2$ may then be liquefied and employed in the cryogenic grinding process described herein, or sold to a variety of end-users.

Conversion of Water to a Superheated or Dry Saturated Steam Product

The present processes and apparatuses convert water that is introduced into the apparatuses outside of the combustion chambers and/or areas into a superheated or dry saturated steam product that may contain superheated steam, dry saturated steam and/or both types of steam at one or more locations. The superheated steam, dry saturated steam and/or combination of the two steams can exit the apparatuses at one or more locations (through one or more superheated steam exit means) and travel into a central or other superheated steam product collection device. The superheated steam and dry saturated steam can, optionally, be separated using conventional steam separation equipment, and can be used (each one separately or together) to produce electrical power, for example, in a steam turbine. Generally, when superheated steam and dry saturated steam travel toward a turbine (or other electrical power generating device) together, the metal passageways leading to the turbine withdraw some of the energy away from the superheated steam and dry saturated steam, causing both types of steam to drop in temperature. However, the superheated steam generally gives this energy back to the dry saturated steam.

Steam often carries tiny droplets of water with it. Steam quality is described by its "dryness fraction," which is the proportion of completely dry steam in the steam being considered. The steam becomes "wet" if water droplets in suspension are present in the steam space, carrying no specific enthalpy of evaporation. "Wet steam" has a heat content substantially lower than that of dry saturated steam at the same pressure. The small droplets of water in wet steam have weight, but occupy negligible space. The dryness fraction of the steam generally depends upon the particular steam production apparatus design and capacity. Superheated steam has several important properties that make it ideal for work and mass transfer. First, superheated steam is totally dry steam, which is beneficial because, when water carryover occurs in a combustion apparatus, e.g., a boiler or generator, although the water can be removed from the steam (with steam separators and/or steam traps), the separation of water from steam can still be complex. However, if a small amount of superheat is added to the steam, the water carryover can be vaporized to absolutely dry steam. In this way, the potential for wet steam to damage turbines and other power generating equipment is removed.

Second, although superheated steam drops in temperature as it gives up its superheat, superheated steam can lose heat without condensing. When superheated steam gives up some of its enthalpy, it does so by virtue of a fall in temperature. No condensation will occur until the saturation temperature of the steam has been reached. Saturated steam, in contrast, cannot lose heat without condensing. Saturated steam readily condenses on any surface that is at a lower temperature than the saturated steam, and gives up the enthalpy of evaporation, which is the greater proportion of its energy content. Thus, as saturated steam passes through long distribution mains, it loses some heat through the pipe and the insulation, resulting in some of the saturated steam condensing therein. The resulting water, if not removed, can cause erosive damage to piping, valves, heat exchange equipment, turbines and similar equipment. In contrast, no condensate exists in distribution mains that contain superheated steam. Further, steam that is slightly superheated can be transported through long lines without losing sufficient heat to condense, thereby eliminating the danger of damage.

As steam pressure rises, the total heat available rises. If pressure is reduced through valves, extra heat is available in the lower pressure steam. The pressure reduction generates a small amount of superheat in this steam.

The primary reason for producing superheat in the processes and apparatuses is to achieve a safe and efficient transfer or work energy in a wide variety of applications requiring the generation of powerful forces, such as pumps, engines, turbines and other power generating equipment. Superheated steam is preferred in such applications, as it can expand, giving off its excess heat without condensing. Depending upon the efficiency of work energy desired and the power requirements, the superheat may or may not be permitted to condense in the turbine. In high speed light rotor turbines, the fragility of the rotor vanes, and the velocities of steam passage, often require dry steam operation. In either case, turbine operation using superheated steam is more efficient than using dry saturated steam.

Because superheated steam may not be present in the apparatus at start-up, manually opening (or other) valves can be employed at this point in the operation to remove water (because time is generally available to open and close the valves). However, emergencies such as superheater loss and bypass could require operation with saturated steam. During such potential unscheduled shut-downs, no time may be available for manually opening valves. Thus, steam traps may be used to drain condensate instead. In the system shown in FIG. 14, these steam traps may be positioned at one or more locations as known in the art to insure the production and transport of the highest quality of steam. A suitable inverted bucket steam trap is preferred for superheat conditions.

During start-up, large lines may be started from cold conditions. At low pressures, only saturated steam may be in water lines and tubes (until the line temperature can be increased). This is preferably accomplished over time (e.g., less than about 5 minutes) to avoid stress on the lines. Typical start-up loads can be calculated as follows:

$$C = \frac{W(t_1 - t_2) \cdot 114}{H}$$

where:
C=amount of condensate (in pounds);
W=total weight of pipe (in pounds);
$t_1$=steam temperature (in °F.);
$t_2$=ambient temperature (in °F.); and
H=latent heat of steam (in BTU per pound).

With respect to the H variable, for long warm-up times, the total heat of saturated steam at the superheated steam supply pressure minus the sensible heat of saturated steam at the average pressure during the warm-up time involved should be used.

The chemical energy contained in the hydrocarbon or other fuels, or fuel components, that are used in the present apparatuses converts into heat energy when the fuels are burned. That heat energy is transmitted through the sidewalls of combustion chambers and/or areas of the apparatuses to water that is preferably in tube assemblies. The temperature of the water increases from the heat energy until its saturation point is reached (i.e., it boils). Heat transfer continues from the sidewalls of the combustion chambers and/or areas to the water. The additional enthalpy ("enthalpy of evaporation") produced by this heat transfer generally does not increase the water temperature, but evaporates the water, converting it to steam.

As a result of the release of a superheated or dry saturated steam product produced by the high temperature combustion processes that occur in the different combustion chambers and/or areas of the present apparatus, and of the water that circulates near each of these combustion chambers and/or areas, the apparatus transform the water into an efficient, high-energy and high-purity superheated or dry saturated steam product generally at least at the locations of each of the different combustion chambers and/or areas, as is shown in FIG. 1. The temperatures used in the present processes and apparatus are so hot that the water generally converts into a superheated or dry saturated steam product essentially instantaneously. The superheated or dry saturated steam product is then channeled through one or more superheated steam product exit means to one or more superheated steam product collection devices. From these collection devices, the steam product is generally transported to electrical power generation devices, such as steam turbines, where the energy in the form of superheated steam and/or dry saturated steam is converted into mechanical energy. The mechanical energy drives the power generation device which, in turn, produces electricity.

The amount of steam produced by the present processes and apparatuses will vary, depending upon the size of the particular apparatus used. An apparatus as is described in Example 1 is capable of producing from about 18,880 to about 36,500 lb/hr of dry saturated steam, and from about 16,320 to about 31,100 lb/hr of superheated steam, at the temperatures and pressures described in the Example. It preferably produces about 36,466 lb/hr of dry saturated steam and about 31,062 lb/hr of superheated steam, which could generate about 10 MW of electricity per hour.

The weight percent of superheated steam and dry saturated steam in each steam product produced by the present processes and apparatuses will generally depend upon the particular temperatures and pressures used, and can be readily manipulated by one skilled in the art using, for example, conventional temperature and/or pressure relief valves at one or more various locations on the apparatus.

The steam product produced by the present processes and apparatuses generally contains from about 0 to about 100 wt % of dry saturated steam, and from about 0 to about 100 wt % superheated steam. Preferably, the steam product contains 100 wt % superheated steam. If the superheated or dry saturated steam product produced by the processes and apparatuses of the invention does contain dry saturated steam, it is preferable that the weight percent of the dry saturated steam in the superheated steam product does not exceed about 76 wt % (with the remainder generally being superheated steam), and more preferably not exceed about 30 wt % (with the remainder generally being superheated steam). The dry saturated steam can be separated from the superheated steam using conventional steam separation equipment. Any water and/or wet steam initially present in the steam products can be separated from the dry saturated steam and/or superheated steam using conventional equipment, such as desiccators.

Steam Produced by the Combustion Gas Exhaust Product

The hot combustion gas exhaust product that exits the last combustion chamber or area of the present apparatuses is preferably attached to another source of water, such as a conventional boiler, or an exhaust heat recovery steam generator, as is shown in FIG. 14, where the combustion gas exhaust product can be cooled to a temperature of about 230° F. or higher and, thereby, produce a separate steam product (separate from the superheated or dry saturated steam product produced by the apparatuses), which may contain any combination in any weight percent of the foregoing types of steam. The various types of steam in this steam product may then be separated from each other so that the different types of steam can be separately used in various applications. Any superheated steam or dry saturated steam produced will generally be used as described above. Any wet steam produced preferably is transported to an overflow area and condensed. It can then be discharged to a holding pond or recirculated into the hydrocarbon combustion gas generator and used as make-up water.

The heat energy produced by the present processes and apparatuses may also be employed for steam absorption, water chilling, drying, heating and like processes, including quadgeneration (the simultaneous or consecutive generation of power, steam, chilled water and/or hot water, etc.).

The purity of the steam product (steam purity) that may be produced using the combustion gas exhaust product that exits the final combustion chamber or area of the apparatuses is preferably below about 1.0 ppm total solids, and is more preferably below about 0.1 ppm total solids.

A combustion gas exhaust product produced by the present apparatus having a configuration as is shown in FIG. 1, and being a free-standing unit that is approximately 10 to 14 ft. long, 2 to 3 ft. wide and 5 ft. high, and that is diverted to an exhaust heat recovery steam generator, such as is shown in FIG. 14, can generate from about 10 to about 15 MW of electricity (in addition to the electricity that could be generated by the steam that is produced by the apparatus). Combustion gas exhaust products that are produced by larger apparatuses, and that are diverted to exhaust heat recovery steam generators, can produce quantities of electrical power greater than about 10 to about 15 MW of electricity (in addition to the electricity that could be generated by the steam that is produced by the apparatus).

Size, Type and Transportability of Apparatuses

The apparatuses can be produced in any desired or convenient size and/or shape capable of producing desired results, and may be scaled in size to properly fit a wide variety of industrial applications, such as the generation of electrical power independent from the power grid, stand-by emergency electrical power, for example, during a failure of the power grid, use during peak use times, portable remote site electrical power, steam train electrical power, ocean vessel electrical power and similar applications. The apparatuses may be used to provide electrical power to factories and hospitals, in power parks, and inside and/or outside of buildings.

The apparatuses, which preferably have no, or few, moving parts, may be compact, and can advantageously be freestanding (stand-alone) generation systems or supplemental generation systems (supplemental to, or integrated with, some other type of a system or apparatus) for the efficient production of a sufficient amount of reliable electrical power for peak power demand and uninterruptible electrical users. The apparatuses may be easily installed and serviced, with removable parts being easily replaced, are compatible with conventional electrical generating systems, and can be retrofit into existing power generation systems having burned-out or obsolete boilers.

A preferred hydrocarbon combustion gas generator of the invention, which could generally produce from about 5 to about 30 MW of electricity per day, is a free-standing unit that is approximately 10 to 14 ft. long, 2 to 3 ft. wide and 5 ft. high (including 3-foot legs), and that is placed on a slab of concrete (or other durable material) that is approximately 10 ft. long and 10 ft. wide. Such a hydrocarbon combustion gas generator would require from about 3.75 to about 100 times less space than that of conventional electrical power producing plants, while producing approximately the same amount of electrical power as conventional power producing plants. For example, in order to produce about 25 MW of energy per day, coal, natural gas, nuclear, wind and geothermal power plants would require several times more acreage than a plant comprising the above-described combustion gas generator.

Two or more of the apparatus optionally can operate with one another in a parallel. For example, three 15-MW combustion gas generators could positioned and operated together to produce 45 MW of energy.

The sizes of the various components of the apparatuses may vary widely, depending upon the sizes of the entire apparatuses. Advantageously, the apparatus is easily transportable from location to location by, for example, truck, train, or ship.

Because most of the mechanical parts of ships, such as their engines, are powered by energy in the form of steam, the present apparatuses can be used on ships to permit the ships to remain away from land for longer periods of time than would otherwise be possible. Further, all of the hydrocarbon waste materials generated on the ships could be used as a fuel in the apparatus, thereby providing a means for reducing these hydrocarbon waste materials without returning to land or dumping them at sea, and eliminating or reducing the need for fuel to be brought to the ship from land.

Lack of Corrosion

Because the combustion gas exhaust products that are produced by the present processes and apparatuses do not generally exit into (or otherwise come into contact with) turbines, condensers or other electrical power-generating equipment, and because the processes and apparatuses of the invention generally produce from about 90 to about 99 wt % dry steam (dry saturated steam and/or superheated steam), rather than wet steam, these processes and apparatuses advantageously do not generally cause corrosion (the dissolving and/or wearing away of parts, such as metal blades, and/or the production of a build-up of substances, such as rust, on or in the parts) or other damage or destruction to turbines, condensers and other electrical power generating equipment, or to components thereof.

Ease and Speed of Start-Up

Many conventional fuel-burning, steam producing and/or power generating systems or plants, such as nuclear power plants, require lengthy start-up periods, e.g., at least 24 hours, and complex procedures, to become fully operational after their operation commences, either initially and/or after a scheduled or emergency shut down. In contrast, the present apparatuses generally only require a period of about 30 minutes or less, and more usually a period of about 5 minutes or less, and often a period of about 10 seconds or less, and procedures that are not complex, to become fully operational upon start-up. Thus, the apparatuses are capable of producing products that can be employed in the generation of electrical power while having virtually no, or only small periods of, interruption of electrical power service, likely saving money, time and/or inconvenience for users of electrical power.

Amount of Electrical Power Produced

The present apparatuses are preferably stand-alone generators that are capable of continuous operation (24 hours/day, 7 days/week). In addition, more than one apparatus preferably operates at one location at the same time.

The present processes and apparatuses preferably produce from about 5 to about 600 MW of electrical power per day, more preferably produce from about 100 to about 200 MW of electrical power per day. Thus, for example, running at about a 60% cycle (a 60% capacity), a 10-MW apparatus would be capable of producing about 6 MW/day of electrical power. When more than one apparatus is operating at one location at the same time, by increasing the output of the other apparatuses, the remaining apparatus(es) can maintain the entire system running at 100% if one of the apparatuses is not operating.

To maximize efficiency and produce the cleanest products possible with the present processes and apparatuses, air preferably is not permitted to enter the systems and heat losses from the system are minimized.

The processes and apparatuses have a combustion efficiency that generally ranges from about 50% to about 100% (producing thermal energy using at least about 50%, and up to 100%, of the BTU present in the particular fuel or fuel components employed therein), more preferably from about 70% to about 100%, still more preferably from about 90% to about 100%, even more preferably from about 95% to about 100%, and most preferably from about 97% to about 100%. In other words, for every 100 BTU present in the fuels used in these processes and apparatuses, preferably at least about 50 BTU, most preferably at least about 100 BTU, are converted to thermal energy (with the remainder becoming waste heat). In contrast, the combustion efficiency of conventional coal-burning power plants peaks at about 33%, with about 67% of the coal's potential energy lost as waste heat. The combustion efficiency of conventional natural gas-burning power plants is about 35-50%, with about 50-65% percent of the natural gas potential energy lost as waste heat.

The processes and apparatuses have a thermal efficiency that generally ranges from about 50% to about 87%, more preferably from about 65% to about 87%, more preferably from about 75% to about 87%, even more preferably from about 80% to about 87%, and most preferably from about 84% to about 87%. In contrast, the thermal efficiency of power plants is about 34%. The heat rate of these plants is about 10,000 BTU of fuel heat burned per kilowatt hour (kWh) of electricity produced. Furthermore, in contrast with the present apparatuses, those plants are generally slow to start-up or to change output while operating.

Costs of Producing Electrical Power

When waste materials are employed as fuels or fuel components, and tipping fees and/or other revenue-generating fees are obtained by the user of the waste materials, such cost will generally be further reduced, and significantly reduced in comparison with the costs of producing electricity via other methods, such as via conventional coal-burning, natural-gas, fuel cell or nuclear energy power plants. Under these circumstances, the present processes and apparatuses are capable of producing electrical power at an overall cost that ranges from about 0.003 to about 0.009 cents per kilowatt-hour. The low overall costs of producing electrical power that may be achieved using the processes and apparatuses are generally less than the overall costs of producing electrical power via other methods and apparatuses, due to: (a) the high combustion efficiency that may be achieved by the present processes and apparatuses; (b) the use of fuels such as carpet scraps, that are readily available free of charge: (c) the receipt of waste disposal (recycling) fees for the use of certain hydrocarbon waste materials, such as scrap tires, as fuels; (d) the revenue generated by the sale of electricity; (e) the revenue generated by the sale of components of waste materials, such as the metal from scrap tires, to other markets; and/or (f) the revenue generated by the sale of combustion gas exhaust product components, such as ash, nitrogen, $CO_2$ or $SO_2$, to other markets.

Cogeneration, Trigeneration and Quadgeneration

The present processes and apparatuses can be used in a cogeneration system, in a trigeneration system, in a quadgeneration system and in similar systems, or can be used in a conventional manner to generate heat and electrical power separately.

Temperatures Pressures and Times

The processes and apparatuses produce a superheated steam product or a saturated steam product under conditions (e.g., oxidizer, fuel and water flow rates, temperatures and pressures at different locations) that may vary depending upon, for example, the size of the particular apparatus, whether one or more apparatuses are used together, the combustion efficiency desired, the diameters of the water, fuel and oxidizer inlets and outlets, the diameters of the steam product outlets, etc. The conditions may be varied to accomplish desired objectives as known in the art.

Purging the Apparatuses

It is preferable that prior to and after operation of the apparatus, it is purged with an inert gas, such as nitrogen. The purging should provide safety checks that: (a) no components of the apparatuses, such as fuel or oxidizer feed lines, are obstructed; (b) all of the components of the apparatuses are functioning properly; (c) the interiors of the apparatuses are clean (free from debris, such as fuel or oxidizer residue, waste vapors and the like); and/or (d) no leaks are present.

Destruction of Hazardous Materials

Depending upon the type of hazardous materials, the processes and apparatuses of may also be employed to safely, rapidly, inexpensively, efficiently and completely destroy certain hazardous materials (by rendering these materials non-hazardous) either without producing undesired environmental pollutants, or with the production of said pollutants at a level that is below that of pollutants produced by conventional methods for destroying hazardous materials, and without placing the hazardous materials in landfills, bodies of water, or other receptacles.

When hazardous materials are used as fuels or fuel components in the present processes and apparatuses, the hazardous materials will generally be completely destroyed by being disassociated into non-hazardous components. For example, when polyvinyl chloride is used as a fuel, the resulting products (a combustion gas exhaust product and/or a separate steam product produced using the combustion gas exhaust product) will generally not contain any carcinogens. The transformation of hazardous materials into non-hazardous materials by the processes and apparatuses appears to result from a combination of the use of high temperatures and pressures, and of a lack of air in the processes and apparatuses. (The processes and apparatuses use temperatures that are approximately two times hotter that the temperatures employed in most coal-burning power plants.) Thus, the processes and apparatuses can be used by, for example, the military and health industries, to transform hazardous materials into non-hazardous materials.

The hazardous materials that are to be transformed into non-hazardous materials in accordance with the processes and apparatuses can serve as the fuels or fuel components in these processes and apparatuses, with no additional fuels or fuel components being necessary. However, one or more additional fuels, or fuel components, may optionally also be used.

Materials

The various components of the apparatuses may be manufactured using a wide variety of different metals or ceramic materials. However, the metals and ceramic materials used preferably have good mechanical characteristics, an ability to resist oxidation, corrosion and stress, and an ability to withstand the high temperatures described herein. Unless otherwise specified herein, all of the various components or other parts of the apparatus are preferably made of ferritic and/or austenitic steel.

Combustion chambers and/or areas and heat exchangers employed in the processes and apparatuses may be formed from any suitable high temperature, thermally-conductive, metals, such as steel alloyed with nickel, chromium, cobalt, or nickel or copper alloys, such as BeCu, Cu, Ag—Cu, or a combination thereof, or can be lined with a refractory material, such as molybdenum, tungsten, tantalum, or the like, for high steam temperatures.

All of the materials, components and equipment used to perform the present processes or to make the apparatuses are commercially available. Sources for these items include, for example, Pechiney Chemicals Division (Stamford, Conn.), Praxair, Inc. (Danbury, Conn.), and Airgas, Inc. (Radnor, Pa.).

Preferred Embodiments of the Invention

For the purpose of illustrating the present processes, apparatuses, uses and methods of manufacture, the drawings show various views of a preferred embodiment of the apparatus and its use in a trigeneration system.

The various components or parts of the preferred embodiment of the apparatuses may be generally arranged in the manner shown in the drawings, or described hereinbelow, or otherwise. The invention is not limited to the precise arrangements, configurations, dimensions, instrumentalities, components, angles, reactant or product flow directions or conditions shown in the drawings or described herein. These arrangements, configurations, dimensions, instrumentalities, components, angles, reactant or product flow directions and/or conditions can differ as circumstances require or as desired. For example, fewer or additional fuel inlets, fuel chambers, tubes, orifices, etc. can be used. Further, these components may be arranged differently. One, two, three, four or more additional combustion chambers and/or areas may also be included. The location of the various components of the apparatus and the means for securing parts together may also be varied. Moreover, various components can be integrally formed for a unitary structure, rather than joining two parts together. For example, the sixth superheated steam product outlet may be attached to the third superheated steam product exit manifold by any suitable means for attaching these two components of the apparatuses together. Alternatively, the sixth superheated steam product outlet and the third superheated steam product exit manifold can be manufactured in one piece from one piece of material. Still further, various components, parts and/or areas of the apparatus can be permanently or removably attached with other components, parts and/or areas of the apparatus, and may be movable or immovable. Removably attached components and parts are often preferable because such components and parts may generally be replaced more easily and cost effectively as needed.

Description of a Preferred Apparatus

A preferred embodiment of the present combustion apparatus is described with reference to the drawings. In these drawings, all references, numbers and descriptions relating to superheated steam products are equally applicable to dry saturated steam products.

In FIGS. 1 to 3, a hydrocarbon combustion gas generator ("generator") 8 is shown. The generator has two separate combustion chambers (a first combustion chamber 70 and a second combustion chamber 100), as well as a third combustion area 120, where three separate combustion reactions occur (a first incomplete combustion reaction, a second incomplete combustion reaction and a third complete combustion reaction). Oxidizer and fuel reactants flow generally from left to right in the generator shown in these Figures (from upstream to downstream, and from the forward end to the aft end of the generator). The generator has no moving parts. FIGS. 4-13 show cross sectional and/or detailed views of some of the individual components of the generator 8 shown in FIGS. 1 to 3.

As is shown in FIGS. 1 to 3, many of the components, parts and/or areas of the generator 8 are preferably present at more than one location in, or on, the generator 8, both above and below the various combustion chambers and/or areas. Thus, all description herein regarding one component, part and/or area of the generator shall refer to all of the same type of components, parts and/or areas that may be in or on the generator. For example, all description of a first water manifold 51 apply to both of the first water manifolds 51 shown in FIG. 1 (one shown above and one shown below the first combustion chamber 70).

The first combustion chamber 70 and the second combustion chamber 100 are each preferably cylindrical hollow tubes having sidewalls formed by tube assemblies and/or tubes and open forward and aft ends. The forward ends of the first combustion chamber 70 and the second combustion chamber 100 are defined by other components of the generator 8 (a first oxidizer manifold plate 40 and a second transfer injector plate 84, respectively). The aft end of the first combustion 70 chamber is formed by another component of the generator 8 (a fuel wear plate 63). The aft end of the second combustion 100 chamber is open (has no wall or other barrier), and is connected with the open (containing no wall or other barrier) forward end of the third combustion area 120. The third combustion area 120 is also preferably a cylindrical hollow tube. The aft end of the third combustion area 120 is also open (contains no wall or other barrier), allowing combustion gas exhaust product produced in the generator 8 to exit out of the generator 8 (e.g., to the atmosphere, a boiler, or an exhaust heat recovery steam generator), and is positioned in a manner that angles away from the forward end of the third combustion area 120 (toward the outside environment), and away from the generator 8.

One or more fuels and oxidizers are injected into the forward end of the first combustion chamber 70 in suitable O/F mixture ratios, and under temperature, pressure and other conditions effective to yield a first stable partial (incomplete) combustion of the fuels therein. The combustion gas product produced in the first combustion chamber 70 as a result of the first combustion reaction flows under pressure into the second combustion chamber 100, where additional oxidizer is injected into the second combustion chamber 100, in a suitable O/F mixture ratio, and under temperature, pressure and other conditions effective to yield a second stable partial (incomplete) combustion of the fuels therein. The combustion gas product produced in the second combustion chamber 100 as a result of the second combustion reaction flows under pressure into the third combustion area 120, where additional oxidizer is injected into the third combustion area 120, in a suitable O/F mixture ratio, and under temperature, pressure and other conditions effective to yield a stable and final complete combustion of the fuels in the third combustion area 120 of the generator 8.

The sidewalls of the first combustion chamber 70, the second combustion chamber 100 and third combustion area 120 are formed by separate tube assemblies or tubes (a first tube assembly 71, a second tube assembly 101, a tube 121 and a third tube assembly 146, respectively) that contain (with the exception of the tube 121) one or more, and preferably multiple, tubes containing circulating water (or another suitable fluid). Preferably, the circulating water is conducted in a heat exchanging relationship with each of the combustion gas products that are produced during the three different combustion reactions. Heat present in combustion gas products generated during the three separate combustion processes becomes transferred through the tube assemblies and tube that form the sidewalls of the first combustion chamber 70, the second combustion chamber 100 and the third combustion area 120, thereby transforming the circulating water into a superheated or dry saturated steam product (preferably at a plurality of different locations of the generator 8). The superheated or dry saturated steam product produced is then collected in a conventional, and preferably central, collection device (not shown) or other utilization device, The superheated or dry saturated steam product collection device may be connected with a steam turbine, or other electrical power generating (or other) device or system, for the subsequent production of electrical power using the superheated or dry saturated steam product. A hot combustion gas exhaust product produced in the third combustion area 120 exits the third combustion area 120, where it may be released into the atmosphere, or used for the production of an additional, separate steam product. Conventional steam separation equipment can be used to separate the various types of steam that may be present in this separate steam product.

One or more liquid, solid and/or gaseous fuels, fuel components or fuel mixtures, such as sized reduced tire rubber obtained from the grinding of the rubber from scrap tires into a fine powder, is drawn from one or more sources of fuel, such as a fuel storage tank, through one or more suitable fuel supply control means, such as a flow control device regulated by a pump, or other suitable device, into a fuel inlet manifold 12, or into another means for receiving one or more fuels, fuel components or fuel mixtures. The flow control device used may be a pressure regulator, a cavitating fluid venturi control, a temperature sensing transducer, a pressure sensing transducer or other similar device known by one skilled in the art. At its forward end, the fuel inlet manifold 12 preferably has a flange or other means for securely connecting the fuel inlet manifold 12 with the flow control device. The means for connecting the fuel inlet manifold 12 with the flow control device is preferably a flange, which preferably contains one or more bolt holes, preferably equally spaced, permitting the uniform distribution of pressure over the fuel inlet manifold 12. One skilled in the art can readily determine the size, number, and spatial distribution of bolts/holes appropriate for a particular fuel inlet manifold 12 and a particular generator 8. Other secure connecting means can be used, including welding, socket head screws, pressure, pinning, riveting, epoxies or other adhesives, chemical bonding, heat sealing, and other methods/devices known in the art.

The flow rate of the fuels into the fuel inlet manifold 12 or that enter the generator 8 at one or more other locations will generally depend on several variables, including the fuel density, the O/F mixture ratios used, the diameter of the fuel flow control device employed, the pressure of the fuel, and the amount of heat energy produced by the generator 8. The O/F mixture ratio employed in the first combustion chamber 70 also will depend on several variables, such as the particular fuels, fuel components or fuel mixtures and oxidizers used, as certain fuels will require more or less oxidizer to consume the fuel. However, the flow rate of the fuels, fuel components or fuel mixtures that enter into the fuel inlet manifold 12 should be a rate that permits a "fuel rich" mixture of fuel and oxidizer to be present in the first combustion chamber 70. Such rates, and desirable O/F mixture ratios, may readily be determined by one skilled in the art.

As is shown in FIGS. 1 and 2, one or more additional fuels, fuel components or fuel mixtures may be drawn from one or more sources of fuel and travel into one or more separate, optional, fuel inlets 9, or another means for receiving one or more fuels, fuel components or fuel mixtures. The fuel inlets 9 preferably have one or more passageways, or other means for permitting the flow of the fuels, fuel components or fuel mixtures, that are separated from the fuels, fuel components or fuel mixtures present in the fuel inlet manifold 12, and that lead toward, and are adjacent with, the forward ends of one or more separate, optional, fuel chambers 10, or other means for housing and maintaining these fuels, fuel components or fuel mixtures separate from the other fuels, fuel components or fuels mixtures in the fuel inlet manifold 12. Such a configuration permits the dual, but separated, entry, storage and injection (simultaneously or at different times) into the first combustion chamber 70 of the generator 8 of one or more additional hydrocarbon or other fuels, fuel components or fuel mixtures, which may be incompatible or compatible, and in the same or in a different state (solid, liquid, gas, slurry, blend, etc.), with the fuels, fuel components or fuel mixtures that are chosen for use in the fuel inlet manifold 12. A second, third or other additional fuel, fuel component or fuel mixture could enhance the energy value of the first fuel, fuel component or fuel mixture. The additional fuels, fuel components or fuel mixtures may enter into the fuel inlets 9, and be injected into the first combustion chamber 70 of the generator 8, in the same or different manner as the fuels, fuel components or fuel mixtures that enter into the fuel inlet manifold 12.

For example, if it is desired to use two fuels or fuel components in the generator 8, and the fuels or fuel components chosen for use are gasoline and Styrofoam particles, the two fuels or fuel components would generally not be compatible because the gasoline would melt the Styrofoam particles, preventing the particles from being properly injected into the first combustion chamber 70. However, the configuration of the generator 8 shown in FIGS. 1 and 2 would allow the foregoing incompatible fuels and/or fuel components to each be used in the generator 8 at the same time. In another example, plastic particles could be used as one fuel or fuel component in the fuel inlet manifold 12 while hydrogen gas is employed as a second fuel or fuel component in the fuel inlets 9 and fuel chambers 10, providing the combination of fuels or fuel components in the first combustion chamber 70 having an energy value of about 40,000 BTU/lb of fuel, which is higher than the energy value that would have been present if the plastic particles were employed as the only fuel.

Alternatively, a liquid, gaseous or solid coolant, such as water, a fuel, an oil, steam, a powder or any other substance or material, or a combination thereof, that has suitable cooling properties can enter one or more of the fuel inlets 9 from a source of coolant. A conventional "film cooling" technique can be used by injecting the coolant from the fuel inlets 9 into one or more fuel chambers 10 in a radial manner, causing coolant to flow down first fuel port tubes 36 in the generator 8, thereby cooling the first fuel port tubes 36.

The one or more fuel chambers 10, which function as a second fuel manifold within the fuel inlet manifold 12, may be drilled into the fuel inlet manifold 12, preferably at the aft end, or placed into the fuel inlet manifold 12 in another suitable manner. The fuel inlets 9 may be connected with a source of fuel as described for the fuel inlet manifold 12. They may be attached to the fuel inlet manifold 12 by any suitable means for securing them to the fuel inlet manifold 12, such as described herein with respect to attachment of the fuel inlet manifold 12 with the flow control device.

The aft end of the fuel inlet manifold 12 preferably is attached to the forward end of a fuel metering block 30 with a means for securely attaching these two areas of the generator 8 together, such as one or more first attachment devices 14. Alternatively, the aft end of the fuel inlet manifold 12 can be welded to the forward end of the fuel metering block 30. Any suitable means or device for securely attaching the fuel inlet manifold 12 to the fuel metering block 30 may be used, including the methods and devices described hereinabove for attachment of the fuel inlet manifold 12 with the flow control device.

Preferably, the aft end of the fuel inlet manifold 12 contains a connection device, such as the connection device described hereinabove for the forward end of the fuel inlet manifold 12, that preferably has one or more bolt holes therein (as described hereinabove for the flange of the fuel inlet manifold 12). The first attachment devices 14 may be any devices suitable for securely attaching the two components of the generator 8 together, such as high strength bolts with nuts and accompanying lock washers as needed, socket head screws and other similar devices known in the art. The first attachment devices 14 may be varied to provide a secure attachment of the fuel inlet manifold 12 to the fuel metering block 30.

The aft end of the fuel metering block 30 preferably is attached to a first oxidizer manifold 41, a first oxidizer manifold plate 40 and a first water manifold 51 with a means for securely attaching these four areas of the generator 8 together, such as one or more second attachment devices 31. The second attachment devices 31 may be any devices that are suitable for securely attaching or otherwise fastening these areas of the generator 8 together, such as those described hereinabove for the first attachment devices 14. Preferably, the aft end of the fuel metering block 30, the first oxidizer manifold 41, the first oxidizer manifold plate 40 and the forward end of the first water manifold 51 each have one or more bolt holes therein. The type and number of second attachment devices 31 can be selected by those skilled in the art to provide a secure attachment of the fuel metering block 30 with the first oxidizer manifold 41, the first oxidizer manifold plate 40 and the first water manifold 51. The aft end of the fuel metering block 30 is attached to the forward end of the first oxidizer manifold 41, and the aft end of the first oxidizer manifold 41 is attached to the forward end of the first oxidizer manifold plate 40. The aft end of the first oxidizer manifold plate 40 is attached to the forward end of the first water manifold 51.

As is shown in FIG. 2, the fuel metering block 30 has a pocket preferably machined into its forward end. This pocket should be of a size (length and width) that permits an injector wear plate 32 to fit securely into the forward end of the fuel metering block 30.

The fuel metering block 30, a first oxidizer inlet 42 and the first oxidizer manifold plate 40 preferably each have one or more flame tube mounting holes 29a present therein, preferably at an angle (at an angle that leads from one or more means for initiating a combustion of fuel and oxidizer that are metered into the first combustion chamber 70 (such as one or more igniters 20) toward the center of the first combustion chamber 70). The flame tube mounting holes 29a preferably have approximately the same diameter as one or more flame tubes 29 that are preferably inserted into these flame tube mounting holes 29a, and that extend from the aft end of the mixing chamber 28 through the fuel metering block 30, the first oxidizer inlet 42 and the first oxidizer manifold plate 40, permitting flames to travel from the igniters 20 to the first combustion chamber 70. The flame tubes 29 are inserted into these flame tube mounting holes 29a, and are preferably spaced equally (with equal distances between them) through these components of the generator 8. However, they may be spaced or positioned in any other suitable manner. Gaskets or similar devices are preferably placed between the aft end of the fuel inlet manifold 12 and the forward end of the fuel metering block 30, and between the aft end of the fuel metering block 30 and the forward end of the first oxidizer manifold plate 40 to prevent the leakage of gases, heat or other substances in these areas. Optionally, an o-ring groove can be machined into one or more of these components, such as the aft end of the fuel metering block 30, permitting the insertion of an o-ring therein. The o-ring depth and width should be based upon the maximum allowable operating pressure (MAOP). The O-rings and/or gaskets used throughout the generator 8 are preferably suitable for high temperature and pressure applications as known in the art.

The injector wear plate 32 is preferably designed to allow one or preferably a plurality of first fuel port tubes 36, or other means for metering fuel into the first combustion chamber 70, to be removably inserted into one or preferably a plurality of first fuel ports 34. The size of the first fuel ports 34 and of the first fuel port tubes 36 can be varied as desired, depending for example on the type of fuels and sizes of particles used in solid fuels. The first fuel ports 34 are drilled, or otherwise made, by conventional methods through the injector wear plate 32, the fuel metering block 30, the first oxidizer manifold plate 40 and the first transfer injector plate 44, providing a series of hollow orifices (first fuel ports 34) that extend through each of these components of the generator 8, leading from the aft end of the fuel inlet manifold 12 to the forward end of the first combustion chamber 70.

The forward end of the first transfer injector plate 44 is attached to the aft end of the first oxidizer manifold plate 40. Any suitable means or device for securely, but preferably removably, attaching the first transfer injector plate 44 to the first oxidizer manifold plate 40 may be used, which includes the methods/devices described hereinabove for attachment of the fuel inlet manifold 12 with the flow control device.

The number of first fuel ports 34 used in the generator 8 preferably is the same as the number of first fuel port tubes 36 used, and can be varied as known in the art according to the type of fuel and the O/F mixture ratio selected. The diameter of the first fuel ports 34 should be a diameter that permits the first fuel port tubes 36 to be easily removably inserted into the first fuel ports 34, and to fit securely within the first fuel ports 34 during the operation of the generator 8. The first fuel port tubes 36 inserted into the first fuel ports 34 should allow an oxidizer to fuel ratio (O/F ratio) that will permit the mixture of the one or more fuels and one or more oxidizers that mix in the first combustion chamber 70 to be fuel rich. Because the oxidizers will preferably circulate through the fuel metering block 30 around the first fuel port tubes 36, the first fuel ports 34 and the first fuel port tubes 36 (and other components of the generator 8 that come into contact with oxidizers) should preferably be made of austenitic steel, which is compatible with (will not be deteriorated by) most oxidizers. The first fuel port tubes 36 are inserted into the forward end of the injector wear plate 32, and through the fuel metering block 30, the first oxidizer manifold plate 40 and the transfer injector plate 44.

As a result of pressure that is applied to the fuel, the fuel becomes metered from the forward end to the aft end of the fuel inlet manifold 12, and then from the forward end to the aft end of each of the first fuel port tubes 36 in the generator 8, where the pressure causes the fuel to be injected from each of the first fuel port tubes 36 into the forward end of the first combustion chamber 70.

One or more oxidizers, such as LOX, is drawn from one or more sources of oxidizer, e.g., an oxidizer storage tanks, through suitable flow control devices by a pump or other suitable device, into a first oxidizer inlet 42, or into another means for receiving oxidizer, which preferably is made of austenitic steel. The flow control device may be the same type of flow control device described hereinabove for sources of fuels. The flow rate of the oxidizer that enters the first oxidizer inlet 42 may be varied as known in the art for achieving a fuel rich mixture of fuel and oxidizer in the first combustion chamber 70. The oxidizer that enters the first oxidizer inlet 42 preferably has a temperature ranging from about −297° F. to about 80° F. (−183 to 27° C.), more preferably from about −180° F. to about −150° F. (−120 to −101° C.), most preferably about −50° F. (−46° C.).

Figure 5:
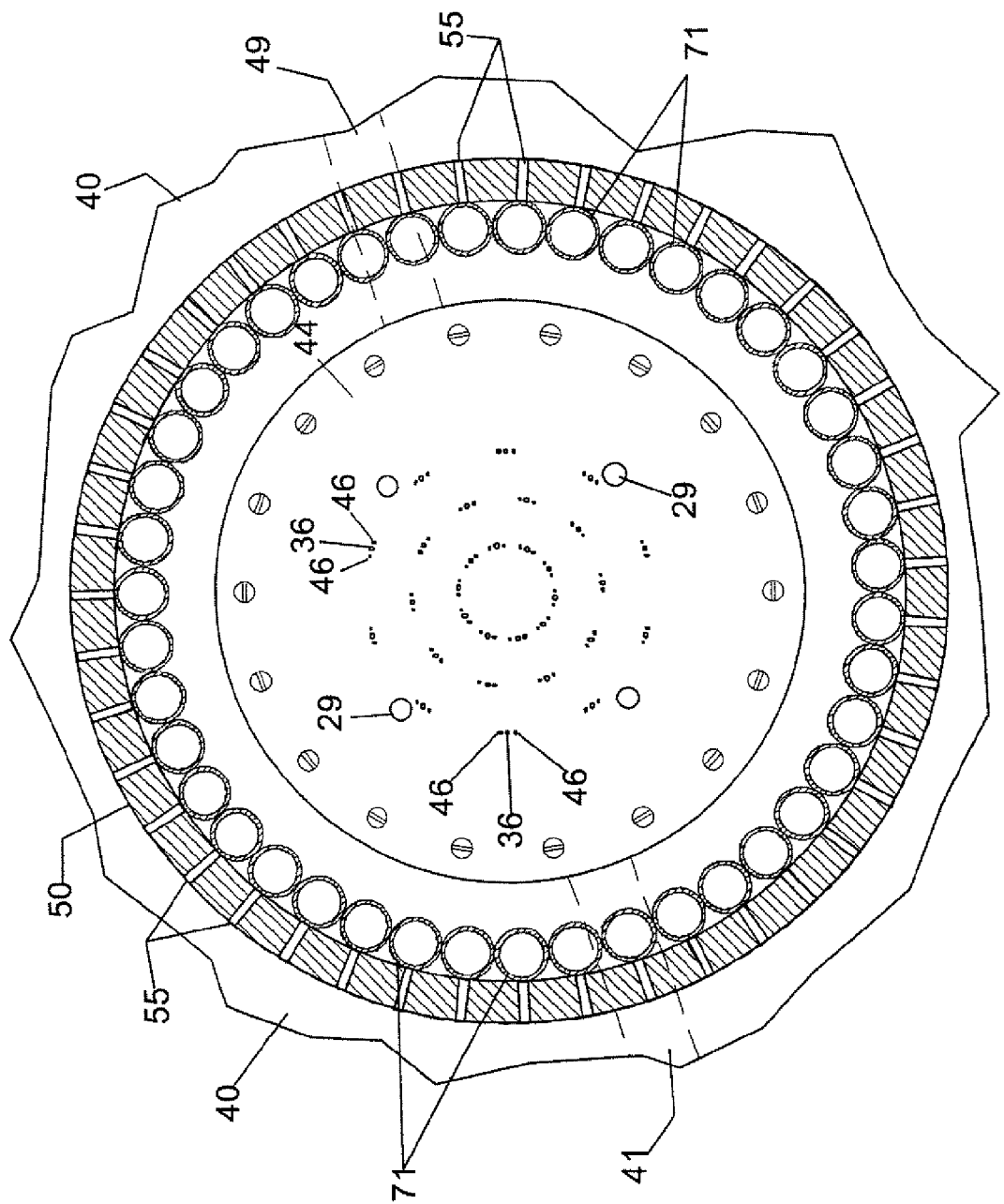
FIG. 5 is a cross-sectional view of the first oxidizer manifold 41, the first oxidizer manifold plate 40, the first oxidizer injector orifices 46, the first transfer injector plate 44, the first outer housing 50, the oxidizer transfer tube 49, the flame tubes 29, and the individual tubes of water of the first tube assembly 71 of the gas generator shown in FIG. 1, looking from the first combustion chamber 70 toward the fuel inlet manifold 12 and taken along plane 5-5 of FIG. 1.

The oxidizer flows into the first oxidizer inlet 42 under pressure, with this pressure causing the oxidizer to flow upwards into the first oxidizer manifold 41, or into another means for metering oxidizer into the first combustion chamber 70. The first oxidizer manifold 41 is located between the fuel metering block 30 and the first oxidizer manifold plate 40. The first oxidizer manifold 41, which is preferably made of austenitic steel, directs the oxidizer through one or more first oxidizer injector orifices 46 in the aft end of the first oxidizer manifold 41, and around the first fuel port tubes 36 preferably in a radial manner. The first fuel port tubes 36 and/or the first oxidizer injector orifices 46 are preferably oriented in the generator 8 in an angled manner that causes the fuel and oxidizer being metered into the first combustion chamber 70 to form one or more points of impingement, as shown in FIGS. 4, 5 and 11. Pressure causes the oxidizer to be injected from the first oxidizer injector orifices 46 through aligned holes in the first transfer injector plate 44 into the first combustion chamber 70, where the oxidizer mixes with the one or more fuels that are also metered therein for the first combustion reaction. A triplet impinging stream pattern would be formed from the fuel and the oxidizer being injected into the first combustion chamber 70 by the first fuel port tubes 36 and the first oxidizer injector orifices 46 shown in FIGS. 4 and 11. The first oxidizer injector orifices 46 also preferably are made of austenitic steel. The number of first oxidizer injector orifices 46 used in the generator 8 may depend upon the type of oxidizer used and the desired O/F mixture ratio. The optimal number of first oxidizer injector orifices 46 for a particular oxidizer and a particular O/F mixture ratio may be readily determined by one skilled in the art.

The oxidizer has a dual purpose when it is in the first oxidizer manifold 41. It travels into the first combustion chamber 70 for a first, partial, combustion reaction of the fuel, and it cools the aft side of the first transfer injector plate 44, which becomes hot from the first combustion reaction in the chamber 70. The first transfer injector plate 44, which is also preferably made of austenitic steel, transfers heat generated by the first combustion process to excess oxidizer that does not enter into the first oxidizer injector orifices 46, causing this excess oxidizer to become hot (generally vaporizing a liquid oxidizer). The excess hot oxidizer preferably flows under pressure into an oxidizer transfer tube 49, or into another means for receiving excess oxidizer, which is also preferably made of austenitic steel, and then is preferably directed under pressure to the third combustion area 120. Alternatively, the oxidizer flowing in the oxidizer transfer tube 49 may be vented (released into the atmosphere) or may flow to another combustion chamber or area. The oxidizer that flows to the third combustion area 120 will generally be in a semi-liquid/gas state (if the oxidizer used is a liquid) or in a gaseous state (if the oxidizer used in a gas) as a result of the heat transfer from the first transfer injector plate 44 to this oxidizer.

The fuel is metered through the first fuel port tubes 36, and the oxidizer is metered through the first oxidizer injector orifices 46, at a desired O/F mixture ratio, and each preferably at an angle, which permits a vortex to be formed from the flow of the fuel and the flow of the oxidizer. Incoming fuel and oxidizer, which causes a fuel-rich mixture of fuel and oxidizer in the first combustion chamber 70, is then ignited by the one or more igniters 20 (two shown in FIG. 1), causing the first, partial, combustion of the fuel in the first combustion chamber 70. While the order may be varied, it is preferable that the igniter 20 is operating, producing a spark that causes a ball of flame to extend from the forward end of the igniter 20 through the flame tube 29 into the first combustion chamber 70, prior to metering of the fuel and oxidizer into the first combustion chamber 70. It is also preferable that the fuel is metered into the first combustion chamber 70 prior to the oxidizer being metered into the first combustion chamber 70.

The one or more igniters 20 that are preferably employed in the generator 8 have an igniter housing 26 that is preferably securely attached to the forward end of the fuel metering block 30 by a suitable means for attaching these two components of the generator 8 together, such as by welding or other means for attachment described herein.

The one or more igniters 20 employed in the generator 8 are preferably electronic igniter systems that comprise: (a) an igniter housing 26 for housing the various components of the igniter 20; (b) an igniter fuel inlet 22 for permitting fuel from a source of fuel to enter into the igniter 20; (c) an igniter oxidizer inlet 24 for permitting oxidizer from a source of oxidizer to enter into the igniter 20, and which is preferably made of austenitic steel; (d) a mixing chamber 28 for the fuel and oxidizer used in the igniter 20 to mix; and (e) a flame tube 29 for a flame to propagate from the igniter into the first combustion chamber 70. The flame tube 29 preferably extends from the forward end of the igniter 20 to the forward end of the first combustion chamber 70. The aft end of the igniter housing 26 is preferably attached to the forward end of the fuel metering block 30. The igniter fuel inlet 22 and igniter oxidizer inlet 24 are preferably each connected with one or more sources of fuel and oxidizer, respectively, such as fuel and oxidizer storage tanks (not shown), and are each securely attached to the forward end of the igniter housing 26. One or more fuels and oxidizers for use in the igniters 20 are pumped (or otherwise caused to flow) into the igniter fuel inlet 22 and into the igniter oxidizer inlet 24, respectively. The fuels and oxidizers used in the igniter may be the same or different from the primary fuels and oxidizers described herein.

From two to four electronic igniters 20 are preferably used, with each igniter preferably causing a flame to propagate from the forward end to the aft end of the flame tube 29, with the flame then entering into the first combustion chamber 70. Preferably, the flow of oxidizer and the flow of fuel employed in the igniters 20 will intersect in the central area of the mixing chamber 28. Preferably, the flames flowing from the various flame tubes 29 will intersect at one or more common point, lines or areas in the first combustion chamber 70.

The fuel and oxidizer that flow into the mixing chambers 28 of the igniters 20 are preferably ignited by a spark caused electronically in the igniters 20. The flames produced by the ignition of the mixture of fuel and oxidizer then propagates down the flame tubes 29 into the first combustion chamber 70.

Once fuel and oxidizer are metered into the first combustion chamber 70 by the first fuel port tubes 36 and the first oxidizer injector orifices 46, respectively, the resulting mixture of fuel and oxidizer in the first combustion chamber 70 will ignite, initiating the first, partial, combustion process in the first combustion chamber 70. Once the combustion reaction commences in the first combustion chamber 70, the operation of the igniters 20 is preferably terminated, so that sparks will no longer be produced, and the flow of oxidizer into the mixing chambers 28 is terminated. One or more internal or external thermal sensors, or other like devices known by one skilled in the art, can be used at various locations in/on the generator 8 to detect initiation of the combustion process in the first combustion chamber 70, and to deactivate the igniters 20 and cease the flow of oxidizer and/or fuel into the mixing chambers 28.

The temperature and pressure used in the first combustion chamber 70 are regulated to permit an incomplete combustion of the one or more fuels present therein. The oxidizers and the fuels that enter the first combustion chamber 70 are preferably mixed and burned at temperatures and pressures that cause them each to be at least partially vaporized, or to otherwise remain in a gaseous state, during this first combustion process. The temperature in the first combustion chamber 70 can readily be controlled by those skilled in the art by the selection of an O/F mixture ratio that corresponds with the particular types of fuels used therein to achieve this result. The pressure in the first combustion chamber 70 can be regulated by controlling the pressures of the fuels and oxidizers that are metered into the first combustion chamber 70 from the first fuel port tubes 36 and the first oxidizer injector orifices 46, respectively, and the diameters of the ports from which they are metered into the first combustion chamber 70. The temperature in the first combustion chamber 70 preferably ranges from about 1200° F. to about 5800° F. (1200 to 5800° C.), and more preferably ranges from about 2600° F. to about 2800° F. (1400 to 1500° C.). The pressure in the first combustion chamber 70 preferably ranges from about 500 psig to about 1500 psig (35 to 105 kg/cm$^2$), and more preferably ranges from about 600 psig to about 900 psig (42 to 63 kg/cm$^2$).

Using commercially-available computer programs, and other readily-available information, one skilled in the art can readily vary the temperatures and pressures used in each of the various components and/or areas of the present apparatuses, such as the first combustion chamber 70, the second combustion chamber 100 and the third combustion area 120, to achieve a desired result (e.g., incomplete or complete fuel combustion). Information describing various aspects of combustion and heat transfer processes (including information on relationships among fuel, oxidizer and combustion chamber pressures and temperatures, fuel and oxidizer flow rates and O/F mixture ratios), and about various metals generally suitable for use in combustion apparatuses, is known in the art. See, e.g., Huzel et al., *Modern Engineering for Design of Liquid Propellant Rocket Engines* (Vol. 27, Progress in Astronautics and Aeronautics, American Institute of Aeronautics and Astronautics, Washington, D.C. 1992); Sutton, *Rocket Propulsion Elements an Introduction to the Engineering of Rockets* (6th Ed., John Wiley & Sons, Inc., New York, 1992). Information describing the operation of conventional industrial steam generators and boilers is known in the art.

Commercially-available thermochemical computer software, such as GUIPEP software, CQE™ software, GNOCIS™ software, PEOA GNOCIS™ software, CET software (Chemical Equilibrium with Transport Properties, NASA TM4557), Smart Process® software (Emerson, St. Louis, Mo.), POWERlink RTU software (Abbey Systems, Salt Lake City, Utah), FASTFLOW and CONDENS computer programs (MPR Associates, Inc., Alexandria, Va.) may be used to determine the various temperatures, pressures and fuel and oxidizer flow rates that should be used in the present methods and apparatuses for one or more particular fuels, fuel components or fuel mixtures and oxidizers. These computer programs can also provide analyses of the combustion gas exhaust product that exits the exhaust system of the apparatuses when using particular fuels and oxidizers.

The amount of time that the one or more fuels remain in the first combustion chamber 70 is an amount of time that permits them to undergo an incomplete (partial) combustion, which often occurs in a period ranging from about 0.025 to about 10 seconds. However, the period that the fuels, fuel components or fuel mixtures (or mixtures with oxidizer) remains in any of the combustion chambers or areas of the generator 8 may vary depending upon the temperature in a particular combustion chamber or area, the velocity that the fuels are injected into the chamber or area, the length of the chamber or area and the amount of vortexing that occurs to the fuels in the chamber or area. The higher the temperature is, the faster the velocity of the fuel is, the shorter the length of the chamber or area and the less vortexing that occurs to the fuel, the shorter a period of time that the fuel (or fuel components or fuel mixtures and oxidizer) will generally remain in a particular combustion chamber or area.

All of the materials in the first combustion chamber 70 are generally maintained under turbulent conditions, and are caused to go into a state of flux by the combustion reaction that occurs in the first combustion chamber 70. When a fuel or fuel component employed in the first combustion chamber 70 is a solid, the solid fuel or fuel component will generally be converted at least partially into a combustion gas therein by this process. The vortexing that preferably occurs to the combustion gas product that is generated in the first combustion chamber 70 will generally, and advantageously, permit the fuels, fuel components or fuel mixtures to have a more homogeneous mix with the one or more oxidizers, and the combustion gas product to remain longer in the first combustion chamber 70 than would occur without such vortexing, or than would typically occur in a conventional boiler or steam generator.

In the first combustion chamber 70, the hydrocarbons of the one or more fuels will generally be more complex than they will be in the second combustion chamber 100, where they undergo another incomplete (partial) combustion reaction, or in the third combustion area 120, where they undergo yet a third combustion reaction. For the same reasons, the hydrocarbons in the one or more fuels will also generally be more complex in the second combustion chamber 100 than they will be in the third combustion area 120, where they are further disassociated (broken down).

A combustion gas product produced in the first combustion chamber 70 results from an incomplete combustion of the fuel in the first combustion chamber 70. The amount of fuel combusted in the first combustion chamber 70 preferably ranges from greater than about 0% to less than about 100%, and more preferably ranges from about 20% to about 70%, and is most preferably about 50%. It generally contains combustion gases and partially burned fuel, which continues to be fuel rich, and which may contain environmental pollutants and/or hazardous materials (depending upon the type of fuels used) at this stage of the process as products of this incomplete combustion reaction (because only one, incomplete combustion of the fuel has occurred at this stage of the process), as well as oxidizer.

A fuel wear plate 63, which is shown in detail in FIG. 2, that is adjacent to the aft end of the first combustion chamber 70 is preferably designed to allow one or preferably a plurality of second fuel port tubes 66, or other means for metering fuel into the second combustion chamber 100, to be removably inserted into one or preferably a plurality of second fuel ports 65, which are shown in detail in FIGS. 6 to 10 and 12. The fuel wear plate 63 is preferably made of a hard metal, such as one of the commercially-available A-2, A-7, H-13, or S-7 metals, permitting wear and abrasion resistance, as well as resistance to tempering at elevated temperatures. This component of the generator 8 is designed to be removed and replaced as needed. Using conventional methods, the second fuel ports 65 are drilled through, or otherwise placed into, the fuel wear plate 63, a first water manifold plate 60 that has its forward end attached to the aft end of the fuel wear plate 63, a feed water manifold 64 that has its forward end attached to the aft end of the first water manifold plate 60, a second oxidizer manifold 82 that has its forward end attached to the aft end of the feed water manifold 64, a second transfer injector plate 84 that has its forward end attached to the aft end of the second oxidizer manifold 82, and a second oxidizer manifold plate 80 that has its forward end attached to the aft end of the second transfer injector plate 84, providing one or more hollow orifices (second fuel ports 65) that extend through each of these components of the generator 8, leading from the aft end of the first combustion chamber 70 to the forward end of the second combustion chamber 100. The size and number of the second fuel ports 65 and second fuel port tubes 66 may be varied widely in the manner described hereinabove for the first fuel ports 34 and the first fuel port tubes 36. The number of second fuel ports 65 will preferably be the same as the number of second fuel port tubes 66 desired, and can be varied in a manner known by one skilled in the art according to the type of fuels, fuel components or fuel mixtures and the O/F mixture ratio used. The diameter of the second fuel ports 65 should be a diameter that permits the second fuel port tubes 66 to be easily removably inserted into the second fuel ports 65, and to remain secure in the second fuel ports 65 during the operation of the generator 8. The second fuel port tubes 66 inserted into the second fuel ports 65 should also allow an O/F ratio that will permit the mixture of the one or more fuels, fuel components or fuel mixtures and the one or more oxidizers that mix together in the second combustion chamber 100 to be fuel rich. Because oxidizer will preferably circulate around the second fuel port tubes 66, the second fuel ports 65 and the second fuel port tubes 66 should also be made of austenitic steel. The second fuel port tubes 66 are removably inserted into the forward end of the fuel wear plate 63 and extend through the various components described above through the second transfer injector plate 84. The first water manifold plate 60 preferably has a flange containing equally spaced bolt holes for its attachment to the second oxidizer manifold plate 80.

The combustion gas product produced in the first combustion chamber 70 is moved by the pressure present therein, which is caused by the combustion process that occurs therein, from the forward end to the aft end of the first combustion chamber 70. It then becomes metered from the forward end to the aft end of the second fuel port tubes 66 and into the second combustion chamber 100. The second fuel port tubes 66 preferably cause the speed of the combustion gas product produced in the first combustion chamber 70 to increase, depending upon the diameter of the second fuel port tubes 66. However, the fuel rich combustion gas product that enters into the second combustion chamber 100 often enters the second combustion chamber 100 at a linear velocity of more than about 3280 ft/s-lb.

The combustion gas product that enters the second combustion chamber 100 is preferably supplied and mixed with one or more additional oxidizers, which may be the same as or different from the oxidizers that entered into the first combustion chamber 70, and which are ready to cause another combustion reaction, this time in the second combustion chamber 100 (by the spontaneous combustion of the fuel that is present in the combustion gas product), in an amount that causes a second incomplete (partial) combustion of the fuel present in the second combustion chamber 100, and that preferably maintains the fuel and oxidizer in a fuel rich mixture. The O/F mixture ratio employed in the second combustion chamber 100 will also generally be dependent upon several variables, such as the particular fuel and oxidizer employed. Depending upon the chemical composition of the particular one or more fuels, fuel components or fuel mixtures employed, certain fuels will require more or less oxidizer to consume the fuel. The amount of additional oxidizer that is mixed with the fuel that enters into the second combustion chamber 100, and a desirable O/F mixture ratio, may readily be determined by one skilled in the art.

The additional oxidizer, such as LOX, that is added in the second combustion chamber 100 is drawn from a source of oxidizer, such as an oxidizer storage tank, through a suitable flow control device by a pump or device into a second oxidizer inlet 81, or into another means for receiving additional oxidizer, which is preferably made of austenitic steel. The flow control device may be one of those described hereinabove for the fuel inlet manifold 12, or a similar device known in the art. The flow rate of the additional oxidizer that enters the second oxidizer inlet 81 can be varied to achieve a fuel rich mixture of fuel and oxidizer in the second combustion chamber 100. The additional oxidizer that enters into the second oxidizer inlet 81 also preferably has a temperature comparable to that of the oxidizer that enters into the first oxidizer inlet 42.

The additional oxidizer enters the second oxidizer inlet 81 under pressure, with this pressure causing the oxidizer to flow into the second oxidizer manifold 82 (detailed in FIG. 9), or into another means for metering additional oxidizer into the second combustion chamber 100, which is located between the feed water manifold 64 and the second transfer injector plate 84 (detailed in FIG. 10), and preferably around the second fuel port tubes 66 in a radial manner. The second oxidizer manifold 82, which is preferably made of austenitic steel, directs the additional oxidizer through one or more second oxidizer injector orifices 85 located in the aft end of the second oxidizer manifold 82. Pressure causes the additional oxidizer to be injected from the second oxidizer injector orifices 85, which are also preferably made of austenitic steel, into the second combustion chamber 100, where it mixes with fuel present therein (or that enters into the second combustion chamber 100) for the second combustion reaction. The number of second oxidizer injector orifices 85 desired depends on the types of the oxidizers and the O/F mixture ratio used. The optimal number of second oxidizer injector orifices 85 for one or more particular oxidizers, and for a particular O/F ratio, may be readily determined by one skilled in the art. The second fuel ports 65, the second fuel port tubes 66 and the second oxidizer injector orifices 85 are shown in detail in FIGS. 7 to 10 and/or in FIG. 12. The second oxidizer injector orifices 85 are detailed in FIG. 13.

The oxidizer has a dual purpose when it is present in the second oxidizer manifold 82. It provides oxidizer to the second combustion chamber 100 for a second, partial, combustion reaction of the fuel, and it cools the aft side of the second transfer injector plate 84, which becomes hot from the second combustion reaction that occurs in the second combustion chamber 100. The second transfer injector plate 84 is also preferably made of austenitic steel, and transfers heat that is generated by the second combustion process to excess oxidizer that does not enter into the second oxidizer injector orifices 85, heating this excess oxidizer (generally vaporizing a liquid oxidizer). This excess hot oxidizer flows under pressure into the oxidizer transfer tube 49, and then is directed under pressure into the third combustion area 120. Alternatively, the oxidizer flowing in the oxidizer transfer tube 49 may be vented or directed to a different combustion chamber or area (if more than three combustion chambers or areas are employed in the generator 8). The oxidizer that flows to the third combustion area 120 generally is in a semi-liquid/gas state (if the oxidizer used is a liquid) or in a gaseous state (if the oxidizer used in a gas) as a result of the heat transfer from the second transfer injector plate 84 to this oxidizer.

A second superheated steam product outlet 67, or another means for a superheated or dry saturated steam product to exit the generator 8, is preferably aligned with the feed water manifold 64, or with another means for circulating water around the second fuel port tubes 66 and providing forward and aft end cooling of the second fuel ports 65, and with a second water inlet 62, or with another means for receiving water in the generator 8. The cooling water transforms into a superheated or dry saturated steam product, and then exits the generator 8 through the second superheated steam product outlet 67, or through another means for permitting steam to exit the generator 8. The second superheated steam product outlet 67 is attached with the water manifold plate 60 by any suitable means for securely attaching these components of the generator 8 together, such as by welding, or using a flanged, JIC or AN fitting, and preferably by welding. The aft end of the water manifold plate 60 is preferably attached to the forward end of the second oxidizer manifold plate 80 with a means for securely attaching these areas of the generator 8 together, such as one or more third attachment devices 61, which may be the same as described hereinabove in connection with the first attachment devices 14. The first water manifold plate 60 and the second oxidizer manifold plate 80 preferably each have one or more bolt holes drilled therein (in the manner described hereinabove in connection with the flange of the fuel inlet manifold 12) that are aligned with each other. The third attachment devices 61 may be any devices that are suitable for securely attaching the above areas of the generator 8 together, for example, high strength bolts with nuts and accompanying lock washers. The number of third attachment devices 61 may be varied as known in the art to provide a secure attachment of these areas of the generator 8 together.

Figure 9:
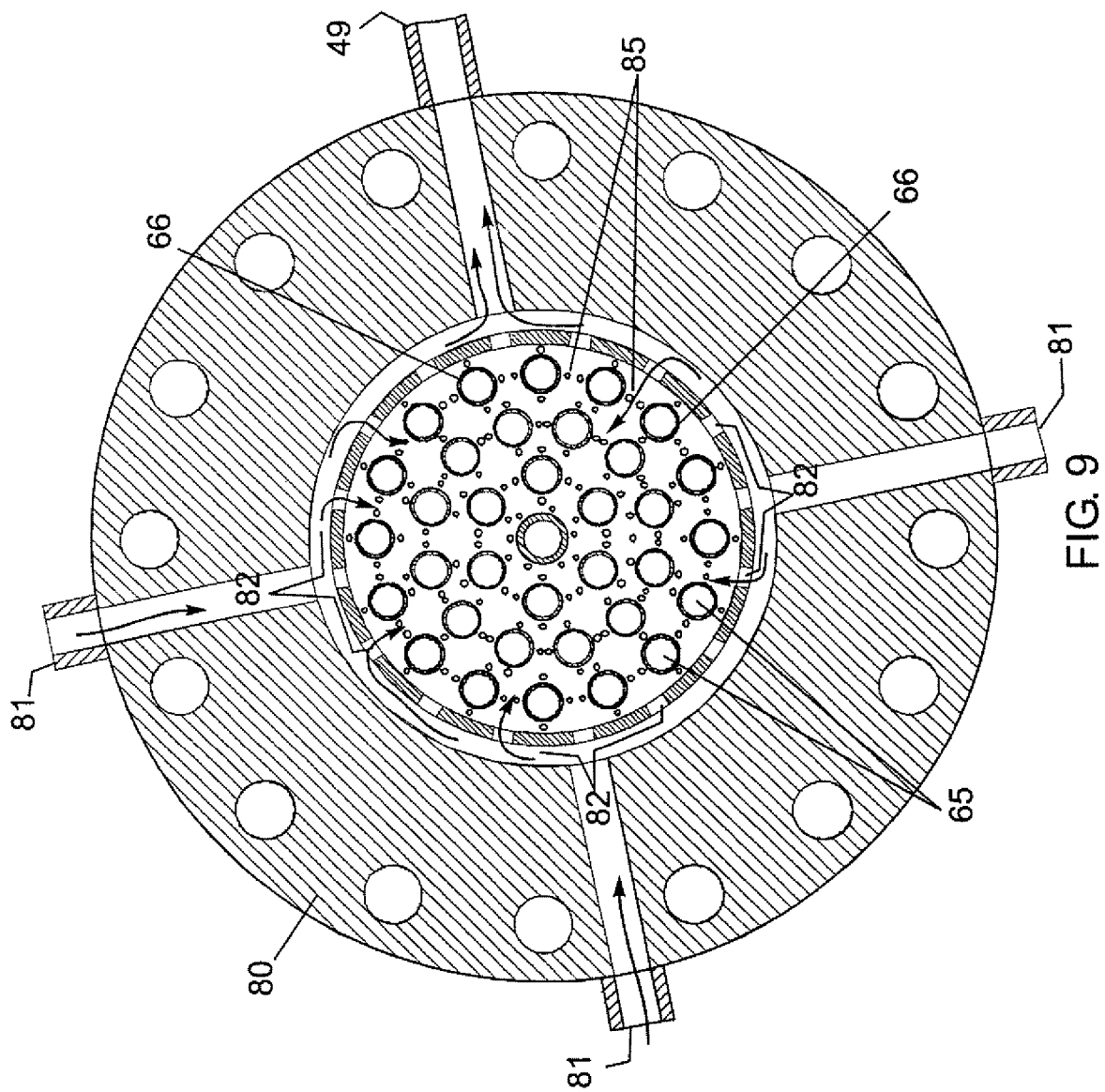
FIG. 9 is cross-sectional view of the second oxidizer manifold 82, the second oxidizer manifold plate 80, the second oxidizer inlet 81, the second oxidizer injector orifices, the second fuel ports 65, the second fuel port tubes 66, and the oxidizer transfer tube 49 of the gas generator shown in FIG. 1, looking from the first combustion chamber 70 toward the second combustion chamber 100 and taken along plane 9-9 of FIG. 1.

The combustion gas product produced in the first combustion chamber 70 is metered through the second fuel port tubes 66. As is shown in FIG. 9, the additional oxidizer entering one or more second oxidizer inlets 81 is preferably metered in a manner that permits a radial distribution of the additional oxidizer around the second fuel port tubes 66, and then through the second oxidizer injector orifices 85 (preferably at the same rate and volume for all of the second oxidizer injector orifices 85) at a desired O/F mixture ratio, and each preferably at an angle, which permits a vortex to be formed from the fuel flow and the oxidizer flow. The incoming fuel present in the combustion gas product becomes mixed with the additional oxidizer, preferably resulting in a fuel-rich mixture of fuel and oxidizer in the second combustion chamber 100. The fuel then undergoes a second, partial, combustion in the second combustion chamber 100 at the specified O/F ratio (but preferably more complete in comparison with the first combustion process that occurred in the first combustion chamber 70). (If a third combustion process is not employed during the processes, the second combustion process may, alternatively, be a complete combustion process (described hereinbelow).) While the order may be varied, it is preferable that the combustion gas product containing the fuel is metered into the second combustion chamber 100 prior to the oxidizer being metered into the second combustion chamber 100.

The combustion gas produced in the second combustion chamber 100 as a result of this second combustion reaction will preferably continue to be fuel rich, and will preferably contain a smaller quantity of environmental pollutants and/or hazardous materials in comparison with the combustion gas product produced in the first combustion chamber 70 (as a result of the fuel undergoing a second, separate, combustion reaction). The combustion gas product resulting from the second incomplete (but almost complete) combustion process that occurs in the second combustion chamber 100 then moves under pressure from the forward end to the aft end of the second combustion chamber 100. It then flows into the third combustion area 120.

The temperature and pressure used in the second combustion chamber 100 are regulated to permit a second, incomplete combustion (a separate, additional partial or incomplete burning) of the fuel present therein (in the combustion gas product). The additional oxidizer and the fuel are mixed, and burned, at temperatures and pressures that cause them each to be further vaporized (vaporized to a greater degree than the vaporization that occurred in the first combustion chamber 70) during this second combustion reaction. The temperature in the second combustion chamber 100 can readily be controlled by those skilled in the art by the selection of an O/F mixture ratio that corresponds with the particular type of fuel employed therein. The pressure in the second combustion chamber 100 can be regulated by controlling the pressure of the fuel and oxidizer that are metered into the second combustion chamber 100, and the diameters of the second fuel port tubes 66 and the second oxidizer injector orifices 85, respectively, from which they are metered into the second combustion chamber 100. The temperature in the second combustion chamber 100 preferably ranges from about 3000° F. to about 5800° F. (1650 to 3200° C.), more preferably from about 4000° F. to about 4500° F. (2200 to 2500° C.). The pressure in the second combustion chamber 100 preferably ranges from about 300 psig to about 1,500 psig (21 to 105 kg/cm$^2$), and will more preferably range from about 500 psig to about 1,000 psig (35 to 70 kg/cm$^2$). The combustion reaction that occurs in the second combustion chamber 100 will preferably be close to stoichiometric (from about 85% to about 95% of stoichiometric) in its combustion pressure, but preferably will not achieve stoichiometric combustion (100%) at this stage of the process. Using commercial computer programs or other available information, one skilled in the art can readily vary the temperatures and pressures used in the second combustion chamber 100 to achieve a further incomplete combustion of the fuel therein.

The amount of time that the fuel remains in the second combustion chamber 100 is preferably an amount of time that permits the fuel to undergo an additional incomplete (partial) combustion in the second combustion chamber 100, generally a period ranging from about 0.025 to about 10 seconds. However, the amount of time that the fuel remains in the second combustion chamber 100 will vary depending upon the temperature that is present in the second combustion chamber 100 and the velocity that the fuel is injected into the second combustion chamber 100. The higher the temperature is, and the faster the velocity of the fuel is, the shorter a period of time that the fuel will remain in the second combustion chamber 100.

All of the materials present in the second combustion chamber 100 are also generally maintained under turbulent conditions, and are caused to go into a state of flux by the combustion reaction that occurs therein. When one or more of the fuels or fuel components is a solid, the solid will generally be further converted into a combustion gas therein by this process. The vortexing that preferably occurs to the combustion gas product that is present in the second combustion chamber 100 will preferably, and advantageously, permit the fuel in the combustion gas product to have a more homogeneous mix with the additional (and other) oxidizer, and the combustion gas product to remain longer in the second combustion chamber 100 than would occur without such vortexing, or than would typically occur in a conventional industrial boiler or steam generator. In the second combustion chamber 100, the substances that may be present in the fuel that is generally contained in the combustion gas product (along with one or more combustion gases) will generally be more complex than they would be in the third combustion area 120, where they undergo yet a third combustion reaction and are disassociated further.

A combustion gas product produced in the second combustion chamber 100 results from another incomplete combustion of the fuel that has entered into the second combustion chamber 100 (the percentage of the total fuel employed that was not combusted in the first combustion chamber 70). The amount of fuel that is combusted in the second combustion chamber 100 generally ranges from greater than about 0% to less than about 100%, preferably from about 20% to about 70%, and more preferably about 40%. For example, if 50% of the total fuel used in the generator 8 is combusted in the first combustion chamber 70, it is preferred that 40% of the remaining 50% of fuel is combusted in the second combustion chamber 100 (leaving 20% of the total fuel used in the generator 8 unburned). The combustion gas produced in the second combustion chamber 100 preferably contains partially burned fuel, which continues to be fuel rich, and may contain some environmental pollutants and/or hazardous materials at this stage of the process as products of an incomplete combustion (because a complete combustion of the fuel has not yet occurred at this stage of the process), depending upon the type of fuels and oxidizers used. (If a third combustion area 120 is not employed in the apparatus, the percentage of fuel combusted in the second combustion chamber 100 will generally be higher than it would be if a third combustion area 120 is used, and preferably will be the same as described hereinbelow for the third combustion area 120.)

The combustion gas product produced in the second combustion chamber 100 is moved by the high pressure (present and caused by the combustion process therein) from the forward end to the aft end of the second combustion chamber 100. It then is moved by the high pressure into the third combustion area 120, where it is moved from the forward end to the aft end of the third combustion area 120. The fuel rich combustion gas product that enters into the third combustion area 120 preferably enters at a linear velocity of more than about 0.178 ft/s-lb.

The combustion gas product that enters into the third combustion area 120 is then preferably supplied, and mixed, with one or more additional oxidizers, which may be the same as or different from other oxidizers used in the generator 8, and which are ready to cause a third combustion reaction, this time in the third combustion area 120 (by the spontaneous combustion of the fuel present therein), in an amount that functions to cause a third, and preferably final and complete, combustion of the fuel that is present in the third combustion area 120. The third combustion area 120 functions in a manner similar to an "afterburner" of a jet. The O/F mixture ratio employed in the third combustion area 120 will also generally depend on several variables, such as the particular fuel(s) and oxidizer(s) used. Depending upon the chemical composition of the particular one or more fuels, fuel components or fuel mixtures employed, certain fuels will require more or less oxidizer to consume the fuel. The amount of additional oxidizer that is mixed with the fuel in the third combustion area 120, and a desirable O/F mixture ratio, can be readily determined by one skilled in the art.

The additional oxidizer supplied to the third combustion area 120 is preferably the excess oxidizer that did not flow into the first oxidizer manifold 41 or into the second oxidizer manifold 82, and that entered into the oxidizer transfer tube 49, and was not vented. However, additional oxidizer can be supplied to the third combustion area 120 (or to other areas or components of the generator 8) in a different manner, such as described hereinabove for the first oxidizer inlet 42 and the second oxidizer inlet 81. The additional oxidizer preferably will have a temperature ranging from about −180° to about 10° F. (−120 to −12° C.). It will have been heated by absorbing heat from the first transfer injector plate 44 and the second transfer injector plate 84, where it functions as a coolant for these plates, and will usually be at least partially in a gaseous form.

The additional hot oxidizer moves under pressure into the aft end of the oxidizer transfer tube 49, which is present within a third outer housing 130. The lower portion of the third outer housing 130 is adjacent to the outside of a tube 121, which is preferably hollow, and which preferably forms the sidewalls of the aft end of the second combustion chamber 100 and the forward end of the third combustion chamber 120.

The additional oxidizer then passes under pressure from the aft end of the oxidizer transfer tube 49, which is preferably drilled or otherwise machined into the third outer housing 130, into a hot oxidizer manifold 136, or another means for metering additional oxidizer into the third combustion area 120, which is also present in the third outer housing 130. The additional oxidizer preferably flows in a radial manner into the hot oxidizer manifold 136, which is preferably made of austenitic steel and preferably is secured within or machined into the third outer housing 130. The upper portion of the hot oxidizer manifold 136 is positioned adjacent to the aft end of the oxidizer transfer tube 49, and the lower portion of the hot oxidizer manifold 136 is positioned adjacent to the outside of the tube 121. Pressure causes the additional oxidizer to be injected by the hot oxidizer manifold 136 and flow preferably in a radial manner around one or preferably a plurality of, hot oxidizer orifices 122 that are preferably evenly spaced in one or more rows (or other configurations) in the tube 121. The hot oxidizer orifices 122 are preferably aligned with the hot oxidizer manifold 136. The number and diameter of the hot oxidizer orifices 122, which can be drilled/machined, into the tube 121, depends on the final combustion gas product O/F mixture ratio selected. The optimal number, diameter, and spatial orientation of the hot oxidizer orifices 122 for a particular oxidizer and O/F mixture ratio can be readily determined by one skilled in the art.

Pressure then cause the additional oxidizer to enter into the hot oxidizer orifices 122. The additional oxidizer is then injected (preferably by being sprayed) under pressure from the hot oxidizer orifices 122 into the third combustion area 120 (in a straight or angled manner), where it mixes with the fuel therein, causing a third combustion reaction (by spontaneous combustion of the fuel), and a final complete combustion of the fuel that is present in the third combustion chamber 120. The flow rate of the additional oxidizer into the manifold 136 may be varied to achieve a stoichiometric combustion reaction in the third combustion area 120.

The incoming fuel present in the combustion gas product produced in the second combustion chamber 100 becomes mixed with the additional oxidizer, preferably resulting in a stoichiometric mixture of fuel and oxidizer in the third combustion area 120, and causing a vortex to be formed from the fuel flow and oxidizer flow in the third combustion area 120. The fuel then undergoes a third, and preferably complete, combustion of the fuel remaining in the third combustion area 120 at the specified O/F ratio. While the order may be varied, it is preferable that the combustion gas product containing the fuel is metered into the third combustion area 120 prior to the additional oxidizer being metered into the third combustion area 120.

A combustion gas product produced in the third combustion area 120 results from a complete (or almost complete) combustion of the fuel that has entered into the third combustion area 120 (the percentage of the total fuel used that was not combusted in the first combustion chamber 70 or in the second combustion chamber 100). The amount of fuel that is combusted in the third combustion area 120 generally ranges from greater than 0% to about 100%, and preferably ranges from 50% to about 100%, with about 100% being most preferred. The goal is to have from about 95% to about 100%, and preferably 100%, of the fuel that is employed in the generator 8 combusted by this point in the process (when the third combustion area 120 is the last combustion chamber or area employed in the generator 8). For example, if 50% of the total fuel employed in the generator 8 is combusted in the first combustion chamber 70, and 40% of the remaining 50% of fuel is combusted in the second combustion chamber 100, it is preferred that all of the remainder of the fuel becomes combusted in the third combustion area 120 (leaving 0% of the total fuel employed in the generator 8 unburned, and achieving a 100% combustion efficiency). The combustion gas product produced in the third combustion area 120 preferably contains completely (100%) burned fuel and, thus, preferably does not have any products of incomplete combustion, such as environmental pollutants and/or hazardous materials (or has small quantities of such products).

The temperature and pressure used in the third combustion area 120 are regulated to permit a final complete combustion (a separate, additional, complete burning) of the fuel present therein, which is present in a combustion gas product. The additional oxidizer and fuel are mixed, and burned, at temperatures and pressures that cause them each to be further vaporized (vaporized to a greater degree than the vaporization that occurred in the second combustion chamber 100) during this third combustion reaction. The temperature in the third combustion area 120 can readily be controlled by the selection of an O/F mixture ratio that corresponds with the particular types of fuels used therein to achieve this result. The pressure in the third combustion area 120 can be regulated by controlling the pressure of the fuels and oxidizers that enter into the third combustion area 120. The temperature in the third combustion area 120 preferably ranges from about 3000° F. to about 5800° F. (1650 to 3200° C.), more preferably from about 4500° F. to about 5500° F. (2500 to 3000° C.). The pressure in the third combustion area 120 preferably ranges from about 300 psig to about 1500 psig (21 to 105 kg/cm²), more preferably from about 500 psig to about 900 psig (35 to 63 kg/cm²). The combustion process that occurs in the third combustion area 120 will preferably occur at a stoichiometric ratio O/F mixture ratio. Using commercially-available computer programs, and other readily-available information, one skilled in the art can vary the temperatures and pressures used in the third combustion area 120 to achieve a complete combustion of the fuel therein.

The amount of time that the fuel remains in the third combustion area 120 is a period that permits the fuel to undergo a final and preferably complete combustion in the third combustion area 120, which will generally occur in a period ranging from about 0.025 to about 10 seconds. However, the amount of time that fuel remains in the third combustion area 120 will vary depending upon the temperature in the third combustion area 120 and the velocity that the fuel is injected into the third combustion area 120. The higher the temperature is, and the faster the velocity of the fuel is, the shorter a period that the fuel will remain in the third combustion area 120.

All of the materials present in the third combustion area 120 are also generally maintained under turbulent conditions, and are caused to go into a state of flux by the combustion reaction that occurs therein. When the one or more fuels or component thereof is a solid, the solid will generally be further converted into a combustion gas therein by this process. The vortexing that preferably occurs to the combustion gas product in the third combustion area 120 will generally, and advantageously, permit the fuel present in the combustion gas product to have a more homogeneous mix with the additional (and other) oxidizer, and the combustion gas product to remain longer in the third combustion area 120 than would occur without such vortexing, or than would typically occur in a conventional industrial boiler or steam generator. In the third combustion area 120, the substances present in the fuel will generally be less complex than they will be in the second combustion chamber 100, where they undergo yet a third combustion reaction and are disassociated further. (if one or more solid fuels or fuel components are used in the generator 8, the solid particles will likely be eroded in the first combustion chamber 70, further eroded in the second combustion chamber 100, and still further eroded in the third combustion area 120, usually fully vaporizing in the third combustion area 120.)

The combustion gas exhaust product resulting from the third combustion reaction moves under pressure from the forward end to the aft end of the third combustion area 120. Under the pressure caused by the third combustion reaction, the combustion gas exhaust product then exits the generator 8, flowing out of the aft end of the third combustion area 120, which is open (does not have a wall or other closure at its aft end that causes the third combustion area 120 to be enclosed). The combustion gas exhaust product can be released into the atmosphere, for example, through a conventional smokestack, with the emission of no or minimal amounts of environmental pollutants and/or hazardous materials. Alternatively, it can be used in another subsystem or system, such as a boiler or exhaust heat recovery steam generator to produce additional steam.

The combustion gas exhaust product that exits out of the third combustion area 120, which will generally be hot, will generally contain a smaller quantity of environmental pollutants and/or hazardous materials in comparison with the combustion gas product produced in the second combustion chamber 100 (as a result of undergoing a third, separate, and preferably complete combustion reaction), and will most preferably contain no environmental pollutants and/or hazardous materials. The temperature of the combustion gas exhaust product will generally range from about 2000° F. to about 5500° F. (1100 to 3000° C.), usually from about 2700° F. to about 5000° F. (1500 to 2800° C.). Due to this high temperature and as a result of the fuels used in the generator 8 having undergone three separate combustion reactions by this stage of the process, the combustion gas exhaust product will generally be environmentally clean. It preferably will contain no (0%) environmental pollutants and/or hazardous materials, or only minimal amounts of environmental pollutants and/or hazardous materials. Preferably, the combustion gas exhaust product will only contain non-polluting and harmless atoms that have disassociated from molecules that were initially present in the fuels used in the generator, such as H, C, O and Cl, and/or molecules that are not environmental pollutants and/or hazardous materials, such as $H_2O$, rather than CO, $NO_x$, $N_2O$, $NO_2$, $SO_x$, $SO_2$, HCl, or particulate matter molecules. Depending upon the type of fuels used, the combustion gas exhaust produced after a complete combustion reaction in the present processes and apparatuses may contain only water vapor ($H_2O$) and $CO_2$ (a non-criteria air pollutant that may be captured and used as described herein).

Depending upon the type of fuel used in the processes and apparatuses, the combustion gas exhaust product may contain some ash. The level of ash in the combustion gas exhaust product preferably ranges from about 0% to about 2%, with 0% (no ash) being most preferred. For example, if natural gas is the only fuel used in the process, the combustion gas exhaust product should contain no ash. Alternatively, if tire rubber particles are use as the only fuel, some ash will likely be present in the combustion gas exhaust product. As another example, if one pound of coal having an energy value of 13,346 BTU/lb is combusted in a conventional coal-burning process, the potential energy produced should be about 31,017 kJ/kg, and the combustion gas exhaust produced should contain about 73.98% carbon, 4.85% hydrogen, 6.41% oxygen, 1.76% nitrogen, 1.59% sulfur, 6.23% ash and 5.23% moisture. In contrast, if one pound of TDF is combusted in accordance with the present processes and apparatuses, then the potential energy produced should be about 36,023 kJ/kg, and the combustion gas exhaust produced should contain about 83.87% carbon, 7.09% hydrogen, 2.17% oxygen, 0.024% nitrogen, 1.23% sulfur, 4.78% ash and 0.62% moisture.

As is shown in FIG. 14, the combustion gas exhaust product can exit from the third combustion area 120 (of from another combustion chamber or area) of the generator 8 into an exhaust heat recovery steam generator containing water that can cool the hot combustion gas exhaust product, thereby converting the water to a steam product, which should also be environmentally clean. This steam product may contain varying percentages of wet steam, dry saturated steam, or superheated steam, which can be separated from each other using conventional steam separation equipment, and can be separately used to perform various functions.

Feed water is preferably supplied to the generator 8 at the forward end of the first combustion chamber 70 from a source of water (not shown), such as a water storage tank, through a suitable flow control device by a pump to a first water inlet 52, or to another means for receiving feed water. The first water inlet 52 is attached to an upper portion of the first water manifold 51 by a means for securing these two areas of the generator 8 together, such as by welding or other means known in the art, at an area between the forward end and the aft end of the first water manifold 51. The flow control device may be the same as that described hereinabove in connection with the fuel inlet manifold 12. The water is preferably preheated, having a temperature described hereinabove (under "Water") and aids the first combustion chamber 70 in maintaining its structural integrity when it is exposed to high temperatures. The water flow rate here in the process (and throughout the present processes and apparatuses) is generally dependent upon several factors, such as the temperature in the generator 8, the pressure of the water, and the amount of steam to be produced in a select period, for example 100 lbs of superheated steam product or dry saturated steam product per hour.

The forward end of the first water manifold 51 is preferably attached to the aft end of the first oxidizer manifold plate 40 in the manner described hereinabove. The forward end of the first water manifold 51 preferably has one or more equally spaced bolt holes drilled therein for attachment with the first oxidizer manifold plate 40 using high strength bolts with accompanying nuts and washers. The bolt holes may be drilled/machined in the number and spatial orientation described hereinabove. The aft end of the first water manifold 51 is preferably attached with a first outer housing 50, by any suitable means, preferably welding. The first outer housing 50 functions as a frame or structure that protects the first tube assembly 71 (provides mechanical hoop strength to the first tube assembly 71), and provides a structure to which a flange or other attachment device may be attached. Other outer housings described herein, such as the second outer housing 90 and the fourth outer housing 140, function in a similar manner.

The water flows under pressure through the first water inlet 52 into the first water manifold 51, or into another means for regulating a supply of water to the first tube assembly 71 and controlling water pressure. The first water manifold 51 permits a supply of water to be readily available to, and enter into, the first tube assembly 71, and maintains a preferably constant water pressure. The other water manifolds described herein function similarly. The water then becomes forced under the pressure toward the first combustion chamber 70, and then into one or more first water inlet passageways 55 that are present in the first outer housing 50, and that are preferably drilled radially therein. The number of first water inlet passageways 55 in the first outer housing 50 should be the same as the number of first water inlet passageways 55 in the first tube assembly 71. The first water inlet passageways 55 in the first outer housing 50 are preferably located along the first combustion chamber 70 in an area located within the first water manifold 51. The water flows under pressure from the first water inlet passageways 55 located in the first outer housing 50 and into, and through, the first water inlet passageways 55 located in the one or more individual tubes that are present in the first tube assembly 71, which forms the sidewalls of the first combustion chamber 70.

Figure 6:
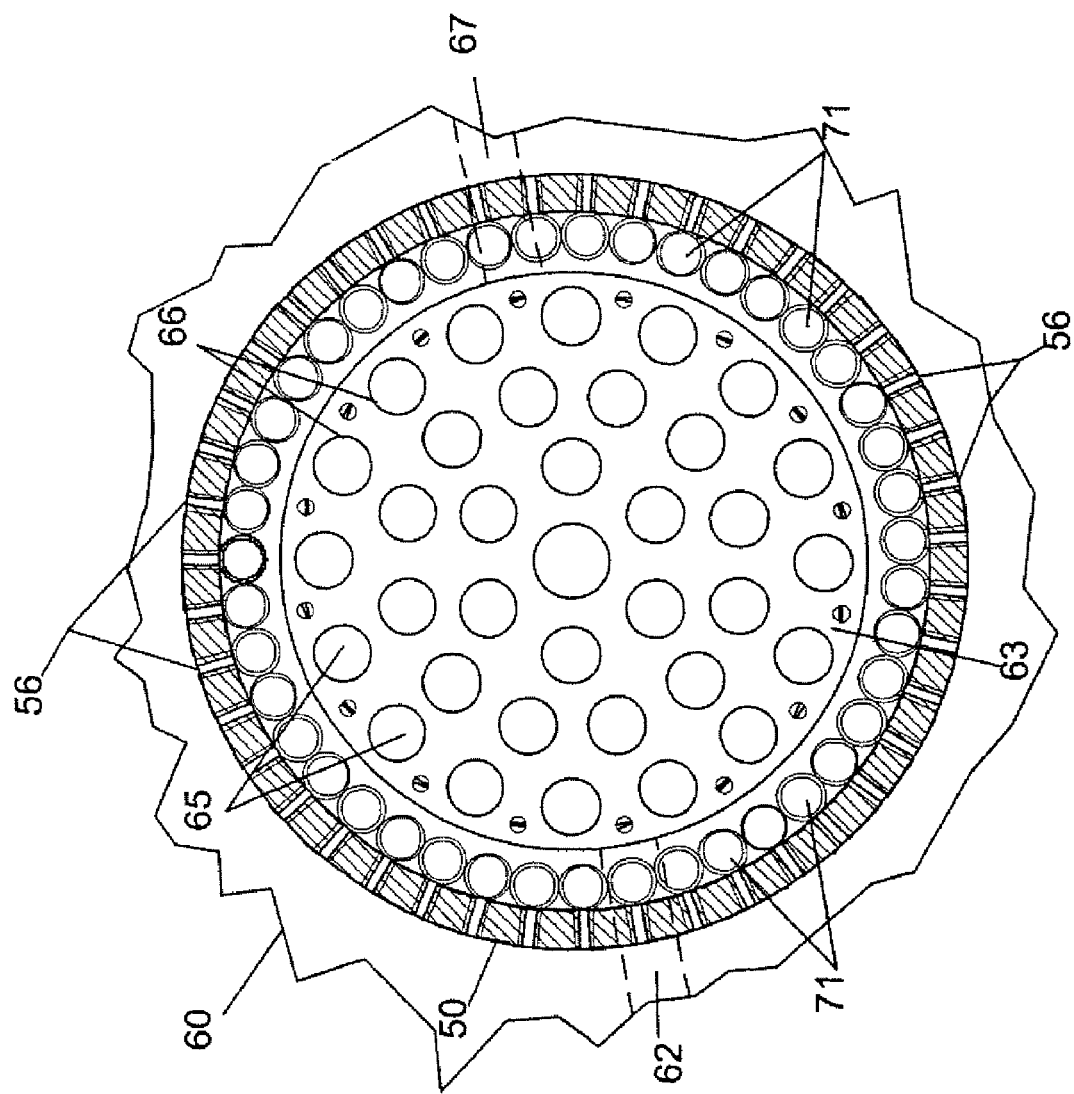
FIG. 6 is a cross-sectional view of the first water inlet 62, the first water manifold plate 60, the first outer housing 50, the second fuel ports 65, the second fuel port tubes 66, the fuel wear plate 63, the second superheated steam outlet 67 and the individual water tubes of the first tube assembly 71 of the gas generator shown in FIG. 1, looking from the first combustion chamber 70 toward the second combustion chamber 100 and taken along plane 6-6 of FIG. 1.

The first tube assembly 71, which is detailed in FIGS. 5 to 6, contains one or more hollow tubes that are preferably connected by a means for securely connecting the tubes together, for example, by welding. It is preferable to have a plurality of hollow tubes in the first tube assembly 71 (and in all of the other tube assemblies) so that the apparatus can continue to properly operate if a leak or plug occurs in one or more tubes. Generally, the more hollow tubes present in the first tube assembly 71 (and in all of the other tube assemblies employed in the generator 8), the more surface area that the water will contact, the faster the water will convert into superheated steam, and the fewer problems that will occur if a tube develops a problem. Any suitable means or device for connecting the hollow tubes together may be used, which includes the methods and devices described hereinabove in connection with the attachment of the fuel inlet manifold 12 with the flow control device. These hollow tubes (and the other hollow tubes described herein in connection with other tube assemblies) are preferably concentric; however, other configurations are possible. The tubes can be circular, oval, or in another suitable shape. Alternatively, the outside surface of a piece of tubing can be channeled and slid into the first outer housing 50, creating a water steam passageway (a channel wall configuration).

The forward end of each of the individual tubes comprising the first tube assembly 71 preferably has a first water inlet passageway 55 that corresponds to, and is aligned with, one or more first water inlet passageways 55 in the first outer housing 50, and the aft end of each of the individual tubes preferably has a first superheated steam product exit passageway 56 that corresponds to, and is aligned with, one or more first superheated steam product exit passageways 56 in the first outer housing 50. The first tube assembly 71 is preferably in the shape of a concentric tubular shell. The outside of the first tube assembly 71 may optionally, but preferably, be covered or wrapped with a high temperature material to more uniformly transfer the pressure load to the first outer housing 50 as known in the art. This high temperature material should have the ability to withstand a temperature of up to about 1000° F. (540° C.), and thermally insulates the first outer housing 50 and the first tube assembly 71, permitting a more efficient energy management of the gas energy produced in the first combustion chamber 70.

The aft end of the first oxidizer manifold plate 40 preferably has a groove 71a machined into it, in which the forward end of the first tube assembly 71 can be inserted. The groove 71a should be of a size that permits the forward end of the first tube assembly 71 to fit securely within it. A central area of the forward end of the first water manifold plate 60 also preferably has a groove 71b machined into it, in which the aft end of the first tube assembly 71 can be inserted. The groove 71b should be of a size that permits the aft end of the first tube assembly 71 to fit securely within it. Any suitable means or device for securely attaching the first oxidizer manifold plate 40 to the first tube assembly 71, and the first tube assembly 71 to the first water manifold plate 60, may be used, which includes the methods and devices described hereinabove in connection with the attachment of the fuel inlet manifold 12 with the flow control device, and other similar methods or devices known by one skilled in the art. The first tube assembly 71 is inserted into, and securely fitted within, the first outer housing 50, preferably extending past both the forward end and the aft end of the first outer housing 50 at a length on the forward end that is equal to the depth of the groove 71a that is machined into the aft end of the first oxidizer manifold plate 40 (to allow the first tube assembly 71 to be inserted into it), and at a length on the aft end that is equal to the depth of the groove 71b that is machined into the forward end of the first water manifold plate 60 (to allow the first tube assembly 71 to be inserted into it). Each of these areas is preferably sealed with a gasket or similar device.

The first tube assembly 71, the second tube assembly 101, the third tube assembly 146 and the tube 121, are preferably removably attached to the generator 8, permitting these components of the generator 8 to be easily replaced, for example, by sliding them in and out of the generator 8.

The heat from the hot combustion gas product produced in the first combustion chamber 70 (resulting from a first combustion process) transfers from the inside of the first combustion chamber 70 into the adjacent first tube assembly 71. This heat transforms the water present in the individual tubes present in the first tube assembly 71 into a superheated steam product or a dry saturated steam product.

The superheated steam product or dry saturated steam product that is produced in the first tube assembly 71 (and that is produced at all other steps in the processes and in all other areas of the apparatuses) preferably has a pressure ranging from about 300 psig to about 4500 psig (21 to 320 kg/cm$^2$), more preferably from about 2600 psig to about 3600 psig (180 to 250 kg/cm$^2$), still more preferably about 3000 psig (211 kg/cm$^2$), and has a temperature preferably ranging from about 500° F. to about 1150° F. (260 to 621° C.), and more preferably ranging from about 750° F. to about 1100° F. (400 to 590° C.), with about 800° F. (430° C.) being still more preferred.

The superheated steam product or dry saturated steam product, which is present in the individual tubes present in the first tube assembly 71, flows under pressure into one or more first superheated steam product exit passageways 56 in the first tube assembly 71, and then out of the first tube assembly 71 into one or more first superheated steam product exit passageways 56 that are preferably drilled radially, or otherwise placed, into the first outer housing 50, and that are aligned with the first superheated steam product exit passageways 56 in the first tube assembly 71. The first superheated steam product exit passageways 56 in the first outer housing 50 are preferably located along the first combustion chamber 70 in an area within the first superheated steam product exit manifold 53. The number of first superheated steam product exit passageways 56 that are drilled into the first outer housing 50 should be the same as the number of tubes, and as the number of first superheated steam product exit passageways 56, that are present in a first tube assembly 71. The superheated steam product or dry saturated steam product then flows under pressure away from the first combustion chamber 70 and into a first superheated steam product exit manifold 53, which preferably has its forward end attached to the aft end of the first outer housing 50 with a means for securely attaching these two areas of the generator 8 together, for example, by welding. Essentially any suitable means or device known in the art can be used for securely attaching the first superheated steam product exit manifold 53 to the first outer housing 50, including the methods and devices described hereinabove. The aft end of the first superheated steam product exit manifold 53 is preferably attached to the forward end of the first water manifold plate 60 with a means for securely attaching these two areas of the generator 8 together, for example, with one or more fourth attachment devices 57, such as high strength bolts and accompanying nuts and washers as needed. The fourth attachment devices 57 may be the same as that described hereinabove for the first attachment devices 14. The aft end of the first superheated steam product exit manifold 53 preferably has a connection device, such as that described hereinabove for the fuel inlet manifold 12, having one or more equally spaced bolt holes drilled into it, permitting the insertion of high strength bolts therein. The steam product then passes under pressure from the first superheated steam product exit manifold 53 further away from the first combustion chamber 70 and into a first superheated steam product outlet 54, which is preferably positioned at an upper portion of the first superheated steam product exit manifold 53, between its forward end and its aft end. The superheated steam product or dry saturated steam product then flows out of the first superheated steam product outlet 54 (and out of the generator 8) into a conventional superheated steam product collection device (not shown), such as a steam drum that may optionally contain centrifugal separators and/or scrubbers, or other suitable device.

Feed water is supplied from a source of water (not shown), which may be the same or different source of water used to supply feed water to the first water inlet 52, such as a second water storage tank, through a suitable flow control device by a pump to a second water inlet 62 that is preferably located below the second fuel port tubes 66 at a lower portion of a central area of the generator 8. The second water inlet 62 is preferably located between the fuel wear plate 63 and the second oxidizer inlet 81. The flow control device may be the same as that described hereinabove in connection with the fuel inlet manifold 12. The water, which preferably has a temperature in the range described hereinabove for the first water inlet 52, flows under pressure toward an area of the generator 8 that is located between the first combustion chamber 70 and the second combustion chamber 100. The water flows under pressure into a feed water manifold 64, which preferably extends from the aft end of the first combustion chamber 70 to the forward end of the second combustion chamber 100, and around the second fuel port tubes 66, which have hot combustion gas flowing therethrough. This water functions to cool the fuel wear plate 63, the forward end of which is adjacent to the aft end of the first combustion chamber 70, which becomes hot from the combustion gas product that exits from the first combustion chamber 70 and travels toward the second combustion chamber 100. The mixture of water, wet steam and a superheated steam product or dry saturated steam product that results from this cooling process flows from the feed water manifold 64 toward the upper portion of the generator 8 and out of the second superheated steam product outlet 67 (and out of the generator 8) into a conventional superheated steam product collection device (not shown). The second superheated steam product outlet 67 is preferably aligned with the second water inlet 62, and located above the feed water manifold 64 (at the upper portion of the generator 8). The superheated steam product collection device is preferably a central superheated steam product collection device used to collect the superheated steam product or dry saturated steam product from the first superheated steam product outlet 54, and from all other parts of the generator 8 from which steam products exit.

Feed water is supplied to the generator 8 preferably in an area near the forward end of the second combustion chamber 100 from a source of water (not shown), which may be the same or different source of water that is used to supply feed water to the first water inlet 52 or the second water inlet 62, such as a third water storage tank, through a suitable flow control device by a pump to a third water inlet 92. The third water inlet 92 is preferably attached to an upper portion of a second water manifold 98 with a suitable means for securing these two areas of the generator 8 together, such as by welding, at an area between the forward end and the aft end of the second water manifold 98. Essentially any suitable means or device known in the art can be used for securely attaching the third water inlet 92 to the second water manifold 98, including the methods and devices described hereinabove. The flow control device may be the same type of device described for the fuel inlet manifold 12. The water, which preferably has a temperature in the range described hereinabove for the first water inlet 52, aids the second combustion chamber 100 in retaining its structural integrity.

The forward end of the second water manifold 98 is preferably attached to the aft end of the second oxidizer manifold plate 80 with a means for securely attaching these two areas of the generator 8 together, for example, with one or more fifth attachment devices 91, such as high strength bolts and accompanying nuts and washers as needed. The fifth attachment devices 91 may be the same as that described hereinabove for the first attachment devices 14. The forward end of the second water manifold 98 preferably has a connection device, such as that described hereinabove for the fuel inlet manifold 12, having one or more equally spaced bolt holes drilled into it, permitting the insertion of high strength bolts therein. The aft end of the second water manifold 98 is preferably attached to a second outer housing 90 with a means for securely attaching these two areas of the generator 8 together, preferably by welding. Essentially any suitable means or device known in the art can be used for securely attaching the second water manifold 98 to the second outer housing 90, including the methods and devices described hereinabove.

The water flows under pressure through the third water inlet 92 into the second water manifold 98, or into another means for regulating a supply of water to a second tube assembly 101 and controlling water pressure. The water is then forced under pressure toward the second combustion chamber 100, and then into one or more second water inlet passageways 95 in the second outer housing 90, and that are preferably drilled radially therein. The number of second water inlet passageways 95 in the second outer housing 90 should be the same as the number of second water inlet passageways 95 that are present in the second tube assembly 101. The second water inlet passageways 95 in the second outer housing 90 are preferably located along the second combustion chamber 100 in an area located within the second water manifold 98. The second tube assembly 101 preferably forms the sidewalls of a portion of the second combustion chamber 100 (preferably about two thirds of the sidewalls, leading from the second oxidizer manifold plate 80 toward the aft end of the second combustion chamber 100). The water flows under pressure from the second water inlet passageways 95 located in the second outer housing 90 and into, and through, the second water inlet passageways 95 located in the one or more individual tubes that are present in the second tube assembly 101. The second tube assembly 101 is shown in detail in FIG. 8.

The tubes in the second tube assembly 101 are preferably connected with a means for connecting these tubes together, which may be the same as described hereinabove for the first tube assembly 71. The tubes are preferably concentric in nature, but may be otherwise as desired, and can be circular, oval, or in another suitable shape. Alternatively, the outside surface of a piece of tubing can be channeled and slid into the second outer housing 90, creating a water steam passageway (a channel wall configuration).

The forward end of each of the individual tubes comprising the second tube assembly 101 preferably has a second water inlet passageway 95 that corresponds to, and is aligned with, one or more second water inlet passageways 95 that are present in the second outer housing 90, and the aft end of each of the individual tubes preferably has a second superheated steam product exit passageway 96 that corresponds to, and is aligned with, one or more second superheated steam product exit passageways 96 that are present in the second outer housing 90. The second tube assembly 101 is preferably in the shape of a concentric tubular shell, but may be in any other suitable shape.

The outside of the second tube assembly 101 is preferably adjacent to the inside of the second outer housing 90. The outside of the second tube assembly 101 may optionally, but preferably, be covered or wrapped with a high temperature material as described hereinabove for the first tube assembly 71, permitting a more efficient energy management of the gas energy produced in the second combustion chamber 100.

The aft end of the second oxidizer manifold plate 80 preferably has a groove 101*a* machined into it, in which the forward end of the second tube assembly 101 can be inserted. The groove 101*a* should be of a size that permits the forward end of the second tube assembly 101 to fit securely within it. A central area of the forward end of a second water manifold plate 110 also preferably has a groove 101*b* machined into it, in which the aft end of the second tube assembly 101 can be inserted. The groove 101*b* should be of a size that permits the aft end of the second tube assembly 101 to fit securely within it. Essentially any suitable means or device known in the art can be used for securely attaching the second oxidizer manifold plate 80 to the second tube assembly 101, and the second tube assembly 101 to the second water manifold plate 110, including the methods and devices described hereinabove. The second tube assembly 101 is inserted into, and securely fitted within, the second outer housing 90, preferably extending past both the forward end and the aft end of the second outer housing 90 at a length on the forward end that is equal to the depth of the groove 101*a* that is machined into the aft end of the second oxidizer manifold plate 80 (to allow the second tube assembly 101 to be inserted into it), and at a length on the aft end that is equal to the depth of the groove 101*b* that is machined into the forward end of the second water manifold plate 110 (to allow the second tube assembly 101 to be inserted into it). Each of these areas is preferably sealed with a gasket or other suitable device.

The heat from the hot combustion gas produced in the second combustion chamber 100 (resulting from a second combustion process) transfers from the inside of the second combustion chamber 100 and into the adjacent second tube assembly 101. This heat transforms the water in the individual tubes in the second tube assembly 101 into a superheated steam product or a dry saturated steam product. The steam product produced in the second tube assembly 101 preferably has a pressure and a temperature in the ranges described hereinabove for the first tube assembly 71.

The superheated steam product or dry saturated steam product, which is present in the individual tubes in the second tube assembly 101, flows under pressure into one or more second superheated steam product exit passageways 96 in the second tube assembly 101, and then out of the second tube assembly 101 into one or more second superheated steam product exit passageways 96 that are preferably drilled radially, or otherwise placed, into the second outer housing 90, and that are aligned with the second superheated steam product exit passageways 96 in the second tube assembly 101. The second superheated steam product exit passageways 96 that are present in the second outer housing 90 are preferably located along a portion of the second combustion chamber 100 in an area within the second superheated steam product exit manifold 93. The number of second superheated steam product exit passageways 96 drilled into the second outer housing 90 should be the same as the number of tubes, and of the number of second superheated steam product exit passageways 96 in the second tube assembly 101. The superheated steam product or dry saturated steam product then flows under pressure away from the second combustion chamber 100 and into a second superheated steam product exit manifold 93, which preferably has its forward end attached to an area between the forward end and the aft end of the second outer housing 90 with a means for securely attaching these two areas of the generator 8 together, which may be the same as described hereinabove for the forward end of the first superheated steam product exit manifold 53. The aft end of the second superheated steam product exit manifold 93 is preferably attached to the forward end of the second water manifold plate 110 with a means for securely attaching these two areas of the generator 8 together, which may be the same as that described hereinabove for the aft end of the first superheated steam product exit manifold 53, for example, with one or more sixth attachment devices 97, such as high strength bolts and accompanying nuts and washers as needed. The sixth attachment devices 97 may be the same as that described hereinabove for the first attachment devices 14. The aft end of the second superheated steam product exit manifold 93 preferably has a connection device, such as that described hereinabove for the fuel inlet manifold 12, having one or more equally spaced bolt holes drilled into it, permitting the insertion of high strength bolts therein. The superheated steam product or dry saturated steam product then passes under pressure from the second superheated steam product exit manifold 93 further away from the second combustion chamber 100 and into a third superheated steam product outlet 94, which is preferably positioned at an upper portion of the second superheated steam product exit manifold 93, between its forward end and its aft end. The steam product then flows out of the third superheated steam product outlet 94 (and out of the generator 8) into a conventional superheated steam product collection device (not shown).

Feed water is supplied to the generator 8 at a location near the aft end of the second combustion chamber 100 from a source of water (not shown), which may be the same or different source of water that is used to supply feed water to the other water inlets (52, 62 and 92), such as another water storage tank, through a suitable flow control device by a pump to a fourth water inlet 131. The flow control device may be the same type of device as is described hereinabove for the fuel inlet manifold 12.

The fourth water inlet 131, a third water manifold 135, and a fourth superheated steam outlet 132 are preferably drilled, or otherwise machined, into a third outer housing 130, preferably at a location between the aft end of the second water manifold plate 110 and the forward end of the hot oxidizer manifold 136. The lower portion of the third water manifold 135 is preferably adjacent to the outside of a tube 121 that preferably extends from the aft end of the second tube assembly 101 to the forward end of a third tube assembly 146, and that preferably forms the sidewalls of a portion of the aft end of the second combustion chamber 100 (preferably about one third of the second combustion chamber 100) and a portion of the forward end of the third combustion area 120 (preferably about one third of the third combustion area 120). The fourth water inlet 131 is located at an upper portion of the generator 8, and has its aft end leading into the upper portion of the forward end of the third water manifold 135. The upper portion of the aft end of the third water manifold 135 leads into the lower portion of the fourth superheated steam product outlet 132.

The aft end of the second water manifold plate 110 is attached to a portion of the forward end of the third outer housing 130 by a means for securely attaching these two areas of the generator 8 together, for example, using one or more seventh attachment devices 111, such as high strength bolts with accompanying nuts and washers as needed. The seventh attachment devices 111 may be the same as described hereinabove for the first attachment devices 14. Essentially any suitable means or device known in the art can be used for securely attaching the second water manifold plate 110 to the third outer housing 130, including the methods and devices described hereinabove.

Feed water, which preferably has a temperature in the range described hereinabove for the first water inlet 52, flows under pressure through the fourth water inlet 131 toward the second combustion chamber 100 into the upper portion of the forward end of the third water manifold 135, which is preferably machined into the third outer housing 130. The water heated by heat transfer from the combustion gas produced in the second combustion chamber 100 and/or in the third combustion area 120 through the tube 121, the third outer housing 130 and the third water manifold 135, thereby transforming the water into a superheated steam product or dry saturated steam product.

The fourth water inlet 131 preferably has a baffle (not shown) that diverts the superheated steam product produced from the feed water to the aft side of the third water manifold 135, allowing the superheated steam product or dry saturated steam product to travel away from the tube 121 and exit from the fourth superheated steam product outlet 132 into a superheated steam collection device (not shown). The feed water circulates around the tube 121 preferably in a radial manner, and functions as a coolant to cool the tube 121, which become hot from the combustion gas product produced in the second combustion chamber 100 and/or in the third combustion area 120.

Feed water is supplied to the generator 8 at a location near the forward end of the third combustion area 120 from a source of water (not shown), which may be the same or different source of water used to supply feed water to the other water inlets (52, 62, 92 and 131), such as another water storage tank, through a suitable flow control device by a pump to a fifth water inlet 133. The flow control device may be the same type of device as is described hereinabove for the fuel inlet manifold 12.

The fifth water inlet 133, a fourth water manifold 137 and a fifth superheated steam product outlet 139 are preferably also drilled, or otherwise machined, into the third outer housing 130 at a location between the aft end of the hot oxidizer manifold 136 and the forward end of a filth water manifold 147. The lower portion of the fourth water manifold 137 is preferably also adjacent to the upper portion of the tube 121. The fifth water inlet 133 is preferably located at an upper portion of the generator 8, and has its aft end leading into the upper portion of the forward end of the fourth water manifold 137. The upper portion of the aft end of the fourth water manifold 137 leads into the lower portion of the fifth superheated steam product outlet 139.

The water, which preferably has a temperature in the range described hereinabove in connection with the first water inlet 52, flows under pressure through the fifth water inlet 133 toward the third combustion area 120 into the upper portion of the forward end of the fourth water manifold 137, where it becomes heated by heat transferred from the combustion gas product produced in the third combustion area 120 through the tube 121, the third outer housing 130 and the fourth water manifold 137, thereby transforming the water into a steam product.

The fifth water inlet 133 preferably also has a baffle (not shown) that diverts the steam product produced from the water to the aft side of the fourth water manifold 137, allowing the steam product to travel away from the tube 121 and exit from the fifth superheated steam product outlet 139 into a superheated steam collection device (not shown). The feed water preferably circulates around the tube 121 in a radial manner, and functions as a coolant to cool the tube 121, which become hot, as described hereinabove.

Feed water is supplied to the generator 8 at a location near the aft end of the third outer housing 130 from a source of water (not shown), which may be the same or different from the source of water used to supply feed water to the other water inlets (52, 62, 92, 131 and 133), such as another water storage tank, through a suitable flow control device by a pump to a sixth water inlet 149. The sixth water inlet 149 is preferably located downstream from the fourth water manifold 137, preferably at a location in which a combustion gas exhaust product starts to exit from the third combustion area 120 (and from the generator 8). The forward end of the sixth water inlet 149 is preferably attached to an area between the forward end and the aft end of the fifth water manifold 147 by a suitable means for securely attaching these two areas of the generator 8 together, such as by welding. Essentially any suitable means or device known in the art can be sued for securely attaching the sixth water inlet 149 to the fifth water manifold 147, including the methods and devices described hereinabove. The flow control device may be the same type of device as is described hereinabove in connection with the fuel inlet manifold 12. The temperature of the water is preferably as described herein for the first water inlet 52.

An upper portion of the fifth water manifold 147 is preferably attached to the aft end of the third outer housing 130 by a means for securely attaching these two areas of the generator 8 together, for example, using one or more eighth attachment devices 141, such as high strength bolts with accompanying nuts and washers as needed. The eighth attachment devices 141 may be the same as described herein for the first attachment devices 14. The upper portion of the fifth water manifold 147, and the aft end of the third outer housing 130, each preferably have one or more aligned, equally spaced bolt holes for the insertion of high strength bolts therein. The lower portion of the fifth water manifold 147 is preferably attached to the forward end of a fourth outer housing 140 by a means for securely attaching these two areas of the generator 8 together, such as by welding. Essentially any suitable means or device known in the art can be used for securely attaching the fifth water manifold 147 to the fourth outer housing 140, including the methods and devices described above.

The water flows under pressure through the sixth water inlet 149 toward the aft end of the third outer housing 130 into the fifth water manifold 147, filling the fifth water manifold 147 with water. The water then becomes forced under pressure toward the third combustion area 120 into the forward end of the third tube assembly 146, which forms the sidewalls of a portion of the third combustion area 120 from which a combustion gas exhaust product exits. The outside of the third tube assembly 146 is preferably adjacent to the inside of the fourth outer housing 140. The third tube assembly 146 contains one or more hollow tubes that are preferably connected with a means for connecting the tubes together, for example, by welding.

Essentially any suitable means or device known in the art can be used for connecting the tubes together, including the methods and devices described hereinabove. The hollow tubes are preferably concentric in nature, but may be otherwise if desired. The tubes can be circular, oval, or in another suitable shape. Alternatively, the outside surface of a piece of tubing can be channeled and slid into the fourth outer housing 140, creating a water steam passageway (a channel wall configuration).

The forward end of each of the individual tubes comprising the third tube assembly 146 preferably has a water inlet and the aft end of each of the individual tubes preferably has a superheated steam product outlet. The third tube assembly 146 is preferably in the shape of a conical cone (with the forward end having a smaller diameter than the aft end), but may be in any other suitable shape. The third tube assembly 146 preferably extends away from the tube 121 (and from the third combustion area 120), as is shown in FIG. 1, at an angle that preferably ranges from about 12° to about 18°. The outside of the third tube assembly 146 may optionally, but preferably, be covered or wrapped with a high temperature material in the manner described hereinabove for the first tube assembly 71, for efficient management of the gas energy produced in the third combustion area 120.

The heat from the hot combustion gas exhaust product produced in the third combustion area 120 (resulting from a third combustion process) becomes transferred from inside of the third combustion area 120 into the third tube assembly 146. This heat transforms the water that is present in the individual tubes present in the third tube assembly 146 into a superheated steam product or a dry saturated steam product. The superheated steam product or dry saturated steam product that is produced in the third tube assembly 146 preferably has a pressure and a temperature in the ranges described hereinabove in connection with the first tube assembly 71.

The water that enters into the sixth water inlet 149 acts as a coolant to cool the third tube assembly 146, which becomes hot from the combustion gas exhaust product produced in the third combustion area 120.

The superheated steam product or dry saturated steam product that formed in the individual tubes present in the third tube assembly 146 flows under pressure out of the superheated steam product outlets present in the tubes, and out of the third tube assembly 146, away from the third combustion area 120 into the lower portion of a third superheated steam product exit manifold 143, which preferably has its forward end adjacent to the aft end of the third tube assembly 146, and which is preferably located at the aft end of the third combustion area 120 (and of the generator 8). The forward end of the third superheated steam product exit manifold 143 is also preferably located in a close proximity with the lower portion of an exhaust plate 148. The lower portion of the exhaust plate 148 is preferably welded to the aft end of the fourth outer housing 140, functions as an interface for the combustion gas exhaust product that exits the generator 8, and preferably diverts the combustion gas exhaust product into a device that can utilize the heat of the combustion gas exhaust product, for example, an exhaust heat recovery steam generator (shown in FIG. 14), or to the atmosphere.

The superheated steam product or dry saturated steam product flows under pressure from the lower portion to the upper portion of the third superheated steam product exit manifold 143, which has its upper end attached to an area located between the lower portion and the upper portion of the exhaust plate 148. It has its lower end attached to the exhaust plate 148 with a means for securely attaching these two areas of the generator 8 together, for example, which may be by welding. It has its upper end attached to the exhaust plate 148 with a means for securely attaching these two areas of the generator 8 together, for example, by welding. Any suitable means or device for securely attaching the superheated steam exit manifold 143 to the third tube assembly 146, and the superheated steam exit manifold 143 to the exhaust plate 148, may be employed, which include the methods and devices described hereinabove in connection with the attachment of the fuel inlet manifold 12 with the flow control device, and other similar methods or devices known in the art.

The aft end of the third combustion area 120 may be left open, thereby permitting a combustion gas exhaust product produced by the generator 8 to be released into the atmosphere. Alternatively, the exhaust plate 148 may, optionally, be attached to an exhaust heat recovery steam generator (shown in FIG. 14), or similar device, with a means for securely attaching the exhaust plate 148 to a flange or similar structure present on the exhaust heat recovery steam generator, for example, using one or more ninth attachment devices 150. The ninth attachment devices 150 may be the same as the first attachment devices 14, such as high strength bolts with accompanying nuts and washers as needed. The upper portion of the exhaust plate 148 preferably has one or more equally spaced bolt holes drilled into it, which are aligned with similarly sized and spaced bolt holes on an area of the exhaust heat recovery steam generator that can be connected with the exhaust plate 148, permitting the insertion of high strength bolts therein.

The superheated steam product or dry saturated steam product then passes under pressure from the third superheated steam exit manifold 143 further away from the third combustion area 120 and into a sixth superheated steam product outlet 144, which is preferably located at an upper portion of the third superheated steam exit manifold 143, between its forward end and its aft end. The superheated steam product or dry saturated steam product then flows out of the sixth superheated steam product outlet 144 (and out of the generator 8) into a superheated steam collection device (not shown).

Use of the HCGC in a Trigeneration System

Referring to FIG. 1 and to FIG. 14, a preferred embodiment of a combustion and energy generation system is described, which includes the present hydrocarbon combustion gas generator. FIG. 14 shows the hydrocarbon combustion gas generator subsystem, which is generally indicated by the number 1000, in a non-polluting trigeneration steam energy generating plant, which is generally indicated by the number 10000. The trigeneration steam energy generating plant 10000 also comprises an exhaust heat recovery steam generator subsystem 2000, an oxidizer subsystem 3000, a fuel subsystem 4000, a water management subsystem 5000, a heat rejection subsystem 6000, a power turbine subsystem 7000, an electrical power generator subsystem 8000 and an oxidizer manufacturing subsystem 9000. The hydrocarbon combustion gas generator ("generator") 8 produces different types of steam (a superheated steam product or dry saturated steam product, medium pressure steam and low pressure steam) that can be separately used in many different existing industrial applications, as well as in new industrial applications, and in the on-site, non-polluting, steam electrical power generation.

The oxidizer subsystem 3000, fuel subsystem 4000 and water management subsystem 5000 provide (feed), and control the flow of, oxidizer and fuel reactants, and water, that are employed in the generator 8.

The oxidizer employed in the oxidizer subsystem 3000 is obtained by an oxidizer manufacturing subsystem 9000. LOX may be used as the oxidizer, and may be produced by an air separation unit via liquefaction of atmospheric air and the subsequent separation of the LOX therefrom by continuous cryogenic distillation. The LOX is then removed from the cryogenic distillation system and stored as a cryogenic liquid in a bulk oxidizer storage tank 201.

The oxidizer subsystem 3000 includes a first LOX feed line 270 that feeds the LOX through a first valve 271 to a LOX pump 273, which is powered by a LOX pump drive unit 274. The LOX pump 273 delivers high pressure LOX into a second LOX feed line 276 and through a second valve 275 that is connected to the second LOX feed line 276 with a tee (not shown). One side of the tee leads to a LOX vaporizer system 277 that leads to the generator 8 (to the first oxidizer inlet 42 shown in FIG. 1), and that contains, for example, pressure regulators, a cavitating fluid venturi control and/or temperature and pressure sensing transducers. The other side of the tee leads to an oxygen pressure and flow management system 278 connected with a third LOX feed line 279 that leads to the generator 8 (to the second oxidizer inlet 81 shown in FIG. 1).

The LOX that enters the LOX vaporizer system 277 becomes vaporizes and is then conducted from the LOX vaporizer system 277 to the generator 8. (As is shown in FIG. 1, the gaseous oxygen enters the first oxidizer inlet 42 under high pressure and flows toward the first oxidizer manifold 41, where it is injected into the first combustion chamber 70 of the generator 8. Excess oxidizer flows under high pressure to the oxidizer transfer tube 49, and then to the hot oxidizer manifold 136, where the gaseous oxygen is injected into the third combustion area 120.)

The LOX that enters the other side of the tee flows to the oxygen pressure and flow management system 278 which contains, for example, pressure regulators, a cavitating fluid venturi control and/or temperature and pressure sensing transducers. The LOX remains liquid and is conducted from the oxygen pressure and flow management system 278 to the generator 8. (As is shown in FIG. 1, the LOX enters the second oxidizer inlet 81 that supplies LOX to the second oxidizer manifold 82. The LOX is then injected into the second combustion chamber 100. Excess oxidizer flows under high pressure to the oxidizer transfer tube 49, and then to the hot oxidizer manifold 136, where the gaseous oxygen is injected into the third combustion area 120.)

The fuel employed in the fuel subsystem 4000 may be in a liquid, solid or gaseous state, and is obtained from a bulk fuel storage tank 202. The fuel system 4000 includes a first fuel feed line 280 that feeds the fuel through a third valve 281 to a fuel pump 282, which is powered by a fuel pump drive unit 283. The fuel pump 282 delivers high pressure fuel through a fourth valve 284. The fuel is then conducted into a fuel pressure and flow management system 285 that contains, for example, pressure regulators, a cavitating fluid venturi control and/or temperature and pressures sensing transducers. The fuel is conducted from the fuel pressure and flow management system 285 through a second fuel feed line 286 to the generator 8. (As is shown in FIG. 1, the fuel is discharged into the fuel inlet manifold 12 of the generator 8.)

Referring to FIG. 1, a suitable igniter 20 is used to ignite the oxygen and fuel mixture that is flowing into the first combustion chamber 70.

The generator 8 efficiently combusts the injected reactants under controlled conditions, producing a high pressure, high temperature gaseous mixture of combustion fuel gases. It converts the chemical energy present in the fuel into thermal (heat) energy that becomes transferred to surrounding tubes containing water, thereby converting the water in the tubes into a steam product. A separate hot combustion gas exhaust product is also produced by the generator 8, which can be released from the generator 8 through a first combustion gas exhaust line 125 (FIG. 14) to an exhaust heat recovery steam generator 400 that is present in the exhaust heat recovery subsystem 2000. Combustion gas exhaust produced in the exhaust heat recovery subsystem 2000 exits the trigeneration steam energy generating plant 10000 via a second combustion gas exhaust line 405.

As is shown in both FIG. 1 and FIG. 14, water that enters the generator 8 is converted into a superheated steam product or saturated steam product by the time it exits through superheated steam product outlets present in the generator 8 (shown as 54, 67, 94, 132, 139 and 144 in both FIG. 1 and FIG. 14) to a central superheated steam drum 300. The high pressure superheated steam product or saturated steam product is then delivered from the central superheated steam drum 300 to the power turbine subsystem 7000 (FIG. 14). Superheated steam product or saturated steam product exits the power turbine subsystem 7000 and is delivered to a high pressure power turbine 310 via a first superheated steam product discharge line 301.

Thermal control of the combustion processes in the generator 8 can be accomplished by controlling the cooling water flow rate and the heat input rate in connection with each of the combustion chamber water inlets (shown as 52, 62, 92, 131, 133 and 149 in FIG. 1) via a second water feed line 295 that leads to the generator 8 from the water management subsystem 5000. Make-up feed water is supplied by a make-up water line 425, which provides cooling water to the generator 8 from the heat rejection subsystem 6000. For example, if 100 lbs of water is present at the start up of the generator 8 (when operation is commenced), and 10 lbs of water is used by the generator 8, then 10 lbs of water will be supplied to the generator 8 by the make-up water line 425.

The water management subsystem 5000 maintains the proper water balance in the generator 8 by maintaining a proper quantity of cooling water that is provided to the generator 8. The water use in the water management subsystem 5000 is obtained from a bulk water storage tank 203. The water management subsystem 5000 includes a first water feed line 290 that feeds the water through a fifth valve 291 to a high pressure water pump 292, which is powered by a water pump drive unit 293. The water pump 292 conducts high pressure water through a first water pressure and flow management system 294 that contains, for example, pressure regulators, a cavitating fluid venturi control and/or temperature and pressures sensing transducers. The water is conducted from the first water pressure and flow management system 294 through a sixth valve 296 into the water inlets (shown as 52, 62, 92, 131, 133 and 149 in FIG. 1) of the generator 8, providing thermal control of the combustion processes.

At its start up, the generator 8 uses water that flows into it from the water management subsystem 5000 (for steam water). At this stage, the water is generally at ambient temperature, and is pumped at a high pressure from the high pressure water pump 292 to the water inlets of the generator 8 (shown as 52, 62, 92, 131, 133 and 149 in FIG. 1). However, when the generator 8 is filled with a sufficient amount of water to permit its proper operation, the first water pressure and flow management system 294 will close the sixth valve 296, and divert cooling circulation water away from the generator 8.

Water that is diverted away from the generator 8 flows toward the heat rejection subsystem 6000 through a seventh valve 297 into a first water line 298, and then to a first cooling water pump 552, which is powered by a first cooling water pump drive unit 553. The cooling water is circulated through the first cooling water pump 552 and can be diverted into a holding tank and water cooling tower 550, to a water condenser 570 and/or to a water chiller 540. Circulating water can be discharged from the first cooling water pump 552 through an eighth valve 554 into a second water line 551 that leads to the inlet side of the holding tank and water cooling tower 550. In addition, circulating water can be discharged from the first cooling water pump 552 through a third water line 555 to a ninth valve 556 and into the cold water inlet side of the water condenser 570. The water condenser 570 allows cooling water to be discharged through a fourth water line 545 to the inlet side of the water chiller 540.

At its start up, there is generally a sufficient amount of water available to operate the generator S. However, to ensure that a sufficient amount of water is available during the start-up, shut-down, and other operations of the generator 8, the heat rejection subsystem 6000 is employed. The heat rejection subsystem 6000 acts as a water reservoir, as well as a receiver for excess water generated by the generator 8 during its operation.

In addition to the first cooling water pump 552 and the other components described above, the heat rejection subsystem 6000 contains a second cooling water pump 422, which is driven by a second cooling water pump drive unit 421, a second water pressure and flow management system 423 and a third water pressure and flow management system 428. Each of the second and third water pressure and flow management systems 423 and 428 can contain, for example, pressure regulators, cavitating fluid venturi controls and/or temperature and pressure sensing transducers. The heat rejection subsystem 6000 provides make-up water that is preferably preheated for use in the exhaust heat recovery steam generator 400. The exhaust heat recovery steam generator 400 receives heated make-up water from the water condenser 570 and from the holding tank and water cooling tower 550. Heated make-up water is pumped from the water condenser 570 through a fifth water line 571 and then through a tenth valve 572 to the second cooling water pump 422. The heated make-up water is then discharged into the second water pressure and flow management system 423. A twelfth water line 557 carries feed water from the water holding tank and cooling tower 550 through a fourteenth valve 558 to the second cooling water pump 422.

The second water pressure and flow management system 423 can discharge heated make up water through a sixth water line 426 to the high pressure inlet (not shown) of the exhaust heat recovery steam generator 400. Heated make-up water that does not flow into the exhaust heat recovery steam generator 400 from the sixth water line 426 is discharged through a seventh water line 427 into the third water pressure and flow management system 428. The third water pressure and flow management system 428 discharges heated medium pressure make-up water to a medium pressure water inlet (not shown) present on the exhaust heat recovery steam generator 400, and discharges heated low pressure make-up water through an eighth water line 429 to a low pressure water inlet (not shown) present on the exhaust heat recovery steam generator 400. Further, heated high pressure make-up water can be discharged through the second water pressure and flow management system 423 through an eleventh valve 424 into the make-up water line 425 which leads to the generator 8 (and enters into the second water feed line 295).

The power turbine subsystem 7000 converts the output energy produced by the generator 8 into mechanical energy that can drive the electrical power generator subsystem 8000. The power turbine subsystem 7000 contains three electrical power generation turbines, a high pressure power turbine 310, a medium pressure power turbine 320 and a low pressure power turbine 330, which are pressure staged for optimum efficiency to maximize the use of the energy produced by the generator 8. The power turbine subsystem 7000 also contains three turbine exhaust steam lines, a high pressure exhaust steam line 311, a medium pressure exhaust steam line 321 and a low pressure exhaust steam line 336, as well as a turbine reheated line 401. The high pressure exhaust steam line 311 leads from the high pressure power turbine 310 to the exhaust heat recovery steam generator 400, while the low pressure exhaust steam line 336 leads from the low pressure power turbine 330 to the exhaust heat recovery steam generator 400. The turbine reheated line 401 leads from the exhaust heat recovery steam generator 400 to the medium pressure power turbine 320. The assembly of the high pressure power turbine 310 and the high pressure exhaust steam line 311 is followed by the assembly of the medium pressure power turbine 320 and the medium pressure exhaust steam line 321. The power turbine system 7000 is terminated by an assembly of the low pressure power turbine 330 and the low pressure exhaust steam line 336, which sends the exhaust steam to the exhaust heat recovery steam generator 400.

Superheated steam product or saturated steam product produced by the generator 8 is delivered from the generator 8 to the power turbine subsystem 7000 via the first superheated steam product discharge line 301, which leads to the high pressure side (not shown) of the high pressure power turbine 310. Exhaust steam from the high pressure power turbine 310 is discharged from the high pressure power turbine 310 to the high pressure exhaust steam line 311.

The assembly described in the preceding paragraph is followed by the turbine reheated line 401 that exits the exhaust heat recovery steam generator 400 and leads to the medium pressure power turbine 320. In the turbine reheated line 401, the temperature of the exhaust steam is increased to the temperature of the superheated steam product or saturated steam product that exits through superheated steam product outlets (shown in FIG. 1 as 54, 67, 94, 132, 139 and 144) present in the generator 8. This is performed by combusting exhaust steam in a reheated chamber (not shown) of the exhaust heat recovery steam generator 400, and mixing the output from this combustion process with the main superheated steam product flow stream, thus adding energy, and maintaining a constant inlet temperature of the steam that leads into the medium pressure power turbine 320 from the turbine reheated line 401. Superheated steam product or saturated steam product is delivered to the medium pressure power turbine 320 via the turbine reheated line 401, with exhaust steam from the medium pressure power turbine 320 being discharged to the medium pressure exhaust steam line 321. The exhaust steam flows from the medium pressure exhaust steam line 321 to the low pressure power turbine 330, and then out of the low pressure exhaust steam line 336, which sends the exhaust steam to the exhaust heat recovery steam generator 400.

An electrical power generation subsystem 8000 that is located near the low pressure power turbine 330 has an electrical energy conversion facility 500 that contains one or more electrical generators and power conditioners. These electrical generators and power conditioners develop the electrical energy end product 501 of this trigeneration steam energy generating plant 10000 from the superheated or saturated steam products.

The exhaust heat recovery subsystem 2000, which contains the exhaust heat recovery steam generator 400, is a gas handling system that makes the most efficient use of the exhaust products produced by the generator 8, and by the three different power turbines 310, 320 and 330. The exhaust heat recovery steam generator 400 contains a high pressure feed water inlet, a medium pressure feed water inlet, a low pressure feed water inlet, a high pressure economizer, a medium pressure economizer, a low pressure economizer, a high pressure boiler, a medium pressure boiler, a low pressure boiler, a high pressure drum, a medium pressure drum, a low pressure drum, a high pressure super heater outlet, a medium pressure steam outlet, and a low pressure steam outlet, which are not shown, but which are commercially available. Exhaust heat recovery steam generators are commercially available from Babcock & Wilcox Company (Barberton, Ohio) and Energy Recovery International (Lincoln, Nebr.).

Low pressure steam that exits from the low pressure power turbine 330 is discharged into the low pressure exhaust steam line 336, and then into a low pressure feed water inlet (not shown) present on the exhaust heat recovery steam generator 400. Low pressure steam can exit from the exhaust heat recovery steam generator 400 through a twelfth valve 404 and into a low pressure steam discharge line 403. The energy present in this low pressure steam is suitable for a wide range of industrial applications.

A medium pressure steam outlet (not shown) present on the exhaust heat recovery steam generator 400 is connected to the turbine reheated line 401. The turbine reheated line 401 feeds medium pressure steam exiting from the exhaust heat recovery steam generator 400 to the medium pressure power turbine 320. A first 3-way valve 406 is present on the turbine reheated line 401, and can conduct medium pressure steam exiting from the exhaust heat recovery steam generator 400 into a first medium pressure steam discharge line 407, and then into a medium pressure steam and flow management system 402. The medium pressure steam and flow management system 402 contains, for example, pressure regulators, a cavitating fluid venturi control and/or temperature and pressures sensing transducers. Medium pressure steam can be directed from the medium pressure steam and flow management system 402 through a thirteenth valve 408 and into a medium pressure steam line 409 that leads into the water chiller 540. A ninth water line 541 transports water from the water chiller 540 to the water condenser 570, and a fourth water line 545 carries water from the water condenser 570 to the water chiller 540. A tenth water line 543 carries cold water from the water chiller 540 to a cooling unit (not shown), such as an air conditioner, for use in cooling applications, and an eleventh water line 544 carries hot water from the cooling unit back to the water chiller 540, The cooled air product of the water chiller 540 is suitable for a wide range of cooling industrial applications, such as air conditioning. A thirteenth water line 546 transports water from the water condenser 570 to the holding tank and water cooling tower 550.

Alternatively, medium pressure steam can flow from the medium pressure steam and flow management system 402 into a second medium pressure steam discharge line 407A and out of the trigeneration steam energy generating plant 10000. The energy present in this medium pressure steam is suitable for a wide range of industrial applications.

A superheated steam outlet (not shown) that is present on the exhaust heat recovery steam generator 400 is connected to a high pressure steam line 312 that sends a superheated steam product or saturated steam product to the central superheated steam drum 300. A second 3-way valve 314 present on the high pressure steam line 312 can be used to direct the superheated steam product or saturated steam product to a second superheated steam discharge line 313 and out of the trigeneration steam energy generating plant 10000.

The energy present in the superheated steam product or saturated steam product is suitable for a wide range of industrial applications, such as for the generation of electricity, using for example: (a) extraction turbines, which take steam at a high pressure, use some of the steam for the generation of electricity, and send the remainder of the steam to other steam processes located downstream of the turbine; (b) back pressure turbines, which take steam at a high pressure, use some of the pressure and pass all of the steam to other steam processes at a reduced pressure; and/or (c) condensing turbines, which take steam at a high pressure and, through a series of stages, take all of the energy available in the steam and discharge the steam at a low pressure. Condensing turbines are generally used at power plants, where the only purpose for the steam is generally to produce electricity in a steam turbine. However, some of the steam may be used to pre-heat incoming boiler water.

Method of Manufacture

The hydrocarbon combustion gas generator, an example of which is shown in FIGS. 1-3, can be manufactured in the manner described below or by other methods known in the art.

Most of the components of the hydrocarbon combustion gas generator 8 ("generator") can be machined from one or more pieces of material in a manner known by one skilled in the art. The separate components, or areas of components, of the generator 8 can be attached with one another by welding, bolts, compression fittings, or other methods known in the art. O-rings, gaskets, or other suitable sealants materials can be used to prevent fluid leakage from between components. The o-ring dimensions employed in the generator 8 will depend upon the MAOP employed and can readily be determined by one skilled in the art. For example, in the generator 8 shown in FIG. 1, a gasket or o-ring is preferably present between the fuel inlet manifold 12 and the fuel metering block 30, between the fuel metering block 30 and the first oxidizer manifold plate 40, between the first superheated steam product exit manifold 53 and the first water manifold plate 60, between the first water manifold plate 60 and the second oxidizer manifold plate 80, between the second water manifold 98 and the second oxidizer manifold plate 80, between the second superheated steam product exit manifold 93 and the second water manifold plate 110, between the second water manifold plate 110 and the third outer housing 130, and between the third outer housing 130 and the fifth water manifold 147.

The description herein about one component of the generator 8 applies to all of the same components that may be present in, or on, the generator 8. For example, a discussion about one first water manifold 51 applies to all of the first water manifolds 51 that may be present on the generator 8. The second water manifold 98 of the generator 8 may, for instance, be manufactured in a manner similar to that of the first water manifold 51.

The fuel inlet manifold 12 preferably is designed to operate at a pressure from about 1200 to about 2500 psig in a conventional manner. The connection device that is preferably present on the fuel inlet manifold 12, and other portions of the fuel inlet manifold 12, are all preferably machined from one piece of austenitic/ferritic steel. A series of equally-spaced bolt holes are preferably drilled into the connection device present on the fuel inlet manifold 12, with the number, size and spatial distribution of the bolt holes being optimized as known by one skilled in the art for a particular fuel pressure. The number, size and spatial orientation of the bolt holes should be arranged to align with bolt holes present on a similar connection device present on a fuel flow control device. High strength bolts with lock washers or washers and/or nuts, or socket head screws with lock washers or washers that are preferably made of austenitic/ferritic steel (hereinafter collectively referred to as "fasteners") can then be inserted into the bolt holes to connect the fuel inlet manifold 12 with the fuel flow control device. Other components of the generator 8 can be attached in a similar manner as is shown in FIGS. 1-3.

The fuel inlets 9 may be drilled and lapped at an angle in the fuel inlet manifold 12, with fuel passageways leading from the fuel inlets 9 toward, and connecting with, the fuel chambers 10, which may also be drilled into the fuel inlet manifold 12. The aft end of the fuel inlet manifold 12 is preferably attached to the forward end of the fuel metering block 30 using fasteners. The area between the aft end of the fuel inlet manifold 12 and the forward end of the fuel metering block 30 are preferably sealed with a high pressure gasket. Alternatively, an optional o-ring groove can be machined into the base of the fuel inlet manifold 12, with the o-ring dimensions selected based, in part, on the MAOP. The o-ring and gasket are made of a suitable high temperature and pressure material.

The fuel metering block 30, the injector wear plate 32 and the first fuel port tubes 36 are preferably each separately machined from one piece of austenitic/ferritic steel. The first fuel ports 34 are drilled through the injector wear plate 32, the fuel metering block 30, the first oxidizer inlet 42, the first oxidizer manifold plate 40 and the first transfer injector plate 44 (for the subsequent insertion of the first fuel port tubes 36 therein). The first fuel port tubes 36 are inserted into the injector wear plate 32 and through the fuel metering block 30, the first oxidizer manifold plate 40 and the first transfer injector plate 44. The injector wear plate 32 may be pressed into a pocket machined into the forward end of the fuel metering block 30.

The second fuel ports 65 can be drilled through the first water manifold plate 60, the second water inlet 62, the fuel wear plate 63, the feed water manifold 64, the second oxidizer manifold 82, the second transfer injector plate 84 and the second oxidizer manifold plate 80 in the manner described above in connection with the first fuel ports 34 (for the subsequent insertion of the second fuel port tubes 66 therein). As shown in FIG. 2, the second fuel port tubes 66 can be inserted through the second fuel ports 65, the first water manifold plate 60, the feed water manifold 64, the second oxidizer manifold plate 80, the second oxidizer manifold 82 and the second transfer injector plate 84.

The first oxidizer manifold plate 40 is preferably designed to operate at a pressure ranging from about 1200 to about 2500 psig (84 to 180 kg/cm$^2$) in a conventional manner, and is preferably machined from one piece of austenitic/ferritic steel. The first transfer injector plate 44 is preferably machined from one piece of austenitic/ferritic steel. The design of the first transfer injector plate 44 permits multiple first fuel ports 34 to be present therein, in which multiple first fuel port tubes 36 may be inserted for different types of fuel. The number of first fuel ports 34 desired, which is determined by the selected fuel and O/F ratio, can be drilled into the first transfer injector plate 44. The first transfer injector plate 44 can be pressed into a pocket machined into the aft end of the first oxidizer manifold plate 40. The first oxidizer manifold 41 may be machined into the first oxidizer manifold plate 40. The first oxidizer injector orifices 46 can be drilled into the first transfer injector plate 44, the forward end of which can be attached to the aft end of the first oxidizer manifold plate 40.

The second transfer injector plate 84 is also preferably machined from one piece of austenitic/ferritic steel. The design of the second transfer injector plate 84 permits multiple second fuel ports 65 to be present therein, in which multiple second fuel port tubes 66 may be inserted for different types of fuel. The number of second fuel ports 65 desired, which is determined by the selected fuel and O/F ratio, can be drilled into the second transfer injector plate 84. The second transfer injector plate 84 can be pressed into a pocket machined into the aft end of the second oxidizer manifold plate 80. The second oxidizer manifold 82 may be machined into the second oxidizer manifold plate 80. The second oxidizer injector orifices 85 can be drilled into the second transfer injector plate 84, the forward end of which can be attached to the aft end of the second oxidizer manifold plate 80.

The igniter housing 26 of the igniter 20 is preferably machined from one piece of austenitic/ferritic steel that is compatible with an oxidizer. The mixing chamber 28 may be drilled into the aft end of the igniter 20, and should have the same, or corresponding, diameter as the flame tube 29 that is drilled into the fuel metering block 30, the first oxidizer inlet 42 and the first oxidizer manifold plate 40. The igniter fuel inlet 22 and the igniter oxidizer inlet 24 may be drilled and tapped at an angle through the igniter housing 26, allowing the oxidizer and fuel employed in the igniter 20 to intersect in the center of the mixing chamber 28. An electronic igniter interface may be drilled and tapped, using screw threads, at the forward end of the igniter housing 26 and mixing chamber 28 to attach a high voltage sparking device (that can ignite a mixture of oxidizer and fuel in the mixing chamber 28) to the igniter housing 26. The igniter housing 26 may be welded to the fuel metering block 30, and should have the mixing chamber 28 aligned with the flame tube 29.

The first combustion chamber 70 is preferably a cylindrical hollow tube that has its sidewalls formed from the first tube assembly 71, which fits within the first outer housing 50. The first outer housing 50 has one or more first water inlet passageway 55 drilled into it, and one or more first superheated steam product exit passageways 56 drilled into it. Each of the individual tubes present within the first tube assembly 71 is preferably drilled and sealed to form one or more water inlets and one or more superheated steam product outlets. The individual tubes, which preferably are made of ferritic/austenitic steel, can then be welded together to form a preferably concentric tubular shell. The outside of the first tube assembly 71 is preferably wrapped or covered with a high temperature material.

The aft end of the first oxidizer manifold plate 40 preferably has a groove 71a machined into it, where the forward end of the first tube assembly 71 can be inserted into the first oxidizer manifold plate 40. The forward end of the first water manifold plate 60 also preferably has a groove 71b machined into it, where the aft end of the first tube assembly 71 can be inserted into the first water manifold plate 60. These areas, where the two different components of the generator 8 come into contact, are preferably sealed with a gasket.

The first water manifold 51 can be welded to the forward end of the first outer housing 50, and can be attached with bolts to the aft end of the first oxidizer manifold plate 40. The first superheated steam product exit manifold 53 can be welded to the aft end of the first outer housing 50, and can be bolted to the forward end of the first water manifold plate 60.

The second combustion chamber 100 is preferably a cylindrical hollow tube that has the sidewalls of its forward end formed with the second tube assembly 101, which fits within the second outer housing 90. The second outer housing 90 has one or more second water inlet passageways 95 drilled into it, and one or more second superheated steam product exit passageways 96 drilled into it. Each of the individual tubes present in the second tube assembly 101 is preferably drilled and sealed to form one or more water inlets and one or more superheated steam product outlets. The individual tubes, which are preferably made of ferritic/austenitic steel, can then be welded together to form a concentric tubular shell. The outside of the second tube assembly 101 is preferably wrapped or covered with a high temperature material.

The aft end of the second oxidizer manifold plate 80 preferably has a groove 101a machined into it, where the forward end of the second tube assembly 101 can be inserted into the second oxidizer manifold plate 80. The forward end of the second water manifold plate 110 also preferably has a groove 101b machined into it, where the aft end of the second tube assembly 101 can be inserted into the second water manifold plate 110. These areas, where the two different components of the generator 8 come into contact, are preferably also sealed with a gasket.

The second water manifold 98 can be welded to the forward end of the second outer housing 90, and can be attached with fasteners to the aft end of the second oxidizer manifold plate 80. The second superheated steam product exit manifold 93 can be welded to the second outer housing 90 between its forward end and aft end, and can be attached with fasteners to the forward end of the second water manifold plate 110.

The third combustion area 120 is a cylindrical hollow tube that has no wall (or other closure) at its aft end, allowing a combustion gas exhaust product produced by the generator 8 to exit from the generator 8. A tube 121 that is preferably hollow (but that may be solid), and that preferably forms the sidewalls of the aft end of the second combustion chamber 100, and of the forward end of the third combustion area 120, is also preferably made from one piece of austenitic/ferritic steel.

The forward end of the third combustion area 120 preferably has one or more hot oxidizer orifices 122 evenly spaced in one or more rows drilled into the tube 121. The hot oxidizer orifices 122 should be aligned with the hot oxidizer manifold 136, and should be drilled in one or more rows radially around the circumference of the tube 121.

The first water manifold 51, the first superheated steam product exit manifold 53, the second water manifold 98 and the second superheated steam product exit manifold 93 are each preferably designed to operate at a pressure up to about 4500 psia (320 kg/cm$^2$) and at a temperature of up to about 1150° F. (621° C.), and more preferably at a pressure of about 2500 psia (180 kg/cm$^2$) and a temperature of about 1000° F. (538° C.). Each of these components of the generator 8 preferably is separately machined from one piece of austenitic/ferritic steel, and has a connection device, such as a flange, having one or more equally spaced bolt holes drilled therein, at its forward end or aft end for attachment with fasteners to another component or area of the generator 8. Each of these components has one or more inlets or outlets for water and/or a superheated steam product or dry saturated steam product (the first water inlet 52, the first superheated steam product outlet 54, the third water inlet 92 and the third superheated steam product outlet 94) drilled therein, or attached thereto.

The first water inlet 52, the first superheated steam product outlet 54, the third water inlet 92 and the third superheated steam product outlet 94 each preferably have a flange type interface that is welded to the first water manifold 51, the first superheated steam product exit manifold 53, the second water manifold 98 and the second superheated steam product exit manifold 93, respectively. The lower portion of the first water manifold 51 and of the first superheated steam product exit manifold 53 each preferably have a machined flange type surface that can be welded to the first outer housing 50. The first water manifold 51 preferably has a connection device, such as a flange, at its forward end having one or more drilled bolt holes, permitting it to be bolted or otherwise fastened to the aft end of the first oxidizer manifold plate 40. Preferably, the area in which these two components of the generator 8 come into contact is sealed with a gasket. Alternatively, an o-ring groove can be machined into the base of the flange at its aft end. A similar connection device present on the aft end of the first superheated steam product exit manifold 53 permits it to be bolted to the forward end of the first water manifold plate 60. Preferably, the area in which these two components of the generator 8 come into contact is also sealed with a gasket. Alternatively, an o-ring groove can be machined into the base of the flange at its aft end.

The lower portions of the second water manifold 98 and of the second superheated steam product exit manifold 93 can be attached to the second outer housing 90 in the same manner described hereinabove in connection with the first water manifold 51 and the first superheated steam product exit manifold 53. The forward end of the second water manifold 98 can be attached to the aft end of the second oxidizer manifold plate 80, and the aft end of the second superheated steam product exit manifold 93 can be attached to the forward end of the second water manifold plate 110, in the same manner described hereinabove in connection with the first water manifold 51 and the first superheated steam product exit manifold 53.

The second water manifold plate 110 is preferably machined from one piece of austenitic/ferritic steel, and preferably has a connection device, such as a flange, at its aft end for attachment using fasteners to the forward end of the third outer housing 130, which preferably has a similar connection device. Preferably, the area in which these two components of the generator 8 come into contact is sealed with a gasket. Alternatively, an o-ring groove can be machined into the aft end of the second water manifold plate 110. The second water manifold plate 110 preferably has a groove 101b machined into its forward end to allow the second tube assembly 101 to be inserted into this groove 110b. This groove 101b permits a superheated steam product, which will have a high temperature, and which will be under a large amount of pressure, to exit from superheated steam product outlet holes that are present in the individual tubes contained in the second tube assembly 101, and to flow into the second superheated steam product exit manifold 93. The forward end of the second water manifold plate 110 preferably has one or more equally spaced drilled and taped bolt holes that correspond in number, alignment and spatial orientation with bolt holes drilled into a connection device, such as a flange, present on the aft end of the second superheated steam product exit manifold 93. The second water manifold plate 110 can then be attached with the second superheated steam product exit manifold 93 using fasteners.

The third outer housing 130 is preferably designed to withstand a pressure of up to about 4500 psia (320 kg/cm$^2$), and a temperature of up to about 1150° F. (621° C.), with a pressure of about 2600 psia (180 kg/cm$^2$) and temperature of about 1000° F. (538° C.) being more preferred. The third outer housing 130 preferably is machined from one piece of austenitic/ferritic steel, and has a plurality of equally spaced bolt holes drilled into a connection device, such as a flange, present at its aft end, permitting its attachment using bolts to the fifth water manifold 147.

The fourth water inlet 131, the third water manifold 135 and the fourth superheated steam product outlet 132 are each preferably machined into the third outer housing 130. The areas in which the different components of the generator 8 come into contact are preferably sealed with a gasket. The fifth water inlet 133, the fourth water manifold 137 and the fifth superheated steam product outlet 139 are preferably machined into the third outer housing 130 in a similar manner.

The third outer housing 130 preferably has a pocket machined into an area between its forward end and its aft end, which extends radially from its internal diameter. The aft end of the oxidizer transfer tube 49, which fits within this pocket, can be welded to the third outer housing 130, allowing hot oxidizer to pass from the oxidizer transfer tube 49 through the hot oxidizer manifold 136, which also fits within this pocket, and become injected through the hot oxidizer orifices 122 into the third combustion area 120. The hot oxidizer manifold 136 is positioned between the aft end of the oxidizer transfer tube 49 and the tube 121.

The fifth water manifold 147 is preferably machined from one piece of austenitic/ferritic steel, and preferably has a series of equally spaced bolt holes drilled into a connection device, such as a flange, present at its upper portion, permitting it to be attached with one or more fasteners to the aft end of the third outer housing 130. Preferably, the area in which these two components of the generator 8 come into contact is sealed with a gasket. Alternatively, an o-ring groove can be machined into the aft end of the base of a connection device present at the aft end of the third outer housing 130.

The fifth water manifold 147 preferably has a cavity machined into an area between its forward end and its aft end that permits it to receive the feed water that is flowing under pressure through the sixth water inlet 149. The third tube assembly 146 preferably contains an array of a plurality of concentric hollow tubes, and is fitted into a fourth outer housing 140. These tubes preferably are welded together in a manner that forms a conical cone, and are preferably made of austenitic/ferritic steel The forward end of the third tube assembly 146 can be welded to the lower portion of the fifth water manifold 147, and the aft end of the third tube assembly 146 can be welded to the forward end of the third superheated steam product exit manifold 143.

The third superheated steam product exit manifold 143 is preferably machined from one piece of austenitic/ferritic steel. The forward end (and bottom portion) of the third superheated steam product exit manifold 143 preferably has a cavity machined into it, permitting the aft end of the third tube assembly 146, the tubes of which form a conical cone, to be welded to it. The sixth superheated steam product outlet 144 can be attached to the third superheated steam product exit manifold 143 in the same manner described hereinabove for the first superheated steam product outlet 54.

The exhaust plate 148 preferably is also made from one piece of ferritic/austenitic steel, and has a series of equally spaced bolt holes drilled into a connection device, such as a flange, present at its upper portion, permitting it to be attached using one or more fasteners to a waste heat converter (not shown), such as an exhaust heat recovery steam generator (FIG. 14), having a connection device containing similarly numbered, sized and spaced bolt holes. The area in which the third superheated steam product exit manifold 143 and the exhaust plate 148 come into contact is preferably sealed with a flange (or other) gasket, or with an o-ring, preventing hot combustion gas exhaust from escaping from this area of the generator 8.

The apparatus and methods described above can be further understood in view of the following non-limiting examples.

Example 1

Hydrocarbon Combustion Gas Generator

A 10-MW hydrocarbon combustion gas generator ("generator") having about a 97% combustion efficiency is constructed of austenitic/ferritic steel generally in the manner shown in the drawings. The generator has an overall length of about 162" (411 cm) and an overall outer diameter of about 16.75" (42.5 cm). It has two combustion chambers and a third combustion area, each of which has an inner diameter of about 13.25" (33.7 cm) and an outer diameter of about 14.75" (37.5 cm). However, the portion of the third combustion area from which a combustion gas exhaust product exits the generator has different diameters. This part of the third combustion area is cone shaped, with the forward end of the cone having an inner diameter of about 13.25" (33.7 cm) and an outer diameter of about 14.75" (37.5 cm), and with the aft end of the cone having an inner diameter of about 25" (64 cm) and an outer diameter of about 26.50" (67.3 cm).

The first combustion chamber has a length of about 36" (91 cm), and has its sidewalls formed with a first tube assembly containing fifty-eight tubes that is about 36" (91 cm) long. The first tube assembly also lines the inside of a first outer housing. Each of the tubes present in the bundle of individual tubes that forms the first tube assembly has an outer diameter of about 0.75" (1.9 cm) and an inner diameter of about 0.622" (1.58 cm). Feed water having a temperature of about 250° F. (120° C.) is supplied to the first tube assembly through a first water inlet at a flow rate of about 1737.5 gallons per minute (gpm) (394.6 m$^3$/h). The feed water travels from a source of water to the first water inlet, into a first water manifold, and then into 58 first water inlet passageways. The water then travels through each of the 58 individual tubes that are present in the first tube assembly at a flow rate of about 9.90 to about 10.1 gpm (2.25 to 2.29 m$^3$/h) per tube, where the water is converted into a superheated steam product or dry saturated steam product. The steam produced in the tubes travels out of 58 first superheated steam product exit passageways and into a first superheated steam product exit manifold. From there, the steam travels through a first superheated steam product outlet and out of the generator into a superheated steam product collection device at a temperature of about 1000° F. (538° C.), and at a pressure of about 2000 psig (141 kg/cm$^2$).

The second combustion chamber has a length of about 36" (91 cm), and has the sidewalls at its forward end formed with a second tube assembly containing 58 tubes that is about 36" (91 cm) long. The second tube assembly lines the inside of a second outer housing. Each of the tubes present in the bundle of individual tubes that forms the second tube assembly has an outer diameter of about 0.75" (1.9 cm) and an inner diameter of about 0.622" (1.58 cm). Feed water having a temperature of about 250° F. (120° C.) is supplied to the second tube assembly through a third water inlet at a flow rate of about 1737.5 gpm (394.6 m$^3$/h). The feed water travels from a source of water to the third water inlet, into a second water manifold, and then into 58 second water inlet passageways. The water then travels through the 58 individual tubes that are present in the second tube assembly at a flow rate of from about 9.90 to about 10.1 gpm (2.25 to 2.29 m$^3$/h) per tube, where it is converted into a superheated steam product or dry saturated steam product. The steam produced in the tubes travels out of 58 second superheated steam product exit passageways and into a second superheated steam product exit manifold. From there, the steam travels through a third superheated steam product outlet and out of the generator into a superheated steam product collection device at a temperature of about 1000° F. (538° C.), and at a pressure of about 2000 psig (141 kg/cm$^2$).

A single hollow tube that forms the sidewalls of the aft end of the second combustion chamber, and the forward end of the third combustion area, has a length of about 24 inches, an outside diameter of about 14.75 inches and an inside diameter of about 13.25 inches. Feed water having a temperature of about 250° F. is supplied from a source of water through a fourth water inlet into a third water manifold at a flow rate of about 1737.5 gpm, where it is converted into a superheated steam product or dry saturated steam product. The superheated steam product or dry saturated steam product exits the generator into a superheated steam collection device through a fourth superheated steam product outlet at a temperature of about 1000° F., and at a pressure of about 2000 psig. Feed water having a temperature of about 250° F. is also supplied from a source of water through a fifth water inlet into a fourth water manifold at a flow rate of about 1737.5 gpm, where it is converted into a superheated steam product or dry saturated steam product. The steam product exits the generator into a superheated steam collection device through a fifth superheated steam product outlet at a temperature of about 1000° F., and at a pressure of about 2000 psig.

A liquid oxygen oxidizer is pumped from a source of LOX into a first oxidizer inlet. The LOX then flows into a first oxidizer manifold, where it is distributed in a radial manner to provide cooling for a first transfer injector plate, and where it becomes converted from a liquid into a gas. The resulting gaseous oxygen then passes through a plurality of first oxidizer injector orifices at an angle of about 66° into the first combustion chamber zone at a flow rate of about 1.35 lb/s and at a pressure of about 600 psig. At the same time, EF-15 fuel having an energy value of 19,700 BTU/lb is pumped from a source of this fuel separately into a fuel inlet manifold and into two separate fuel inlets. The fuel that is pumped into the two separate fuel inlets passes into two separate chambers, respectively, that are present in the fuel inlet manifold. The fuel then passes through a plurality of first fuel port tubes at an angle of about 90° into the first combustion chamber zone initially at a flow rate of about 1.142 lb/s, and at a pressure of about 600 psig, and subsequently (when the feed water reaches the designed operating pressure) at the slower flow rate of about 0.95 lb/s. The oxidizer and the EF-15 fuel pass into the first combustion chamber zone at a combined oxidizer and fuel flow rate of about 3.42 lb/s, and at an O/F ratio ranging from about 1.2 to about 1.79, and preferably about 1.19, in a vortexing manner to allow a sufficient homogenous mix of the fuel and oxidizer gases in the first combustion chamber. (Some of the fuel becomes in a gaseous state while some of the fuel remains in a solid state.) The vortexing is enhanced by the injection of both the oxidizer and the EF-15 fuel into the first combustion chamber at an angle, and allows for a residence time of the EF-15 fuel in the first combustion chamber of approximately 0.12 to 0.15 seconds (once the mixture of oxidizer and EF-15 fuel is ignited by a natural or propane gas flame from an igniter). In the first combustion chamber, the average combustion temperature is from about 2500° F. to about 2800° F. and the average combustion pressure is about 600 psig.

Additional LOX is pumped from a source of LOX into a second oxidizer inlet. The LOX then flows into a second oxidizer manifold, where the LOX is distributed in a radial manner to provide cooling for a second transfer injector plate, and for a plurality of second fuel port tubes, thereby converting the liquid oxidizer into a gas. The gaseous oxidizer passes through a plurality of second oxidizer injector orifices at an angle of about 700 into the second combustion chamber zone at a rate of about 2.646 tb/s, and at a pressure of about 500 psig. At the same time, the incomplete combustion product produced in the first combustion chamber, which includes some unburned EF-15 fuel, passes from the first combustion chamber into the second combustion chamber zone through a plurality of second fuel port tubes at a rate of about 0.890 lb/s, and at a pressure of about 500 psig. The O/F ratio in the second combustion chamber is from about 3.38 to about 5.03, and is preferably about 4.8. In the second combustion chamber, the average combustion temperature is from about 4500° F. to about 5500° F. and the average combustion pressure is 500 psig. The additional oxidizer and the combustion product produced in the first combustion chamber (containing some gas and some unburned fuel) enter the second combustion chamber in a vortexing manner to allow a sufficient homogenous mix of the remaining EF-15 fuel and the oxidizer gases. The vortexing is enhanced by the injection of the additional oxidizer into the second combustion chamber at an angle.

Water is pumped from a source of water into a second water inlet at a flow rate of about 1738 gpm. The water then travels into a feed water manifold, which distributes the water in a radial manner for the cooling of the upper portion of a plurality of second fuel port tubes (to help them maintain their structural integrity). The water converts to superheated steam or dry saturated steam that exits the generator through a second superheated steam product outlet. The steam product that exits the generator through the second superheated steam product outlet (and through all other superheated steam product outlets present in this generator) has a temperature of about 1000° F. and has a pressure of about 2000 psig.

Excess oxidizer that enters into an oxidizer transfer tube travels through the oxidizer transfer tube and passes into a hot oxidizer manifold that is adjacent to the outside of the tube that forms the sidewalls of the forward end of the third combustion area. The hot oxidizer manifold distributes the oxidizer around the tube, and through a plurality of hot oxidizer orifices, where the additional oxidizer enters at a flow rate of 0.798 lb/s into the combustion gas product stream, which has a flow rate of about 0.178 lb/s of unburned EF-15 fuel. In the third combustion area, the average combustion temperature is from about 5000° F. to about 5500° F. and the average combustion pressure is about 500 psig. The O/F ratio of the oxidizer and the EF-15 fuel for the combustion gas product stream in the third combustion area is from about 3.98 to about 6.3, and is preferably about 4.4, thus achieving about a 97% combustion efficiency of the EF-15 fuel.

The vortexing of the ES-15 fuel that is present in the combustion product that passes from the first combustion chamber into the second combustion chamber allows for a residence time of the hydrocarbon fuel material in the second combustion chamber and in the third combustion area that totals about 0.12 seconds.

The hot combustion gas exhaust produced by the generator exits the generator by passing out of the aft end of the third combustion area, which is about 24 inches long, which has sidewalls formed by a third tube assembly in the shape of a conical cone, and that extends away from the generator at about a 35° angle. A fourth outer housing is lined with the third tube assembly. Feed water having a temperature of about 250° F. passes from a source of water through a six water inlet into a fifth water manifold at a flow rate of about 1737.5 gpm, where it enters the forward end of the third tube assembly at a flow rate of from about 9.90 to about 10.1 gpm per tube and converts to superheated steam or dry saturated steam. The steam travels toward the aft end of the third tube assembly, passes into the third superheated steam product exit manifold and then exits out of the generator through a sixth superheated steam product outlet at a temperature of about 1000° F. and at a pressure of about 2000 psig. The combustion gas exhaust product temperature is from about 4500° F. to about 5000° F. when it exits the generator.

The hydrocarbon combustion gas generator is capable of producing from about 67,528 pounds of a superheated steam product or dry saturated steam product per hour (about 36,466 pounds per hour of dry saturated steam and about 31,062 pounds per hour of superheated steam) at the temperatures and pressures described which, in turn, could generate about 10 MW of electricity per hour. Further, the combustion gas exhaust product produced by this generator, if diverted to a heat recovery steam generator, such as the exhaust heat recovery steam generator shown in FIG. 14, could additionally generate from about 10 to about 15 MW megawatts of electricity per hour. Thus, a total of about 20 to about 25 MW of electrical power per hour could be produced by this generator In the configuration described in this example, the size of the generator is about 20% to about 50% smaller than conventional steam generators that produce a similar steam output.

Using LOX and EF-15 fuel, the generator described in this example produces an environmentally clean combustion gas exhaust product. The combustion gas exhaust product contains no (0 wt %) N, $NO_x$, NO, $NO_2$, $N_2O$, $N_2$, S, $SO_x$, SO, $SO_2$, $SO_3$, CO, HCl, $CH_4$, arsenic, uranium, mercury, lead, thorium, VOCs, dioxin, radium, radon, polonium, bismuth, other carcinogenic and/or mutagenic substances, particulate matter, coal ash or fly ash. Additionally, it contains a significantly smaller quantity of $CO_2$ (about a 97% reduction of $CO_2$) than would be produced by a conventional coal-burning plant that uses the same amount of coal, and/or that is capable of producing the same amount of electrical power.

Example 2

Analysis of Combustion Gas Exhaust Produced by Combustion of Natural Gas, Methanol, or Kerosene With Air or LOX Combustion products were determined using the thermochemical computer software GUIPEP based on using different fuels in the 10-MW hydrocarbon combustion gas generator described in Example 1. The test is based on combusting 2000 pounds of each of the fuels (natural gas, methanol, or kerosene (oil #1)) using LOX or air as the oxidizer, with each combustion gas exhaust product exiting the hydrocarbon combustion gas generator at about 1000 psig. The discharge temperature of the exhaust gas varies depending upon the fuel type. It is noted that in contrast with the present apparatus, conventional fuel combustion systems that employ air as an oxidizer would generally explode if LOX was employed as an oxidizer. The following Tables indicate the exhaust gas composition and temperature, as well as the weight, moles, and weight percent of each component in the combustion gas exhaust product.

| A. Natural Gas and LOX - (Exhaust Temp. of 2024° F.) | | | |
| --- | --- | --- | --- |
| Component | Moles in Exhaust Product | Pounds in Exhaust Product | Weight % |
| Carbon Monoxide (CO) | 0 | 0 | 0 |
| Carbon Dioxide ($CO_2$) | 28.300 | 229.801 | 11.490 |
| Water ($H_2O$) | 56.005 | 454.771 | 22.739 |
| Oxygen (O) | 0 | 0 | 0 |
| Oxygen ($O_2$) | 161.995 | 1315.427 | 65.771 |
| Hydrogen ($H_2$) (Gas) | 0 | 0 | 0 |
| Hydroperoxo ($HO_2$) | 0 | 0 | 0 |
| Hydroxyl Radical (HO) | 0 | 0 | 0 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 0 | 0 | 0 |
| Nitric Oxide (NO) | 0 | 0 | 0 |
| Methane ($CH_4$) | 0 | 0 | 0 |
| Total | 246.300 | 2000 | 100 |

No $NO_x$ (0 lbs) was found in the combustion gas exhaust product.

| B. Natural Gas and Air - (Exhaust Temp. of 1995° F.) | | | |
| --- | --- | --- | --- |
| Component | Moles in Exhaust Product | Pounds in Exhaust Product | Weight % |
| Carbon Monoxide (CO) | 0 | 0 | 0 |
| Carbon Dioxide ($CO_2$) | 28.295 | 190.666 | 9.533 |
| Water ($H_2O$) | 56.596 | 381.373 | 19.069 |

B. Natural Gas and Air - (Exhaust Temp. of 1995° F.)

| Component | Moles in Exhaust Product | Pounds in Exhaust Product | Weight % |
|---|---|---|---|
| Oxygen (O) | 0 | 0 | 0 |
| Oxygen ($O_2$) | 1.990 | 1.341 | 0.067 |
| Hydrogen ($H_2$) (Gas) | 0 | 0 | 0 |
| Hydroperoxo ($HO_2$) | 0 | 0 | 0 |
| Hydroxyl Radical (HO) | 0 | 0 | 0 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 211.709 | 1426.617 | 71.331 |
| Nitric Oxide (NO) | 2.950 | 0.002 | 0.0001 |
| Methane ($CH_4$) | 0 | 0 | 0 |
| Total | 296.799 | 2000 | 100 |

The exhaust product was determined to include 1,426.61 pounds of $NO_x$.

Tables A and B show that when the same amount of natural gas is combusted in the apparatus using air, rather than LOX, as the oxidizer, the process results in a significant increase in the criteria air pollutant $NO_x$.

C. Methanol and LOX - (Exhaust Temp. of 2125° F.)

| Component | Moles in Exhaust Product | Pounds in Exhaust Product | Weight % |
|---|---|---|---|
| Carbon Monoxide (CO) | 0 | 0 | 0 |
| Carbon Dioxide ($CO_2$) | 14.167 | 304.260 | 15.213 |
| Water ($H_2O$) | 28.336 | 608.553 | 30.428 |
| Oxygen (O) | 0 | 0 | 0 |
| Oxygen ($O_2$) | 50.623 | 1087.185 | 54.359 |
| Hydrogen ($H_2$) (Gas) | 0 | 0 | 0 |
| Hydroperoxo ($HO_2$) | 0 | 0 | 0 |
| Hydroxyl Radical (HO) | 0.0001 | 0.002 | 0.0001 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 0 | 0 | 0 |
| Nitric Oxide (NO) | 0 | 0 | 0 |
| Methane ($CH_4$) | 0 | 0 | 0 |
| Total | 93.127 | 2000 | 100 |

No $NO_x$ (0 lbs) was found in the combustion gas exhaust product.

D. Methanol and Air - (Exhaust Temp. of 1946° F.)

| Component | Moles in Exhaust Product | Pounds in Exhaust Product | Weight % |
|---|---|---|---|
| Carbon Monoxide (CO) | 0 | 0 | 0 |
| Carbon Dioxide ($CO_2$) | 14.167 | 231.949 | 11.597 |
| Water ($H_2O$) | 28.336 | 463.939 | 23.197 |
| Oxygen (O) | 0 | 0 | 0 |
| Oxygen ($O_2$) | 9.160 | 1.500 | 0.075 |
| Hydrogen ($H_2$) (Gas) | 0 | 0 | 0 |
| Hydroperoxo ($HO_2$) | 0 | 0 | 0 |
| Hydroxyl Radical (HO) | 0 | 0 | 0 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 79.559 | 1302.610 | 65.131 |
| Nitric Oxide (NO) | 1.030 | 0.002 | 0.0001 |
| Methane ($CH_4$) | 0 | 0 | 0 |
| Total | 122.154 | 2000 | 100 |

The exhaust product was determined to include 1,302.61 pounds of $NO_x$.

Tables C and D show that when the same amount of methanol is combusted in the apparatus using air, rather than LOX, as the oxidizer, the process results in a significant increase in the criteria air pollutant $NO_x$.

E. Kerosene and LOX - (Exhaust Temp. of 2385° F.)

| Component | Moles in Exhaust Product | Pounds in Exhaust Product | Weight % |
|---|---|---|---|
| Carbon Monoxide (CO) | 0 | 0 | 0 |
| Carbon Dioxide ($CO_2$) | 32.364 | 412.790 | 20.640 |
| Water ($H_2O$) | 32.364 | 412.791 | 20.640 |
| Oxygen (O) | 0 | 0 | 0 |
| Oxygen ($O_2$) | 92.077 | 1174.394 | 58.720 |
| Hydrogen ($H_2$) (Gas) | 0 | 0 | 0 |
| Hydroperoxo ($HO_2$) | 0 | 0 | 0 |
| Hydroxyl Radical (HO) | 0.002 | 0.024 | 0.001 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 0 | 0 | 0 |
| Nitric Oxide (NO) | 0 | 0 | 0 |
| Methane ($CH_4$) | 0 | 0 | 0 |
| Total | 156.808 | 2000 | 100 |

No $NO_x$ (0 lbs) was found in the combustion gas exhaust product.

F. Kerosene and Air - (Exhaust Temp. of 1939° F.)

| Component | Moles in Exhaust Product | Pounds in Exhaust Product | Weight % |
|---|---|---|---|
| Carbon Monoxide (CO) | 0 | 0 | 0 |
| Carbon Dioxide ($CO_2$) | 32.364 | 260.181 | 13.009 |
| Water ($H_2O$) | 32.364 | 260.194 | 13.010 |
| Oxygen (O) | 0 | 0 | 0 |
| Oxygen ($O_2$) | 6.510 | 5.234 | 0.262 |
| Hydrogen ($H_2$) (Gas) | 0 | 0 | 0 |
| Hydroperoxo ($HO_2$) | 0 | 0 | 0 |
| Hydroxyl Radical (HO) | 0 | 0 | 0 |
| Hydrogen (H) | 0 | 0 | 0 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |

F. Kerosene and Air - (Exhaust Temp. of 1939° F.)

| Component | Moles in Exhaust Product | Pounds in Exhaust Product | Weight % |
| --- | --- | --- | --- |
| Nitrogen Dioxide ($NO_2$) | 0 | 0 | 0 |
| Nitrogen Gas ($N_2$) | 183.391 | 1474.389 | 73.719 |
| Nitric Oxide (NO) | 3.160 | 0.003 | 0.0001 |
| Methane ($CH_4$) | 0 | 0 | 0 |
| Total | 248.770 | 2000 | 100 |

The exhaust product was determined to include 1,474.39 pounds of $NO_x$.

Tables E and F show that when the same amount of kerosene is combusted in the apparatus using air, rather than LOX, as the oxidizer, the process results in a significant increase in the criteria air pollutant $NO_x$.

Example 3

Comparison of Combustion Gas Exhaust Products Using Different Engineered Fuels Combustion products were determined using the thermochemical computer software GUIPEP based on using different fuels in the 10-MW hydrocarbon combustion gas generator described in Example 1. The test is based on combusting 2,000 pounds of each of the fuels using LOX as the oxidizer, with each combustion gas exhaust product exiting the hydrocarbon combustion gas generator at about 600 psig. The following Tables indicate the exhaust gas composition and temperature, as well as the weight, moles, and weight percent of each component in the combustion gas exhaust product.

A. EF-1 Fuel (Exhaust Temperature of 2787° F.)

| Component | Moles in Exhaust Product | Pounds in Exhaust Product | Weight % |
| --- | --- | --- | --- |
| Carbon Monoxide (CO) | 0.020 | 0.370 | 0.019 |
| Carbon Dioxide ($CO_2$) | 31.910 | 508.220 | 25.411 |
| Water ($H_2O$) | 31.680 | 504.480 | 25.224 |
| Oxygen (O) | 0.020 | 0.400 | 0.020 |
| Oxygen ($O_2$) | 61.520 | 979.740 | 48.987 |
| Hydrogen ($H_2$) (Gas) | 5.670 | 0.090 | 0.005 |
| Hydroperoxo ($HO_2$) | 1.340 | 0.020 | 0.001 |
| Hydroxyl Radical (HO) | 0.300 | 4.780 | 0.239 |
| Hydrogen (H) | 6.470 | 0.010 | 0.001 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 9.900 | 0.001 | 0.0001 |
| Nitrogen Gas ($N_2$) | 0.080 | 1.320 | 0.066 |
| Nitric Oxide (NO) | 0.030 | 0.530 | 0.027 |
| Methane ($CH_4$) | 0 | 0 | 0 |
| Total | 125.590 | 2000 | 100 |

The exhaust product was determined to include 1.85 lbs. $NO_x$ (0.093 wt. %).

B. EF-2 Fuel (Exhaust Temperature of 2994° F.)

| Component | Moles in Exhaust Product | Pounds in Exhaust Product | Weight % |
| --- | --- | --- | --- |
| Carbon Monoxide (CO) | 0.550 | 10.920 | 0.546 |
| Carbon Dioxide ($CO_2$) | 31.660 | 624.890 | 31.245 |
| Water ($H_2O$) | 29.550 | 583.240 | 29.162 |
| Oxygen (O) | 0.280 | 5.600 | 0.280 |
| Oxygen ($O_2$) | 37.610 | 742.21 | 37.111 |
| Hydrogen ($H_2$) (Gas) | 0.090 | 1.840 | 0.092 |
| Hydroperoxo ($HO_2$) | 3.620 | 0.070 | 0.004 |
| Hydroxyl Radical (HO) | 1.420 | 28.050 | 1.403 |
| Hydrogen (H) | 0.020 | 0.550 | 0.028 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.0001 | 0.002 | 0.001 |
| Nitrogen Gas ($N_2$) | 0.067 | 1.340 | 0.067 |
| Nitric Oxide (NO) | 0.063 | 1.240 | 0.062 |
| Methane ($CH_4$) | 0 | 0 | 0 |
| Total | 101.350 | 2000 | 100 |

The exhaust product was determined to include 2.59 lbs. $NO_x$ (0.130 wt. %).

C. EF-3 Fuel (Exhaust Temperature of 2994° F.)

| Component | Moles in Exhaust Product | Pounds in Exhaust Product | Weight % |
| --- | --- | --- | --- |
| Carbon Monoxide (CO) | 0.430 | 8.550 | 0.428 |
| Carbon Dioxide ($CO_2$) | 31.060 | 614.400 | 30.720 |
| Water ($H_2O$) | 28.760 | 568.910 | 28.446 |
| Oxygen (O) | 0.230 | 4.700 | 0.235 |
| Oxygen ($O_2$) | 38.940 | 770.210 | 38.511 |
| Hydrogen ($H_2$) (Gas) | 0.070 | 1.460 | 0.073 |
| Hydroperoxo ($HO_2$) | 3.340 | 0.060 | 0.003 |
| Hydroxyl Radical (HO) | 1.240 | 24.720 | 1.236 |
| Hydrogen (H) | 0.020 | 0.410 | 0.021 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.0002 | 0.003 | 0.0002 |
| Nitrogen Gas ($N_2$) | 0.220 | 4.390 | 0.220 |
| Nitric Oxide (NO) | 0.100 | 2.140 | 0.107 |
| Methane ($CH_4$) | 0 | 0 | 0 |
| Total | 101.110 | 2000 | 100 |

The exhaust product was determined to include 6.54 lbs. $NO_x$ (0.327 wt. %).

D. EF-4 Fuel (Exhaust Temperature of 2891° F.)

| Component | Moles in Exhaust Product | Pounds in Exhaust Product | Weight % |
| --- | --- | --- | --- |
| Carbon Monoxide (CO) | 0.130 | 2.230 | 0.112 |
| Carbon Dioxide ($CO_2$) | 32.710 | 559.220 | 27.961 |
| Water ($H_2O$) | 32.270 | 551.670 | 27.584 |
| Oxygen (O) | 0.090 | 1.670 | 0.084 |
| Oxygen ($O_2$) | 50.800 | 868.520 | 43.426 |
| Hydrogen ($H_2$) (Gas) | 0.020 | 0.450 | 0.023 |
| Hydroperoxo ($HO_2$) | 2.450 | 0.040 | 0.002 |
| Hydroxyl Radical (HO) | 0.730 | 12.510 | 0.626 |
| Hydrogen (H) | 0.005 | 0.08 | 0.004 |
| Sulfur (S) | 0 | 0 | 0 |
| Sulfur Dioxide ($SO_2$) | 0 | 0 | 0 |

D. EF-4 Fuel (Exhaust Temperature of 2891° F.)

| Component | Moles in Exhaust Product | Pounds in Exhaust Product | Weight % |
|---|---|---|---|
| Sulfur Oxide (SO) | 0 | 0 | 0 |
| Sulfuric Anhydride ($SO_3$) | 0 | 0 | 0 |
| Nitrogen Dioxide ($NO_2$) | 0.0001 | 0.002 | 0.0001 |
| Nitrogen Gas ($N_2$) | 0.140 | 2.410 | 0.121 |
| Nitric Oxide (NO) | 0.060 | 1.140 | 0.057 |
| Methane ($CH_4$) | 0 | 0 | 0 |
| Total | 117.000 | 2000 | 100 |

The exhaust product was determined to include 3.56 lbs. $NO_x$ (0.178 wt. %).

E. EF-5 Fuel (Exhaust Temperature of 2896° F.)

| Component | Moles in Exhaust Product | Pounds in Exhaust Product | Weight % |
|---|---|---|---|
| Carbon Monoxide (CO) | 0.120 | 2.340 | 0.117 |
| Carbon Dioxide ($CO_2$) | 29.730 | 557.080 | 27.853 |
| Water ($H_2O$) | 28.880 | 541.170 | 27.0580 |
| Oxygen (O) | 0.090 | 1.760 | 0.088 |
| Oxygen ($O_2$) | 46.530 | 871.730 | 43.580 |
| Hydrogen ($H_2$) (Gas) | 0.020 | 0.460 | 0.023 |
| Hydroperoxo ($HO_2$) | 2.270 | 0.040 | 0.002 |
| Hydroxyl Radical (HO) | 0.670 | 12.800 | 0.640 |
| Hydrogen (H) | 0.005 | 0.090 | 0.005 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.0003 | 0.005 | 0.0002 |
| Nitrogen Gas ($N_2$) | 0.530 | 10.090 | 0.505 |
| Nitric Oxide (NO) | 0.120 | 2.390 | 0.120 |
| Methane ($CH_4$) | 0 | 0 | 0 |
| Total | 106.750 | 2000 | 100 |

The exhaust product was determined to include 12.5 lbs. $NO_x$ (0.624 wt. %).

F. EF-6 Fuel (Exhaust Temperature of 2905° F.)

| Component | Moles in Exhaust Product | Pounds in Exhaust Product | Weight % |
|---|---|---|---|
| Carbon Monoxide (CO) | 0.140 | 2.740 | 0.137 |
| Carbon Dioxide ($CO_2$) | 30.100 | 563.620 | 28.181 |
| Water ($H_2O$) | 29.340 | 549.240 | 27.460 |
| Oxygen (O) | 0.100 | 1.970 | 0.099 |
| Oxygen ($O_2$) | 45.800 | 857.480 | 42.874 |
| Hydrogen ($H_2$) (Gas) | 0.020 | 0.540 | 0.027 |
| Hydroperoxo ($HO_2$) | 2.41 | 0.040 | 0.002 |
| Hydroxyl Radical (HO) | 0.740 | 13.910 | 0.696 |
| Hydrogen (H) | 0.006 | 0.110 | 0.006 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.0002 | 0.004 | 0.0002 |
| Nitrogen Gas ($N_2$) | 0.430 | 8.080 | 0.404 |
| Nitric Oxide (NO) | 0.11 | 2.220 | 0.111 |
| Methane ($CH_4$) | 0 | 0 | 0 |
| Total | 106.840 | 2000 | 100 |

The exhaust product was found to include 10.31 lbs. $NO_x$ (0.516 wt. %).

G. EF-7 Fuel (Exhaust Temperature of 2829° F.)

| Component | Moles in Exhaust Product | Pounds in Exhaust Product | Weight % |
|---|---|---|---|
| Carbon Monoxide (CO) | 0.040 | 0.770 | 0.038 |
| Carbon Dioxide ($CO_2$) | 30.520 | 525.930 | 26.297 |
| Water ($H_2O$) | 29.920 | 515.500 | 25.775 |
| Oxygen (O) | 0.040 | 0.720 | 0.036 |
| Oxygen ($O_2$) | 54.680 | 942.100 | 47.100 |
| Hydrogen ($H_2$) (Gas) | 9.930 | 0.170 | 0.009 |
| Hydroperoxo ($HO_2$) | 1.630 | 0.020 | 0.001 |
| Hydroxyl Radical (HO) | 0.400 | 7.050 | 0.353 |
| Hydrogen (H) | 1.410 | 0.020 | 0.001 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 2.070 | 0.003 | 0.0002 |
| Nitrogen Gas ($N_2$) | 0.360 | 6.260 | 0.313 |
| Nitric Oxide (NO) | 0.080 | 1.410 | 0.071 |
| Methane ($CH_4$) | 0 | 0 | 0 |
| Total | 116.080 | 2000 | 100 |

The exhaust product was determined to include 7.68 lbs. $NO_x$ (0.384 wt. %).

H. EF-8 Fuel (Exhaust Temperature of 2884° F.)

| Component | Moles in Exhaust Product | Pounds in Exhaust Product | Weight % |
|---|---|---|---|
| Carbon Monoxide (CO) | 0.130 | 2.090 | 0.104 |
| Carbon Dioxide ($CO_2$) | 39.500 | 595.980 | 29.799 |
| Water ($H_2O$) | 31.810 | 480.010 | 24.001 |
| Oxygen (O) | 0.100 | 1.540 | 0.077 |
| Oxygen ($O_2$) | 59.910 | 903.800 | 45.190 |
| Hydrogen ($H_2$) (Gas) | 2.320 | 0.350 | 0.018 |
| Hydroperoxo ($HO_2$) | 2.540 | 0.030 | 0.002 |
| Hydroxyl Radical (HO) | 0.730 | 11.050 | 0.553 |
| Hydrogen (H) | 4.610 | 0.06 | 0.003 |
| Sulfur (S) | 0 | 0 | 0 |
| Sulfur Dioxide ($SO_2$) | 0.060 | 1.020 | 0.051 |
| Sulfur Oxide (SO) | 0 | 0 | 0 |
| Sulfuric Anhydride ($SO_3$) | 2.100 | 0.003 | 0.0002 |
| Nitrogen Dioxide ($NO_2$) | 1.680 | 0.002 | 0.0001 |
| Nitrogen Gas ($N_2$) | 0.180 | 2.807 | 0.140 |
| Nitric Oxide (NO) | 0.080 | 1.218 | 0.061 |
| Methane ($CH_4$) | 0 | 0 | 0 |
| Total | 132.57 | 2000 | 100 |

The exhaust product was determined to include 4.03 lbs. $NO_x$ (0.201 wt. %).

I. EF-9 Fuel (Exhaust Temperature of 2876° F.)

| Component | Moles in Exhaust Product | Pounds in Exhaust Product | Weight % |
|---|---|---|---|
| Carbon Monoxide (CO) | 0.090 | 1.850 | 0.093 |
| Carbon Dioxide ($CO_2$) | 31.780 | 590.690 | 29.535 |
| Water ($H_2O$) | 25.890 | 481.240 | 24.062 |
| Oxygen (O) | 0.070 | 1.390 | 0.070 |
| Oxygen ($O_2$) | 48.840 | 907.880 | 45.394 |
| Hydrogen ($H_2$) (Gas) | 1.700 | 0.310 | 0.016 |
| Hydroperoxo ($HO_2$) | 1.970 | 0.030 | 0.002 |
| Hydroxyl Radical (HO) | 0.550 | 10.370 | 0.519 |
| Hydrogen (H) | 3.240 | 0.060 | 0.003 |
| Sulfur (S) | 0 | 0 | 0 |
| Sulfur Dioxide ($SO_2$) | 0.060 | 1.260 | 0.063 |

-continued

I. EF-9 Fuel (Exhaust Temperature of 2876° F.)

| Component | Moles in Exhaust Product | Pounds in Exhaust Product | Weight % |
|---|---|---|---|
| Sulfur Oxide (SO) | 0 | 0 | 0 |
| Sulfuric Anhydride ($SO_3$) | 2.200 | 0.004 | 0.00020 |
| Nitrogen Dioxide ($NO_2$) | 1.520 | 0.003 | 0.0001 |
| Nitrogen Gas ($N_2$) | 0.190 | 3.550 | 0.178 |
| Nitric Oxide (NO) | 0.070 | 1.320 | 0.066 |
| Methane ($CH_4$) | 0 | 0 | 0 |
| Total | 107.600 | 2000 | 100 |

The exhaust product was determined to include 4.88 lbs. $NO_x$ (0.244 wt. %).

J. EF-10 Fuel (Exhaust Temperature of 2960° F.)

| Component | Moles in Exhaust Product | Pounds in Exhaust Product | Weight % |
|---|---|---|---|
| Carbon Monoxide (CO) | 0.200 | 20560 | 0.128 |
| Carbon Dioxide ($CO_2$) | 19.920 | 252.090 | 12.605 |
| Water ($H_2O$) | 85.860 | 1086.150 | 54.300 |
| Oxygen (O) | 0.220 | 2.850 | 0.143 |
| Oxygen ($O_2$) | 48.990 | 619.750 | 30.980 |
| Hydrogen ($H_2$) (Gas) | 0.160 | 2.110 | 0.105 |
| Hydroperoxo ($HO_2$) | 5.070 | 0.060 | 0.003 |
| Hydroxyl Radical (HO) | 1.990 | 25.250 | 1.263 |
| Hydrogen (H) | 2.770 | 0.350 | 0.018 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.0002 | 0.003 | 0.0002 |
| Nitrogen Gas ($N_2$) | 0.530 | 6.700 | 0.335 |
| Nitric Oxide (NO) | 0.160 | 2.070 | 0.104 |
| Methane ($CH_4$) | 0 | 0 | 0 |
| Total | 158.11 | 2000 | 100 |

The exhaust product was determined to include 8.78 lbs. $NO_x$ (0.439 wt. %).

K. EF-11 Fuel (Exhaust Temperature of 3126° F.)

| Component | Moles in Exhaust Product | Pounds in Exhaust Product | Weight % |
|---|---|---|---|
| Carbon Monoxide (CO) | 1.870 | 28.270 | 1.414 |
| Carbon Dioxide ($CO_2$) | 18.950 | 285.880 | 14.294 |
| Water ($H_2O$) | 83.980 | 1266.570 | 63.329 |
| Oxygen (O) | 0.780 | 11.820 | 0.591 |
| Oxygen ($O_2$) | 20.130 | 303.650 | 15.183 |
| Hydrogen ($H_2$) (Gas) | 1.340 | 20.330 | 1.017 |
| Hydroperoxo ($HO_2$) | 6.380 | 0.096 | 0.005 |
| Hydroxyl Radical (HO) | 4.670 | 70.440 | 3.522 |
| Hydrogen (H) | 3.510 | 5.280 | 0.264 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.0001 | 0.002 | 0.0001 |
| Nitrogen Gas ($N_2$) | 0.340 | 5.120 | 0.262 |
| Nitric Oxide (NO) | 0.150 | 2.40 | 0.120 |
| Methane ($CH_4$) | 0 | 0 | 0 |
| Total | 132.610 | 2000 | 100 |

The exhaust product was determined to include 7.63 lbs. $NO_x$ (0.382 wt. %).

L. EF-12 Fuel (Exhaust Temperature of 2691° F.)

| Component | Moles in Exhaust Product | Pounds in Exhaust Product | Weight % |
|---|---|---|---|
| Carbon Monoxide (CO) | 0.11 | 2.160 | 0.108 |
| Carbon Dioxide ($CO_2$) | 30.910 | 565.890 | 28.295 |
| Water ($H_2O$) | 28.560 | 522.930 | 26.147 |
| Oxygen (O) | 0.080 | 1.630 | 0.062 |
| Oxygen ($O_2$) | 48.460 | 887.290 | 44.365 |
| Hydrogen ($H_2$) (Gas) | 0.020 | 0.410 | 0.021 |
| Hydroperoxo ($HO_2$) | 2.230 | 0.040 | 0.002 |
| Hydroxyl Radical (HO) | 0.650 | 11.990 | 0.600 |
| Hydrogen (H) | 4.380 | 0.080 | 0.004 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0.0002 | 0.004 | 0.0002 |
| Nitrogen Gas ($N_2$) | 0.310 | 5.780 | 0.289 |
| Nitric Oxide (NO) | 0.090 | 1.770 | 0.089 |
| Methane ($CH_4$) | 0 | 0 | 0 |
| Total | 109.25 | 2000 | 100 |

The exhaust product was determined to include 7.56 lbs. $NO_x$ (0.378 wt. %).

M. EF-13 Fuel (Exhaust Temperature of 2830° F.)

| Component | Moles in Exhaust Product | Pounds in Exhaust Product | Weight % |
|---|---|---|---|
| Carbon Monoxide (CO) | 0.040 | 0.780 | 0.039 |
| Carbon Dioxide ($CO_2$) | 30.950 | 537.470 | 26.874 |
| Water ($H_2O$) | 28.270 | 490.920 | 24.546 |
| Oxygen (O) | 0.040 | 0.720 | 0.036 |
| Oxygen ($O_2$) | 55.050 | 955.900 | 47.795 |
| Hydrogen ($H_2$) (Gas) | 9.300 | 0.160 | 0.008 |
| Hydroperoxo ($HO_2$) | 1.590 | 0.020 | 0.001 |
| Hydroxyl Radical (HO) | 0.390 | 6.890 | 0.345 |
| Hydrogen (H) | 1.360 | 0.020 | 0.001 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 1.990 | 0.003 | 0.0002 |
| Nitrogen Gas ($N_2$) | 0.320 | 5.700 | 0.285 |
| Nitric Oxide (NO) | 0.070 | 1.350 | 0.068 |
| Methane ($CH_4$) | 0 | 0 | 0 |
| Total | 115.19 | 2000 | 100 |

The exhaust product was determined to include 7.06 lbs. $NO_x$ (0.353 wt. %).

N. EF-14 Fuel (Exhaust Temperature of 2821° F.)

| Component | Moles in Exhaust Product | Pounds in Exhaust Product | Weight % |
|---|---|---|---|
| Carbon Monoxide (CO) | 0.030 | 0.670 | 0.034 |
| Carbon Dioxide ($CO_2$) | 30.530 | 529.690 | 26.485 |
| Water ($H_2O$) | 28.150 | 488.470 | 24.424 |
| Oxygen (O) | 0.030 | 0.640 | 0.032 |
| Oxygen ($O_2$) | 55.620 | 964.950 | 48.248 |
| Hydrogen ($H_2$) (Gas) | 8.170 | 0.140 | 0.007 |
| Hydroperoxo ($HO_2$) | 1.510 | 0.020 | 0.001 |
| Hydroxyl Radical (HO) | 0.360 | 6.380 | 0.319 |
| Hydrogen (H) | 1.140 | 0.010 | 0.001 |
| Sulfur (S) | 0 | 0 | 0 |
| Sulfur Dioxide ($SO_2$) | 0 | 0 | 0 |

N. EF-14 Fuel (Exhaust Temperature of 2821° F.)

| Component | Moles in Exhaust Product | Pounds in Exhaust Product | Weight % |
|---|---|---|---|
| Sulfur Oxide (SO) | 0 | 0 | 0 |
| Sulfuric Anhydride ($SO_3$) | 0 | 0 | 0 |
| Nitrogen Dioxide ($NO_2$) | 2.270 | 0.003 | 0.0002 |
| Nitrogen Gas ($N_2$) | 0.430 | 7.490 | 0.375 |
| Nitric Oxide (NO) | 0.080 | 1.490 | 0.075 |
| Methane ($CH_4$) | 0 | 0 | 0 |
| Total | 115.29 | 2000 | 100 |

O. EF-15 Fuel (Exhaust Temperature of 3001° F.)

| Component | Moles in Exhaust Product | Pounds in Exhaust Product | Weight % |
|---|---|---|---|
| Carbon Monoxide (CO) | 0.630 | 12.370 | 0.619 |
| Carbon Dioxide ($CO_2$) | 31.850 | 625.510 | 31.276 |
| Water ($H_2O$) | 30.820 | 603.200 | 30.160 |
| Oxygen (O) | 0.310 | 6.090 | 0.305 |
| Oxygen ($O_2$) | 36.660 | 719.780 | 35.989 |
| Hydrogen ($H_2$) (Gas) | 0.100 | 2.140 | 0.107 |
| Hydroperoxo ($HO_2$) | 3.800 | 0.070 | 0.004 |
| Hydroxyl Radical (HO) | 1.530 | 30.160 | 1.508 |
| Hydrogen (H) | 0.030 | 0.640 | 0.032 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 0 | 0 | 0 |
| Nitric Oxide (NO) | 0 | 0 | 0 |
| Methane ($CH_4$) | 0 | 0 | 0 |
| Total | 101.86 | 2000 | 100 |

P. EF-16 Fuel (Exhaust Temperature of 3002° F.)

| Component | Moles in Exhaust Product | Pounds in Exhaust Product | Weight % |
|---|---|---|---|
| Carbon Monoxide (CO) | 0.040 | 0.730 | 0.037 |
| Carbon Dioxide ($CO_2$) | 32.310 | 527.289 | 26.364 |
| Water ($H_2O$) | 32.140 | 524.406 | 26.220 |
| Oxygen (O) | 0.040 | 0.686 | 0.034 |
| Oxygen ($O_2$) | 57.600 | 939.770 | 46.989 |
| Hydrogen ($H_2$) (Gas) | 0.010 | 0.165 | 0.008 |
| Hydroperoxo ($HO_2$) | 1.690 | 0.027 | 0.001 |
| Hydroxyl Radical (HO) | 0.420 | 6.887 | 0.344 |
| Hydrogen (H) | 1.410 | 0.023 | 0.001 |
| Sulfur (S) | 0 | 0 | 0 |
| Sulfur Dioxide ($SO_2$) | 0 | 0 | 0 |
| Sulfur Oxide (SO) | 0 | 0 | 0 |
| Sulfuric Anhydride ($SO_3$) | 0 | 0 | 0 |
| Nitrogen Dioxide ($NO_2$) | 0 | 0 | 0 |
| Nitrogen Gas ($N_2$) | 0 | 0 | 0 |
| Nitric Oxide (NO) | 0 | 0 | 0 |
| Methane ($CH_4$) | 0 | 0 | 0 |
| Total | 122.58 | 2000 | 100 |

No $NO_x$ (0 lbs) was found in the combustion gas exhaust product.

Overall, this Example shows that when air is burned with a fuel, high levels of atmospheric environmental pollutants, such as $NO_x$, $SO_x$, CO and particulate matter, are generally produced, and it would be desirable to use a purer source of oxygen. Such emissions are at, and in some cases above, critical threshold levels permitted by federal and/or state governments, and need to be reduced in order to preserve clean air.

Example 4

Comparison of Emission Rates of $CO_2$, $NO_x$ and $SO_2$ per Megawatt of Electricity Produced using Different Fuels In the U.S., the average emission rates from conventional coal-burning power plants for each megawatt of electricity produced are:

| Material | Lbs per MWh of Electricity Produced |
|---|---|
| $CO_2$ | 2249 |
| NOx | 6 |
| $SO_2$ | 13 |
| PM-10 | 0.30 |
| Mercury | 0.000055 |

However, depending upon the quality of the coal, uncontrolled $SO_2$ emissions can range from 7 to 60 pounds per MWh of electricity produced, and uncontrolled $NO_x$ emissions can range from 10 to more than 20 pounds per MWh of electricity produced. Current combustion waste practices at many power plants result in the release of toxic chemicals into the environment, usually present in combustion wastes, such as fly ash.

In the U.S., the average emission rates from conventional natural gas-burning power plants for each megawatt of electricity produced are:

| Material | Lbs per MWh of Electricity Produced |
|---|---|
| $CO_2$ | 1200 |
| NOx | 5 |
| $SO_2$ | 0.006 |
| PM-10 | 0.30 |
| Mercury | 0.000001 |

The amount of $CO_2$, $NO_x$ and $SO_2$ present in the combustion gas exhaust product per megawatt hour (MWh) of electricity produced when the Engineered Fuels described below are separately combusted in the 10-MW hydrocarbon combustion gas generator described in Example 1 (using LOX as the oxidizer, with each combustion gas exhaust product exiting the hydrocarbon combustion gas generator at about 600 psig and at a temperature of about 2,698° F.) were determined using the thermochemical computer software GUIPEP. The results, along with the amount of fuel used per megawatt hour of electricity produced, are set forth in the Table below. In each case, and in the above Tables for coal and natural gas, 1 MWh of electricity is produced using 3,412,000 BTUs of fuel.

| Fuel | Lbs of Fuel per MWh | $CO_2$ (lbs) in Exhaust Product per MWh of Electricity | NOx (lbs) in Exhaust Product per MWh of Electricity | $SO_2$ (lbs) in Exhaust Product per MWh of Electricity |
|---|---|---|---|---|
| EF-1 | 178.44 | 45.34 | 0.17 | 0 |
| EF-2 | 176.87 | 55.26 | 0.23 | 0 |
| EF-3 | 214.32 | 65.84 | 0.70 | 0 |
| EF-4 | 189.16 | 52.89 | 0.34 | 0 |
| EF-5 | 180.61 | 50.31 | 1.13 | 0 |
| EF-6 | 204.80 | 57.72 | 1.06 | 0 |
| EF-7 | 182.55 | 48.00 | 0.70 | 0 |
| EF-8 | 197.88 | 58.97 | 0.40 | 0.10 |
| EF-9 | 178.44 | 52.70 | 0.44 | 0.11 |
| EF-10 | 122.82 | 17.56 | 0.47 | 0 |
| EF-11 | 107.70 | 13.58 | 0.47 | 0 |
| EF-12 | 180.94 | 51.20 | 0.68 | 0 |
| EF-13 | 177.89 | 47.81 | 0.63 | 0 |
| EF-14 | 178.27 | 47.21 | 0.80 | 0 |
| EF-15 | 175.06 | 54.75 | 0 | 0 |
| EF-16 | 186.40 | 49.14 | 0 | 0 |

The Table above shows that the amount of combustion gas exhaust components $CO_2$, $NO_x$, and $SO_2$ produced per megawatt of electricity produced using these fuels is significantly lower than the average emissions of these components per megawatt of electricity produced in the United States using conventional coal or natural gas combustion processes.

Example 5

Generation of 25 MW of Electricity using Different Fuels

Fuel oils generally are a mixture of hydrocarbons derived from refining crude petroleum. ASTM Standard D 396 provides specifications for fuel oil properties that divide fuel oils into various grades: Grade #2 fuel oil is a heavy distillate that is used primarily with pressure atomizing (gun) burners that spray the oil into a combustion chamber; Grade #4 fuel oil is an intermediate fuel that is intended for burners that atomize oils of higher viscosity than domestic burners can handle; and Grade #6 fuel oil (Bunker C) is a high viscosity fuel oil used mostly in commercial and industrial heating.

The table below shows a comparison among several variables in the production of 25 MW of electricity per pound of fuel per hour (119,967,930 BTU/hr, 175,000 lbs of superheated steam product per hour, 25,000 kW per hour and 218,400,000 kW per year) by the hydrocarbon combustion gas generator described in Example 1 using six different types of fuels, including bituminous coal, fuel oil grades #2, #4 and #6, and LOX as the oxidizer (determined using the GUIPEP computer software). The costs associated with the EF-8 fuel include the receipt of tipping fees. The amount of LOX used varies, depending upon the type of fuel employed, with different resulting O/F ratios. The operating cost per 25,000 kWh for all of the fuels was $270.39. Parenthetical values are negative.

| Fuel | Btus/lb | Fuel lb/hour | Total Btu/hour | O/F Ratio | LOX lb/hour |
|---|---|---|---|---|---|
| EF-8 Fuel | $1.72 \times 10^4$ | $6.95 \times 10^3$ | $1.20 \times 10^8$ | 2.0 | $1.39 \times 10^4$ |
| Natural gas | $2.15 \times 10^4$ | $5.58 \times 10^3$ | $1.20 \times 10^8$ | 2.2 | $1.22 \times 10^4$ |
| Coal | $1.25 \times 10^4$ | $9.60 \times 10^3$ | $1.20 \times 10^8$ | 2.4 | $2.30 \times 10^4$ |
| Oil #6 | $1.88 \times 10^4$ | $6.39 \times 10^3$ | $1.20 \times 10^8$ | 2.2 | $1.40 \times 10^4$ |
| Oil #4 | $1.93 \times 10^4$ | $6.20 \times 10^3$ | $1.20 \times 10^8$ | 2.3 | $1.43 \times 10^4$ |
| Oil #2 | $1.97 \times 10^4$ | $6.10 \times 10^3$ | $1.20 \times 10^8$ | 2.4 | $1.46 \times 10^4$ |

| Fuel | Fuel Cost/lb | LOX cost/kWh | Total Fuel Cost | Total LOX Cost | Total Fuel Cost/kWh |
|---|---|---|---|---|---|
| EF-8 Fuel | $(0.02) | $0.0135 | $(139.15) | $187.85 | $48.70 |
| Natural gas | $0.129 | $0.0135 | $719.81 | $165.72 | $885.53 |
| Coal | $0.016 | $0.0135 | $148.76 | $310.96 | $459.72 |
| Oil #6 | $0.097 | $0.0135 | $617.46 | $189.64 | $807.11 |
| Oil #4 | $0.094 | $0.0135 | $581.61 | $192.53 | $774.14 |
| Oil #2 | $0.083 | $0.0135 | $503.45 | $197.48 | $700.93 |

| Fuel | Total Cost/kWh | Fuel and LOX Cost/kWh | Operating Cost less Fuels |
|---|---|---|---|
| EF-8 Fuel | $0.013 | $0.002 | $0.011 |
| Natural gas | $0.046 | $0.035 | $0.011 |
| Coal | $0.029 | $0.018 | $0.011 |
| Oil #6 | $0.043 | $0.032 | $0.011 |
| Oil #4 | $0.042 | $0.031 | $0.011 |
| Oil #2 | $0.039 | $0.028 | $0.011 |

The Table above shows that, when the EF-8 fuel is used to produce the same amount of electrical power as the five other indicated fuels (all in the apparatus described in Example 1), using the same oxidizer, the fuel cost is significantly reduced (a reduction ranging from about 89.5% to about 94.5%), resulting in a significantly reduced total cost per kilowatt hour (a reduction ranging from about 43% to about 73%).

Example 6

"GG-1X" Hydrocarbon Combustion Gas Generator

A 1-MW hydrocarbon combustion gas generator named "GG-1X" was built. It was the same as, but one-half the scale/size of, the generator of Example 1. The GG-1X generator is capable of processing about 1,000 lbs/hr of waste fuel (i.e., fuel produced from waste materials).

Example 7

GG-1X First Combustion Chamber Injectors and Combustion Stability Short Duration Hot-Fire Test A first test (LF-JP5-LOX-001—First Test) was conducted with the GG-1X hydrocarbon combustion gas generator to observe combustion stability in the first combustion chamber employing a low O/F ratio. Kerosene (KI) ("JP5", a high-grade kerosene known in the art that contains anti-freeze and anti-fungal additives) was used as the fuel, and LOX was used as the oxidizer. Deionized water was used to cool the first combustion chamber. Nitrogen gas was used to purge the fuel and oxidizer systems. The materials of construction of the combustor were as follows: The fuel inlet manifold, fuel metering block, and first combustion chamber were carbon steel. The first oxidizer manifold plate was stainless steel. The first oxidizer injector orifices and first fuel injector orifices were brass.

The scheduled duration of the test was a maximum of 5.0 seconds and the actual duration was 5.6 seconds. The oxidizer:fuel (O/F) ratio was 2.75. The operating pressure in the first combustion chamber was 300 psig. The reactants were supplied to the reactor as detailed in the following Table:

| System | Fluid | Temp. (° F.) | Pressure (psig) | Orifice Diam. (inch) | Flow Rate |
|---|---|---|---|---|---|
| Oxidizer | LOX | −297 | 380 | 0.124 | 3.58 lb/sec |
| Fuel | Kl | Ambient | 429 | 0.807 | 1.30 lb/sec |
| Coolant | H₂O | Ambient | 40 | 0.50 | 0.05 gal/sec |

No combustion chamber burn through occurred (i.e., the integrity of the first combustion chamber was completely maintained). This test was successful because the first combustion chamber and injector performances were satisfactory. Pressures measured at various times and locations during the test are set forth in the following Table.

| | Pressure (psig) | | | |
|---|---|---|---|---|
| Time | LOX Inlet | JP5 Inlet | H₂O Inlet | First Combustion Chamber |
| 0 | 0 | 0 | 0 | 0 |
| 0.2 | 50 | 68 | 42 | 68 |
| 0.4 | 150 | 200 | 42 | 205 |
| 0.6 | 291 | 349 | 41 | 291 |
| 0.8 | 370 | 400 | 40 | 299 |
| 1.0 | 205 | 399 | 40 | 200 |
| 1.2 | 375 | 425 | 40 | 280 |
| 1.4 | 382 | 431 | 40 | 302 |
| 1.6 | 380 | 429 | 41 | 300 |
| 1.8 | 381 | 429 | 41 | 300 |
| 2.0 | 210 | 420 | 40 | 285 |
| 2.2 | 381 | 429 | 41 | 301 |
| 2.4 | 380 | 429 | 40 | 302 |
| 2.6 | 380 | 429 | 40 | 300 |
| 2.8 | 380 | 429 | 40 | 301 |
| 3.0 | 381 | 431 | 40 | 301 |
| 3.2 | 199 | 415 | 42 | 270 |
| 3.4 | 380 | 429 | 40 | 300 |
| 3.6 | 380 | 431 | 42 | 301 |
| 3.8 | 380 | 429 | 41 | 301 |
| 4.0 | 150 | 420 | 40 | 199 |
| 4.2 | 380 | 429 | 40 | 301 |
| 4.4 | 380 | 429 | 40 | 300 |
| 4.6 | 381 | 431 | 42 | 300 |
| 4.8 | 382 | 432 | 41 | 300 |
| 5.0 | 380 | 429.8 | 41 | 300 |
| 5.2 | 382 | 429 | 40 | 301 |
| 5.4 | 380 | 429 | 40 | 299 |
| 5.6 | 300 | 350 | 40 | 275 |
| 5.8 | 250 | 300 | 41 | 200 |
| 6.0 | 100 | 201 | 40 | 73 |
| 6.1 | 0 | 0 | 40 | 0 |

Some combustion instability was observed in this test. A post-test inspection indicated that a LOX check valve had been sticking. The valve was replaced with a new one, and the test was repeated as detailed in Example 8.

Example 8

GG-1X First Combustion Chamber Injectors and Combustion Stability Short Duration Hot Fire Test (Second Test)

A second test (LF-JPS-LOX-002—Second Test) was conducted with the GG-1X, using the same parameters as described in Example 7. The test had a duration of 5.6 seconds, and no combustion chamber burn through occurred. No combustion instability was observed. A post-test inspection indicated that the first combustion chamber and injector performances were satisfactory. The test thus was deemed successful. Pressures measured at various times and locations during the test are shown in the following Table.

| | Pressure (psig) | | | |
|---|---|---|---|---|
| Time | LOX Inlet | JP5 Inlet | H₂O Inlet | First Combustion Chamber |
| 0 | 0 | 0 | 0 | 0 |
| 0.2 | 50 | 68 | 42 | 68 |
| 0.4 | 150 | 200 | 42 | 205 |
| 0.6 | 291 | 349 | 41 | 300 |
| 0.8 | 382 | 400 | 40 | 310 |
| 1.0 | 381 | 426 | 40 | 305 |
| 1.2 | 380 | 425 | 40 | 301 |
| 1.4 | 381 | 431 | 40 | 302 |
| 1.6 | 380 | 429 | 41 | 300 |
| 1.8 | 381 | 429 | 41 | 300 |
| 2.0 | 380 | 420 | 40 | 301 |
| 2.2 | 381 | 429 | 41 | 301 |
| 2.4 | 380 | 429 | 40 | 302 |
| 2.6 | 380 | 429 | 40 | 300 |
| 2.8 | 380 | 429 | 40 | 301 |
| 3.0 | 381 | 431 | 40 | 301 |
| 3.2 | 380 | 415 | 42 | 302 |
| 3.4 | 380 | 429 | 41 | 300 |
| 3.6 | 381 | 431 | 42 | 301 |
| 3.8 | 380 | 429 | 41 | 301 |
| 4.0 | 380 | 420 | 40 | 301 |
| 4.2 | 380 | 429 | 40 | 301 |
| 4.4 | 380 | 429 | 40 | 300 |
| 4.6 | 381 | 431 | 42 | 300 |
| 4.8 | 382 | 432 | 41 | 300 |
| 5.0 | 380 | 429.8 | 41 | 300 |
| 5.2 | 382 | 429 | 40 | 301 |
| 5.4 | 380 | 429 | 40 | 299 |
| 5.6 | 300 | 350 | 40 | 275 |
| 5.8 | 250 | 300 | 41 | 200 |
| 6.0 | 100 | 201 | 40 | 73 |
| 6.1 | 0 | 0 | 40 | 0 |

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

I claim:

1. A method for producing hydrocarbon combustion gas for the production of energy comprising:
providing a hydrocarbon combustion gas generator, which comprises a first combustion chamber having an inlet end and an outlet end, a second combustion chamber having an inlet end and an outlet end, an injector plate between the outlet end of the first combustion chamber and the inlet end of the second combustion chamber separating the first combustion chamber from the second combustion chamber, wherein the inlet end of the second combustion chamber is in fluid communication with the outlet end of the first combustion chamber through the injector plate, and a heat exchanger means for cooling the first and second combustion chambers and for converting cooling water to steam, wherein the cooling water and steam are maintained separate from combustion gases produced by the first and second combustions;
metering a hydrocarbon fuel which comprises particles of hydrocarbon-containing material into the first combustion chamber;
separately metering an oxidizer into the first combustion chamber to achieve an incomplete combustion of the fuel in the first chamber;
metering into the second combustion chamber the incomplete combustion product produced in the first combustion chamber through the injector plate; and metering additional oxidizer into the second combustion chamber through the injector plate to further combust the fuel in the second chamber.

2. The method of claim 1, wherein the size of the particles of hydrocarbon-containing material is from 37 µm to 2,000 µm.

3. The method of claim 1, wherein the size of the particles of hydrocarbon-containing material is from 149 µm to 400 µm.

4. The method of claim 1, wherein the particles of hydrocarbon-containing material comprise one or more materials selected from scrap carpet, polystyrene, polyethylene terephthalate, polyester polyethylene terephthalate, polyethylene, polypropylene, polyurethane, Nylon 6,6, Nylon 6, polyvinyl chloride, tire rubber, and combinations thereof.

5. The method of claim 4, wherein the fuel comprises from 27% to 48% scrap carpet, from 25% to 40% high-density polyethylene, and from 23% to 38% hydrogen, all by weight of the fuel.

6. The method of claim 1, wherein the hydrocarbon fuel further comprising hydrogen gas mixed with the particles.

7. The method of claim 1, further comprising separately metering hydrogen gas into the first combustion chamber.

8. The method of claim 1, wherein the fuel comprises a mixture of hydrogen gas and particles consisting essentially of materials selected from scrap carpet, polystyrene, polyethylene terephthalate, polyester polyethylene terephthalate, high-density polyethylene, low-density polyethylene, polypropylene, polyurethane, Nylon 6,6, Nylon 6, polyvinyl chloride, tire rubber, and combinations thereof, wherein the size of the particles ranges from 37 µm to 2,000 µm.

9. The method of claim 1, wherein the oxidizer comprises LOX.

* * * * *